(12) United States Patent
Sasaki et al.

(10) Patent No.: US 7,957,097 B2
(45) Date of Patent: Jun. 7, 2011

(54) MAGNETIC HEAD FOR PERPENDICULAR MAGNETIC RECORDING AND METHOD OF MANUFACTURING SAME

(75) Inventors: Yoshitaka Sasaki, Milpitas, CA (US); Hiroyuki Itoh, Milpitas, CA (US); Hironori Araki, Milpitas, CA (US); Shigeki Tanemura, Milpitas, CA (US); Moris Dovek, Milpitas, CA (US)

(73) Assignee: Headway Technologies, Inc., Milpitas, CA (US)

( * ) Notice: Subject to any disclaimer, the term of this patent is extended or adjusted under 35 U.S.C. 154(b) by 988 days.

(21) Appl. No.: 11/819,667

(22) Filed: Jun. 28, 2007

(65) Prior Publication Data

US 2009/0002884 A1    Jan. 1, 2009

(51) Int. Cl.
*G11B 5/127*    (2006.01)
(52) U.S. Cl. .................. 360/125.14; 360/125.2
(58) Field of Classification Search . 360/125.01–125.75
See application file for complete search history.

(56) References Cited

U.S. PATENT DOCUMENTS

| | | | |
|---|---|---|---|
| 6,710,973 B2 | 3/2004 | Okada et al. | |
| 2001/0012541 A1* | 8/2001 | Sasaki et al. | 427/130 |
| 2006/0002014 A1* | 1/2006 | Sasaki et al. | 360/125 |
| 2006/0077589 A1 | 4/2006 | Sasaki et al. | |
| 2006/0198049 A1* | 9/2006 | Sasaki et al. | 360/126 |
| 2007/0014048 A1* | 1/2007 | Sasaki et al. | 360/126 |
| 2007/0115584 A1* | 5/2007 | Balamane et al. | 360/126 |

FOREIGN PATENT DOCUMENTS

| JP | A 2002-92821 | 3/2002 |
|---|---|---|
| JP | A 2003-203311 | 7/2003 |

* cited by examiner

*Primary Examiner* — Craig A. Renner
*Assistant Examiner* — Adam B Dravininkas
(74) *Attorney, Agent, or Firm* — Oliff & Berridge, PLC

(57) ABSTRACT

An encasing section includes an encasing layer having an encasing groove, and a nonmagnetic film disposed in the encasing groove at a position between the encasing layer and a pole layer. The pole layer includes a track width defining portion and a wide portion. The track width defining portion has a first side surface and a second side surface. The wide portion has a third side surface and a fourth side surface. The encasing layer has a first wall surface and a second wall surface. The distance between the third side surface and the first wall surface is smaller than the distance between the first side surface and the first wall surface. The distance between the fourth side surface and the second wall surface is smaller than the distance between the second side surface and the second wall surface.

33 Claims, 45 Drawing Sheets

MAGNETIC HEAD FOR PERPENDICULAR MAGNETIC RECORDING AND METHOD OF MANUFACTURING SAME

BACKGROUND OF THE INVENTION

1. Field of the Invention

The present invention relates to a magnetic head for perpendicular magnetic recording that is used for writing data on a recording medium by means of a perpendicular magnetic recording system, and to a method of manufacturing such a magnetic head.

2. Description of the Related Art

The recording systems of magnetic read/write devices include a longitudinal magnetic recording system wherein signals are magnetized in the direction along the surface of the recording medium (the longitudinal direction) and a perpendicular magnetic recording system wherein signals are magnetized in the direction orthogonal to the surface of the recording medium. It is known that the perpendicular magnetic recording system is harder to be affected by thermal fluctuation of the recording medium and capable of implementing higher linear recording density, compared with the longitudinal magnetic recording system.

Typically, magnetic heads for perpendicular magnetic recording have a structure in which a reproducing (read) head having a magnetoresistive element (that may be hereinafter referred to an MR element) for reading and a recording (write) head having an induction-type electromagnetic transducer for writing are stacked on a substrate, as is the case with magnetic heads for longitudinal magnetic recording. The write head incorporates a pole layer that produces a magnetic field in the direction orthogonal to the surface of the recording medium. The pole layer includes, for example, a track width defining portion having an end located in a medium facing surface that faces toward the recording medium, and a wide portion that is coupled to the other end of the track width defining portion and that is greater in width than the track width defining portion. The track width defining portion has a nearly uniform width.

For the perpendicular magnetic recording system, it is an improvement in recording medium and an improvement in write head that mainly contributes to an improvement in recording density. It is a reduction in track width and an improvement in write characteristics that is particularly required for the write head to achieve higher recording density. On the other hand, if the track width is reduced, the writing characteristics, such as an overwrite property that is a parameter indicating an overwriting capability, suffer degradation. It is therefore required to achieve better write characteristics with decreasing track width. Here, the length of the track width defining portion taken in the direction orthogonal to the medium facing surface is called a neck height. The smaller the neck height, the better is the overwrite property.

A magnetic head for use in a magnetic disk drive such as a hard disk drive is typically provided in a slider. The slider has the medium facing surface mentioned above. The medium facing surface has an air-inflow-side end and an air-outflow-side end. The slider is designed to slightly fly over the surface of the recording medium by means of the airflow that comes from the air-inflow-side end into the space between the medium facing surface and the recording medium. The magnetic head is typically disposed near the air-outflow-side end of the medium facing surface of the slider. In a magnetic disk drive, the magnetic head is aligned through the use of a rotary actuator, for example. In this case, the magnetic head moves over the recording medium along a circular orbit centered on the center of rotation of the rotary actuator. In such a magnetic disk drive, a tilt of the magnetic head with respect to the tangent of the circular track, which is called a skew, occurs in accordance with the position of the magnetic head across the tracks.

In a magnetic disk drive of the perpendicular magnetic recording system that exhibits a better capability of writing on a recording medium than the longitudinal magnetic recording system, in particular, if the skew mentioned above occurs, there arise problems, such as a phenomenon in which, when data is written on a certain track, data stored on a track adjacent thereto is erased (that is hereinafter called adjacent track erasing), or unwanted writing between two adjacent tracks. To achieve higher recording density, it is required to suppress adjacent track erasing. Unwanted writing between two adjacent tracks affects detection of servo signals for alignment of the magnetic head and the signal-to-noise ratio of a read signal.

As one of techniques for preventing the problems resulting from the skew described above, there is known a technique in which the end face of the track width defining portion located in the medium facing surface is formed into such a shape that the side located backward along the direction of travel of the recording medium (that is, the side located closer to the air inflow end of the slider) is shorter than the opposite side, as disclosed in U.S. Pat. No. 6,710,973 and JP 2003-203311A, for example. For magnetic heads, typically, in the medium facing surface, the end farther from the substrate is located forward along the direction of travel of the recording medium (that is, located closer to the air outflow end of the slider). Therefore, the shape of the end face of the track width defining portion located in the medium facing surface mentioned above is such that the side closer to the substrate is shorter than the side farther from the substrate.

Consideration will now be given to a method of forming a pole layer in which the end face of the track width defining portion located in the medium facing surface has such a shape that the side closer to the substrate is shorter than the side farther from the substrate as described above. U.S. Pat. No. 6,710,973 discloses a method of forming a pole layer through the steps of etching an inorganic insulating film using a patterned resist as a mask to thereby form a groove in the inorganic insulating film; subsequently forming a stopper film; further forming a magnetic film; and flattening the top surface of the magnetic film. JP 2003-203311A discloses a method of forming a pole layer by etching a magnetic layer using a mask.

In the pole layer formed by the method disclosed in U.S. Pat. No. 6,710,973 or the method disclosed in JP 2003-203311A, a great part of the side surface of the pole layer along the entire perimeter of the pole layer is formed into a surface inclined with respect to the direction orthogonal to the top surface of the substrate. In the pole layer having such a shape, the cross-sectional area of the pole layer taken in the direction orthogonal to the direction in which magnetic flux flows is smaller, compared with a case in which the entire side surface of the pole layer is orthogonal to the top surface of the substrate. According to the pole layer having the above-described shape, it is impossible to allow magnetic flux of great magnitude to pass through a portion near the boundary between the track width defining portion and the wide portion, and as a result, write characteristics such as an overwrite property will be degraded. It is therefore inevitable to reduce the neck height of the pole layer having the above-described shape so as to suppress degradation of write characteristics.

It is difficult to precisely form a portion of the side surface of the pole layer near the boundary between the track width defining portion and the wide portion. It is therefore likely that the portion of the pole layer near the boundary between the track width defining portion and the wide portion has such a shape that the width gradually increases with increasing distance from the medium facing surface. As a result, if the neck height is reduced, it is difficult to precisely define the width of the track width defining portion located in the medium facing surface, that is, the track width.

Because of these factors, it has been conventionally difficult to implement a pole layer that enables both of precise definition of the track width and an improvement in write characteristics.

OBJECT AND SUMMARY OF THE INVENTION

It is an object of the present invention to provide a magnetic head for perpendicular magnetic recording and a method of manufacturing the same that enable both of precise definition of the track width and an improvement in write characteristics.

A magnetic head for perpendicular magnetic recording of the present invention includes: a medium facing surface that faces toward a recording medium; a coil for generating a magnetic field corresponding to data to be written on the recording medium; a pole layer allowing a magnetic flux corresponding to the magnetic field generated by the coil to pass therethrough and generating a write magnetic field for writing the data on the recording medium by means of a perpendicular magnetic recording system; and an encasing section that accommodates at least part of the pole layer.

The encasing section includes: an encasing layer made of a nonmagnetic material and having an encasing groove that opens in a top surface of the encasing layer and that accommodates the at least part of the pole layer; and a nonmagnetic film made of a nonmagnetic material and disposed in the encasing groove at a position between the encasing layer and the pole layer. The pole layer includes: a track width defining portion having an end face located in the medium facing surface and an end opposite to the end face; and a wide portion connected to the end of the track width defining portion and having a width greater than that of the track width defining portion. The end face of the track width defining portion located in the medium facing surface defines the track width. The distance from the medium facing surface to the boundary between the track width defining portion and the wide portion is within a range of 10 to 300 nm. The track width defining portion has a first side surface and a second side surface. The wide portion has a third side surface contiguous to the first side surface, and a fourth side surface contiguous to the second side surface. The encasing layer has a first wall surface and a second wall surface that form the encasing groove, the first wall surface is opposed to the first and the third side surface, and the second wall surface is opposed to the second and the fourth side surface. The nonmagnetic film includes a first portion located between the first side surface and the first wall surface, and a second portion located between the second side surface and the second wall surface. The distance between the third side surface and the first wall surface is smaller than the distance between the first side surface and the first wall surface, while the distance between the fourth side surface and the second wall surface is smaller than the distance between the second side surface and the second wall surface.

In the magnetic head of the invention, the nonmagnetic film may further include a third portion located between the third side surface and the first wall surface, and a fourth portion located between the fourth side surface and the second wall surface. In this case, the third portion is smaller in thickness than the first portion, and the fourth portion is smaller in thickness than the second portion.

In the magnetic head of the invention, the third side surface may touch the first wall surface while the fourth side surface may touch the second wall surface.

In the magnetic head of the invention, the distance from the medium facing surface to the boundary between the track width defining portion and the wide portion may be within a range of 10 to 20 nm.

The magnetic head of the invention may further include a substrate on which the encasing section, the pole layer and the coil are stacked. In this case, the end face of the track width defining portion may have a first side that is closer to the top surface of the substrate, and a second side opposite to the first side, the second side may have a width that defines the track width, and the end face of the track width defining portion may have a width that decreases with decreasing distance from the first side, and the angle formed by the third side surface with respect to the direction orthogonal to the top surface of the substrate may be smaller than the angle formed by the first side surface with respect to the direction orthogonal to the top surface of the substrate. In addition, the angle formed by the fourth side surface with respect to the direction orthogonal to the top surface of the substrate may be smaller than the angle formed by the second side surface with respect to the direction orthogonal to the top surface of the substrate.

The magnetic head of the invention may further include an encasing groove defining layer disposed on the top surface of the encasing layer and having a penetrating opening contiguous to the encasing groove, and the edge of the opening of the encasing groove defining layer may be located directly above the edge of the encasing groove in the top surface of the encasing layer.

In the magnetic head of the invention, the track width defining portion may have a first bottom surface that is a surface closer to the top surface of the substrate, the wide portion may have a second bottom surface that is a surface closer to the top surface of the substrate, and the second bottom surface may be located closer to the top surface of the substrate than is the first bottom surface. In this case, the magnetic head may further include a bottom forming layer made of a nonmagnetic material, the bottom forming layer being disposed between the encasing layer and the substrate and touching the encasing layer. In addition, at least part of a portion of the encasing groove in which the wide portion is placed may penetrate the encasing layer.

In the magnetic head of the invention, the track width defining portion may have a first top surface that is a surface farther from the top surface of the substrate, the wide portion may have a second top surface that is a surface farther from the top surface of the substrate, and the second top surface may be located farther from the top surface of the substrate than is the first top surface.

A first method of manufacturing the magnetic head of the invention includes the steps of: forming the encasing section; forming the pole layer after the step of forming the encasing section; and forming the coil. The step of forming the encasing section includes a step of forming the encasing layer and a step of forming the nonmagnetic film. The step of forming the nonmagnetic film includes: a step of forming a film to be etched, the film to be etched being intended to become the nonmagnetic film later by undergoing partial etching; a step of forming a mask for covering a portion of the film to be etched, the portion being intended to become the first and the second portion later; and a step of etching at least part of a portion of the film to be etched that is not covered with the mask.

In the first method of manufacturing the magnetic head of the invention, the nonmagnetic film may further include a third portion located between the third side surface and the first wall surface, and a fourth portion located between the fourth side surface and the second wall surface, the third portion may be smaller in thickness than the first portion, and the fourth portion may be smaller in thickness than the second portion. In this case, in the step of etching the film to be etched, the film is etched such that the first to fourth portions of the nonmagnetic film are formed.

In the first method of manufacturing the magnetic head of the invention, in the step of etching the film to be etched, the film may be etched such that a portion of each of the first and the second wall surface of the encasing layer is exposed as a result of removal of the at least part of the portion of the film to be etched that is not covered with the mask, and, in the step of forming the pole layer, the pole layer may be formed such that the third side surface touches the first wall surface and the fourth side surface touches the second wall surface.

In the first method of manufacturing the magnetic head of the invention, in the step of etching the film to be etched, the film may be etched by reactive ion etching or ion beam etching.

In the first method of manufacturing the magnetic head of the invention, in the step of etching the film to be etched, the encasing groove may be completed at the same time.

In the first method of manufacturing the magnetic head of the invention, the film to be etched may be formed by chemical vapor deposition in which formation of a single atomic layer is repeated.

In the first method of manufacturing the magnetic head of the invention, the distance from the medium facing surface to the boundary between the track width defining portion and the wide portion may be within a range of 10 to 20 nm.

In the first method of manufacturing the magnetic head of the invention, the magnetic head may further include a substrate on which the encasing section, the pole layer and the coil are stacked. In this case, the end face of the track width defining portion may have a first side that is closer to the top surface of the substrate, and a second side opposite to the first side, the second side may have a width that defines the track width, and the end face of the track width defining portion may have a width that decreases with decreasing distance from the first side. In this case, the angle formed by the third side surface with respect to the direction orthogonal to the top surface of the substrate may be smaller than the angle formed by the first side surface with respect to the direction orthogonal to the top surface of the substrate, and the angle formed by the fourth side surface with respect to the direction orthogonal to the top surface of the substrate may be smaller than the angle formed by the second side surface with respect to the direction orthogonal to the top surface of the substrate.

In the first method of manufacturing the magnetic head of the invention, the magnetic head may further include an encasing groove defining layer disposed on the top surface of the encasing layer and having a penetrating opening contiguous to the encasing groove, and the edge of the opening of the encasing groove defining layer may be located directly above the edge of the encasing groove in the top surface of the encasing layer. In this case, the step of forming the encasing layer may include; a step of forming a nonmagnetic layer that is to become the encasing layer later by undergoing formation of the encasing groove therein; a step of forming the encasing groove defining layer on the nonmagnetic layer; and a step of forming the encasing groove in the nonmagnetic layer by selectively etching a portion of the nonmagnetic layer exposed from the opening of the encasing groove defining layer, and, in the step of etching the film to be etched, the film may be etched using the mask and the encasing groove defining layer as etching masks.

In the first method of manufacturing the magnetic head of the invention, the magnetic head may further include a bottom forming layer made of a nonmagnetic material and disposed below the encasing layer. In this case, the method of manufacturing the magnetic head further includes the step of forming the bottom forming layer before the encasing layer is formed. Furthermore, in this case, the step of forming the encasing layer may include: a step of forming a nonmagnetic layer on the bottom forming layer, the nonmagnetic layer being intended to become the encasing layer later by undergoing formation of the encasing groove therein; and a step of forming the encasing groove in the nonmagnetic layer by selectively etching the nonmagnetic layer, and, at least part of a portion of the encasing groove in which the wide portion is placed may penetrate the encasing layer.

A second method of manufacturing the magnetic head of the invention includes the steps of: forming the encasing section; forming the pole layer after the step of forming the encasing section; and forming the coil. The step of forming the encasing section includes: a step of forming the encasing layer; a step of forming a mask for covering a portion of the encasing groove of the encasing layer in which the wide portion is to be placed later; a step of forming the nonmagnetic film to cover respective portions of the first and the second wall surface that are not covered with the mask; and a step of removing the mask.

In the second method of manufacturing the magnetic head of the invention, the magnetic head may further include an encasing groove defining layer disposed on the top surface of the encasing layer and having a penetrating opening contiguous to the encasing groove, and the edge of the opening of the encasing groove defining layer may be located directly above the edge of the encasing groove in the top surface of the encasing layer. In this case, the step of forming the encasing layer may include: a step of forming a nonmagnetic layer that is to become the encasing layer later by undergoing formation of the encasing groove therein; a step of forming the encasing groove defining layer on the nonmagnetic layer; and a step of forming the encasing groove in the nonmagnetic layer by selectively etching a portion of the nonmagnetic layer exposed from the opening of the encasing groove defining layer.

The step of forming the encasing groove may include: a first etching step for forming an initial groove in the nonmagnetic layer by selectively etching the portion of the nonmagnetic layer exposed from the opening of the encasing groove defining layer, the initial groove being intended to become the encasing groove later by undergoing etching; a step of forming a second mask for covering a portion of the initial groove in which the track width defining portion is to be placed later; and a second etching step for completing the encasing groove by etching a portion of the initial groove that is not covered with the second mask, using the second mask and the encasing groove defining layer as etching masks.

In the second method of manufacturing the magnetic head of the invention, the nonmagnetic film may be formed by chemical vapor deposition in which formation of a single atomic layer is repeated.

In the second method of manufacturing the magnetic head of the invention, the distance from the medium facing surface to the boundary between the track width defining portion and the wide portion may be within a range of 10 to 20 nm.

In the second method of manufacturing the magnetic head of the invention, the magnetic head may further include a substrate on which the encasing section, the pole layer and the coil are stacked. In this case, the end face of the track width defining portion may have a first side that is closer to the top surface of the substrate, and a second side opposite to the first side, the second side may have a width that defines the track width, and the end face of the track width defining portion may have a width that decreases with decreasing distance from the first side. In this case, the angle formed by the third side surface with respect to the direction orthogonal to the top surface of the substrate may be smaller than the angle formed by the first side surface with respect to the direction orthogonal to the top surface of the substrate, and the angle formed by the fourth side surface with respect to the direction orthogonal to the top surface of the substrate may be smaller than the angle formed by the second side surface with respect to the direction orthogonal to the top surface of the substrate.

A third method of manufacturing the magnetic head of the invention includes the steps of: forming a frame having a groove in which the pole layer is to be formed later; forming the nonmagnetic film in the groove of the frame; forming the pole layer in the groove of the frame after the nonmagnetic film is formed; removing the frame after the pole layer is formed; and completing the encasing section by forming the encasing layer around the pole layer and the nonmagnetic film after the frame is removed.

In the third method of manufacturing the magnetic head of the invention, the step of forming the nonmagnetic film includes: a step of forming a film to be etched, the film to be etched being intended to become the nonmagnetic film later by undergoing partial etching; a step of forming a mask for covering a portion of the film to be etched, the portion being intended to become the first and the second portion later; and a step of etching at least part of a portion of the film to be etched that is not covered with the mask. In this case, the film to be etched may be formed by chemical vapor deposition in which formation of a single atomic layer is repeated.

In the third method of manufacturing the magnetic head of the invention, the distance from the medium facing surface to the boundary between the track width defining portion and the wide portion may be within a range of 10 to 20 nm.

In the third method of manufacturing the magnetic head of the invention, the magnetic head may further include a substrate on which the encasing section, the pole layer and the coil are stacked. In this case, the end face of the track width defining portion may have a first side that is closer to the top surface of the substrate, and a second side opposite to the first side, the second side may have a width that defines the track width, and the end face of the track width defining portion may have a width that decreases with decreasing distance from the first side.

According to the magnetic head for perpendicular magnetic recording or the methods of manufacturing the same of the present invention, the distance from the medium facing surface to the boundary between the track width defining portion and the wide portion is within a range of 10 to 300 nm. Furthermore, according to the invention, the nonmagnetic film includes the first portion located between the first side surface and the first wall surface, and a second portion located between the second side surface and the second wall surface. The distance between the third side surface and the first wall surface is smaller than the distance between the first side surface and the first wall surface, while the distance between the fourth side surface and the second wall surface is smaller than the distance between the second side surface and the second wall surface. As a result, according to the invention, it is possible to define the track width with precision and to improve the write characteristics.

Other objects, features and advantages of the invention will become fully apparent from the following description.

DETAILED DESCRIPTION OF THE PREFERRED EMBODIMENTS

First Embodiment

Figure 5:
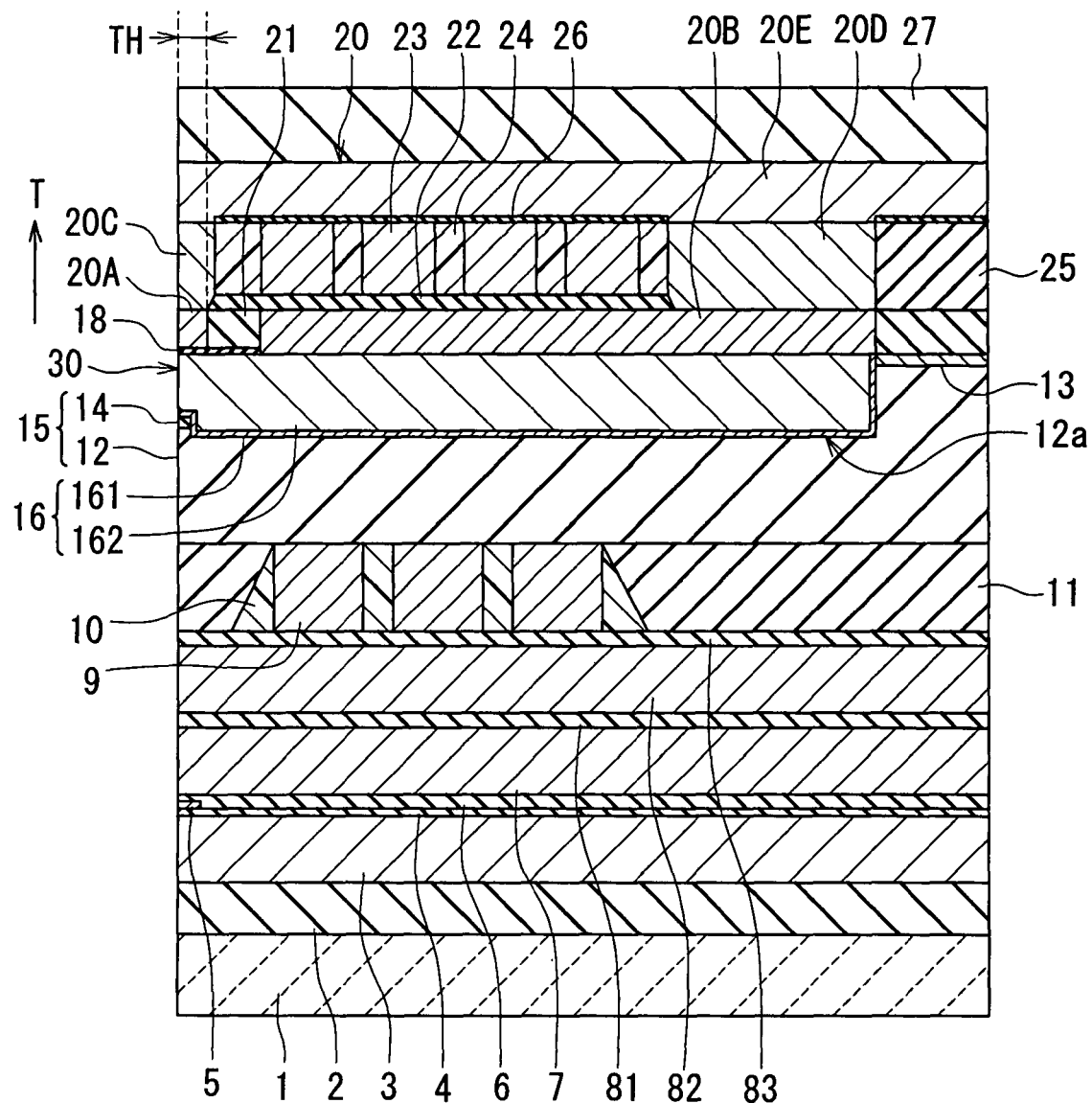
FIG. 5 is a cross-sectional view for illustrating the configuration of the magnetic head of the first embodiment of the invention.
Figure 6:
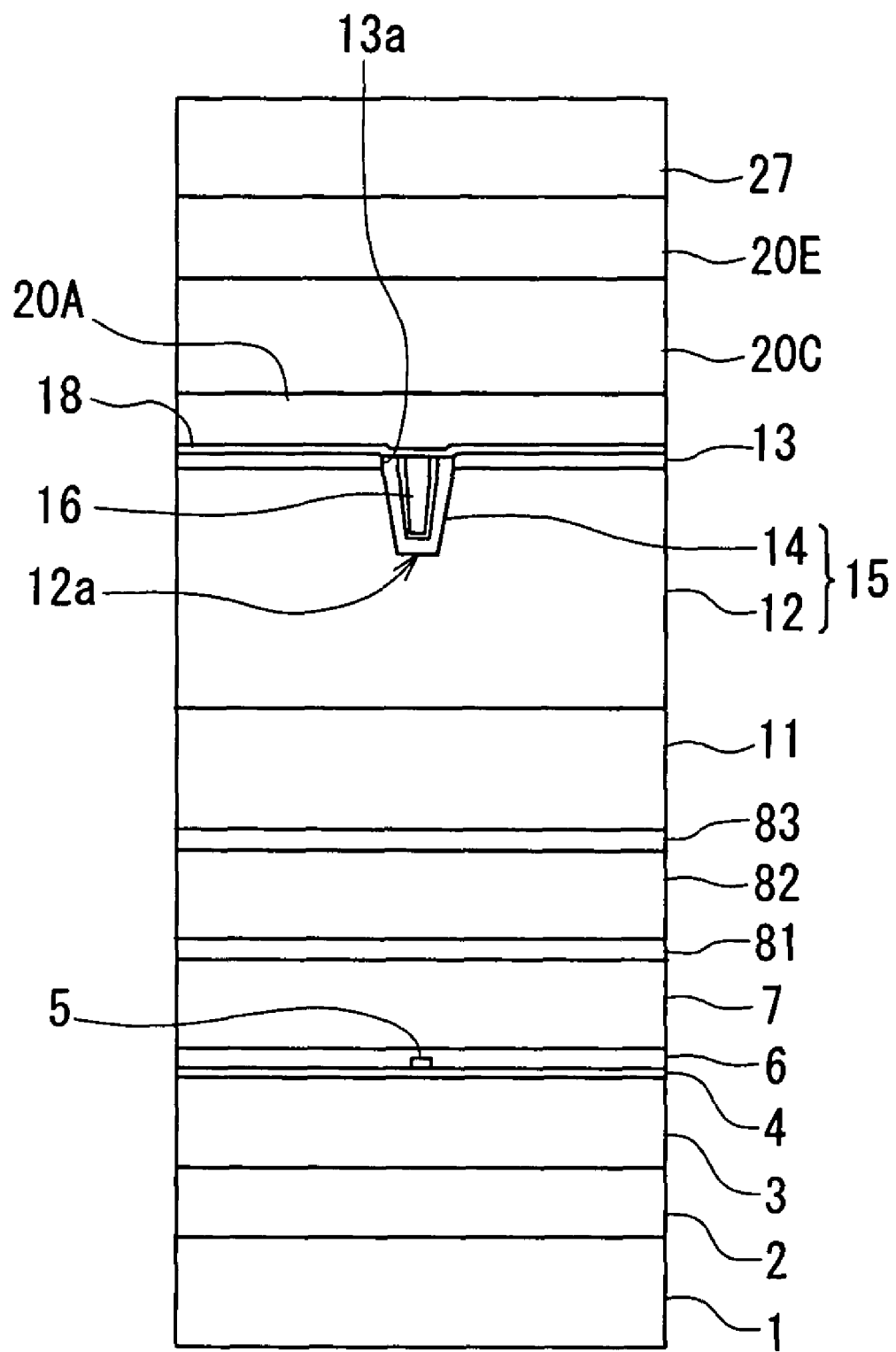
FIG. 6 is a front view of the medium facing surface of the magnetic head of the first embodiment of the invention.

Preferred embodiments of the invention will now be described in detail with reference to the drawings. Reference is now made to FIG. 5 and FIG. 6 to describe the configuration of a magnetic head for perpendicular magnetic recording of a first embodiment of the invention. FIG. 5 is a cross-sectional view for illustrating the configuration of the magnetic head for perpendicular magnetic recording of the embodiment. FIG. 6 is a front view of the medium facing surface of the magnetic head for perpendicular magnetic recording of the embodiment. FIG. 5 illustrates a cross section orthogonal to the medium facing surface and the top surface of the substrate. The arrow marked with T in FIG. 5 shows the direction of travel of a recording medium.

As shown in FIG. 5 and FIG. 6, the magnetic head for perpendicular magnetic recording (hereinafter simply called the magnetic head) of the embodiment includes: a substrate 1 made of a ceramic material such as aluminum oxide and titanium carbide ($Al_2O_3$—TiC); an insulating layer 2 made of an insulating material such as alumina ($Al_2O_3$) and disposed on the substrate 1; a bottom shield layer 3 made of a magnetic material and disposed on the insulating layer 2; a bottom shield gap film 4 that is an insulating film disposed on the bottom shield layer 3; a magnetoresistive (MR) element 5 as a read element disposed on the bottom shield gap film 4; a top shield gap film 6 that is an insulating film disposed on the MR element 5; and a first top shield layer 7 made of a magnetic material and disposed on the top shield gap film 6.

The MR element 5 has an end that is located in the medium facing surface 30 that faces toward the recording medium. The MR element 5 may be an element made of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of a current-in-plane (CIP) type wherein a current used for detecting magnetic signals is fed in the direction nearly parallel to the plane of each layer making up the GMR element, or may be of a current-perpendicular-to-plane (CPP) type wherein a current used for detecting magnetic signals is fed in the direction nearly perpendicular to the plane of each layer making up the GMR element.

The magnetic head further includes a nonmagnetic layer 81 and a second top shield layer 82 that are disposed in this order on the first top shield layer 7. The nonmagnetic layer 81 is made of a nonmagnetic material such as alumina. The second top shield layer 82 is made of a magnetic material. The portion from the bottom shield layer 3 to the second top shield layer 82 makes up a read head.

The magnetic head further includes: an insulating layer 83 made of an insulating material and disposed on the second top shield layer 82; a coil 9 disposed on the insulating layer 83; an insulating layer 10 made of an insulating material and disposed around the coil 9 and in the space between the respective adjacent turns of the coil 9; and an insulating layer 11 made of an insulating material and disposed around the insulating layer 10. The coil 9 is planar spiral-shaped. The coil 9 and the insulating layers 10 and 11 have flattened top surfaces. The insulating layers 83 and 11 are made of alumina, for example. The insulating layer 10 is made of photoresist, for example. The coil 9 is made of a conductive material such as copper.

The magnetic head further includes a pole layer 16, and an encasing section 15 that accommodates at least part of the pole layer 16. The encasing section 15 includes an encasing layer 12 and a nonmagnetic film 14. The encasing layer 12 is made of a nonmagnetic material and disposed on the flattened top surfaces of the coil 9 and the insulating layers 10 and 11. The encasing layer 12 has an encasing groove 12a that opens in the top surface of the encasing layer 12 and that accommodates the at least part of the pole layer 16. The nonmagnetic film 14 is made of a nonmagnetic material and disposed in the encasing groove 12a at a position between the encasing layer 12 and the pole layer 16.

The material of the encasing layer 12 may be an insulating material such as alumina, silicon oxide ($SiO_x$), or silicon oxynitride (SiON), or a nonmagnetic metal material such as Ru, Ta, Mo, Ti, W, NiCu, NiB or NiP. In the case where a nonmagnetic metal material is employed as the material of the encasing layer 12, it is necessary to provide an insulating layer between the coil 9 and the encasing layer 12.

The magnetic head further includes an encasing groove defining layer 13 disposed on the top surface of the encasing layer 12. The encasing groove defining layer 13 is a layer for defining the shape of the encasing groove 12a. The encasing groove defining layer 13 has a penetrating opening 13a, and the edge of the opening 13a is located directly above the edge of the encasing groove 12a in the top surface of the encasing layer 12.

It suffices that the encasing groove defining layer 13 is made of such a material that, when etching is performed to form the encasing groove 12a in a nonmagnetic layer that is to become the encasing layer 12, the etching rate of the material of the layer 13 is lower than that of this nonmagnetic layer. For example, if the nonmagnetic layer to become the encasing layer 12 is made of alumina, the material of the encasing groove defining layer 13 can be SiC or a nonmagnetic metal material such as Ta, Mo, W, Ti, Ru, Rh, Re, Pt, Pd, Ir, NiCr, NiP, NiB, $WSi_2$, $TaSi_2$, $TiSi_2$, TiN or TiW. If the nonmagnetic layer to become the encasing layer 12 is made of silicon oxide, for example, the material of the encasing groove defining layer 13 can be alumina as well as SiC and the above-listed nonmagnetic metal materials.

If the encasing groove defining layer 13 is made of SiC, it is possible that, when etching is performed to form the opening 13a in the encasing groove defining layer 13, the substance removed by the etching is prevented from depositing on the opening 13a and it is thus possible to precisely form the opening 13a. As a result, it is also possible to precisely form the encasing groove 12a.

The nonmagnetic film 14 is disposed in the encasing groove 12a of the encasing layer 12 and in the opening 13a of the encasing groove defining layer 13. The material of the nonmagnetic film 14 can be an insulating material, a semiconductor material or a metal material, for example. The insulating material for use as the material of the nonmagnetic film 14 can be any of alumina, silicon oxide ($SiO_x$), and silicon oxynitride (SiON), for example. The semiconductor material for use as the material of the nonmagnetic film 14 can be polycrystalline silicon or amorphous silicon, for example. The metal material for use as the material of the nonmagnetic film 14 can be a nonmagnetic metal material the same as that used for the encasing groove defining layer 13.

The pole layer 16 includes a first layer 161 located closer to the surface of the groove 12a, and a second layer 162 located farther from the surface of the groove 12a. Each of the first layer 161 and the second layer 162 is made of a magnetic metal material. The first layer 161 can be made of any of CoFeN, CoNiFe, NiFe and CoFe, for example. The second layer 162 can be made of any of NiFe, CoNiFe and CoFe, for example.

The magnetic head further includes a gap layer 18 disposed on the top surfaces of the encasing groove defining layer 13, the nonmagnetic film 14 and the pole layer 16. The gap layer 18 has an opening located away from the medium facing surface 30. The gap layer 18 can be made of an insulating material such as alumina or a nonmagnetic metal material such as Ru, NiCu, Ta, W, NiB or NiP.

The magnetic head further includes a shield 20. The shield 20 includes: a first layer 20A disposed on the gap layer 18; a second layer 20C disposed on the first layer 20A; a yoke layer 20B disposed on a portion of the pole layer 16 where the opening of the gap layer 18 is formed; a coupling layer 20D disposed on the yoke layer 20B; and a third layer 20E disposed to couple the second layer 20C and the coupling layer 20D to each other. The first layer 20A, the yoke layer 20B, the second layer 20C, the coupling layer 20D and the third layer 20E are each made of a magnetic material. These layers 20A to 20E can be made of any of CoFeN, CoNiFe, NiFe and CoFe, for example.

The magnetic head further includes a nonmagnetic layer 21 made of a nonmagnetic material and disposed around the yoke layer 20B. Part of the nonmagnetic layer 21 is located on a side of the first layer 20A. For example, the nonmagnetic layer 21 is made of an inorganic insulating material such as alumina or coating glass. Alternatively, the nonmagnetic layer 21 may be made up of a layer of a nonmagnetic metal material and a layer of an insulating material disposed thereon. In this case, the nonmagnetic metal material may be a refractory metal such as Ta, Mo, Nb, W, Cr, Ru, NiCu, Pd, or Hf, for example.

The magnetic head further includes: an insulating layer 22 disposed on regions of the top surfaces of the yoke layer 20B and the nonmagnetic layer 21 in which a coil 23 described later is to be disposed; the coil 23 disposed on the insulating layer 22; an insulating layer 24 disposed around the coil 23 and in the space between the respective adjacent turns of the coil 23; an insulating layer 25 disposed around the insulating layer 24; and an insulating layer 26 disposed on the coil 23 and the insulating layers 24 and 25. The coil 23 is planar spiral-shaped. Part of the coil 23 passes between the second layer 20C and the coupling layer 20D. The coil 23 is made of a conductive material such as copper. The second layer 20C, the coupling layer 20D and the insulating layers 24 and 25 have flattened top surfaces. The insulating layer 24 is made of photoresist, for example. The insulating layers 22, 25 and 26 are made of alumina, for example.

The portion from the coil 9 to the third layer 20E of the shield 20 makes up a write head. The magnetic head further includes a protection layer 27 formed to cover the shield 20. The protection layer 27 is made of alumina, for example.

As described so far, the magnetic head of the embodiment includes the medium facing surface 30 that faces toward the recording medium, the read head, and the write head. The read head and the write head are stacked on the substrate 1. The read head is disposed backward along the direction T of travel of the recording medium (that is, disposed closer to the air inflow end of the slider), while the write head is disposed forward along the direction T of travel of the recording medium (that is, disposed closer to the air outflow end of the slider).

The read head includes: the MR element 5 as the read element; the bottom shield layer 3 and the top shield layer 7 for shielding the MR element 5, the shield layers 3 and 7 having portions that are located on a side of the medium facing surface 30 and that are opposed to each other with the MR element 5 located therebetween; the bottom shield gap film 4 disposed between the MR element 5 and the bottom shield layer 3; and the top shield gap film 6 disposed between the MR element 5 and the top shield layer 7.

The write head includes the coil 9, the encasing section 15, the encasing groove defining layer 13, the pole layer 16, the gap layer 18, the shield 20, and the coil 23. The encasing section 15 includes the encasing layer 12 and the nonmagnetic film 14. The coils 9 and 23 generate a magnetic field corresponding to data to be written on the recording medium. The coil 9 is not an essential component of the write head and may be dispensed with.

The pole layer 16 has an end face located in the medium facing surface 30. The pole layer 16 allows a magnetic flux corresponding to the magnetic field generated by the coil 23 to pass therethrough and generates a write magnetic field for writing the data on the recording medium by means of the perpendicular magnetic recording system.

The shield 20 has an end face located in the medium facing surface 30, and is coupled to the pole layer 16 at a position away from the medium facing surface 30. The gap layer 18 is made of a nonmagnetic material, and is provided between the pole layer 16 and the shield 20.

In the medium facing surface 30, the end face of the shield 20 is disposed forward of the end face of the pole layer 16 along the direction T of travel of the recording medium with a predetermined distance provided therebetween by the thickness of the gap layer 18. The thickness of the gap layer 18 is within a range of 20 to 50 nm, for example. At least part of the coil 23 is located between the pole layer 16 and the shield 20, and is insulated from the pole layer 16 and the shield 20.

At least part of the pole layer 16 is placed in the encasing groove 12a of the encasing layer 12. To be specific, in the embodiment, the pole layer 16 is placed in the encasing groove 12a of the encasing layer 12 and in the opening 13a of the encasing groove defining layer 13, with the nonmagnetic film 14 located between the pole layer 16 and each of the encasing groove 12a and the opening 13a.

The shield 20 includes: the first layer 20A disposed adjacent to the gap layer 18; the second layer 20C located on a side of the first layer 20A farther from the gap layer 18; the yoke layer 20B disposed on the portion of the pole layer 16 where the opening of the gap layer 18 is formed; the coupling layer 20D disposed on the yoke layer 20B; and the third layer 20E disposed to couple the second layer 20C and the coupling layer 20D to each other. The second layer 20C is disposed between the medium facing surface 30 and at least part of the coil 23. The coil 23 is wound around the coupling layer 20D. In the example shown in FIG. 5, part of the yoke layer 20B is disposed between the pole layer 16 and part of the coil 23. However, in place of such a yoke layer 20B, there may be provided a coupling layer that has a plane geometry the same as that of the coupling layer 20D and that couples the pole layer 16 and the coupling layer 20D to each other.

The first layer 20A has a first end located in the medium facing surface 30 and a second end opposite to the first end. The second layer 20C also has a first end located in the medium facing surface 30 and a second end opposite to the first end. Throat height TH is the distance from the medium facing surface 30 to a point at which the space between the pole layer 16 and the shield 20 starts to increase when seen from the medium facing surface 30. In the embodiment, the throat height TH is the distance from the medium facing surface 30 to an end of the first layer 20A farther from the medium facing surface 30. The throat height TH is within a range of 0.05 to 0.3 μm, for example.

Figure 1:
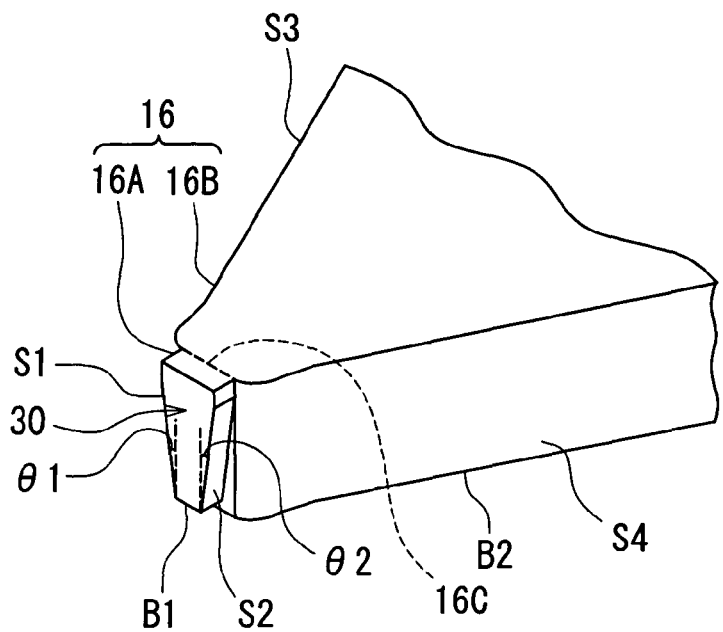
FIG. 1 is a perspective view of part of a pole layer of a magnetic head of a first embodiment of the invention.
Figure 2:
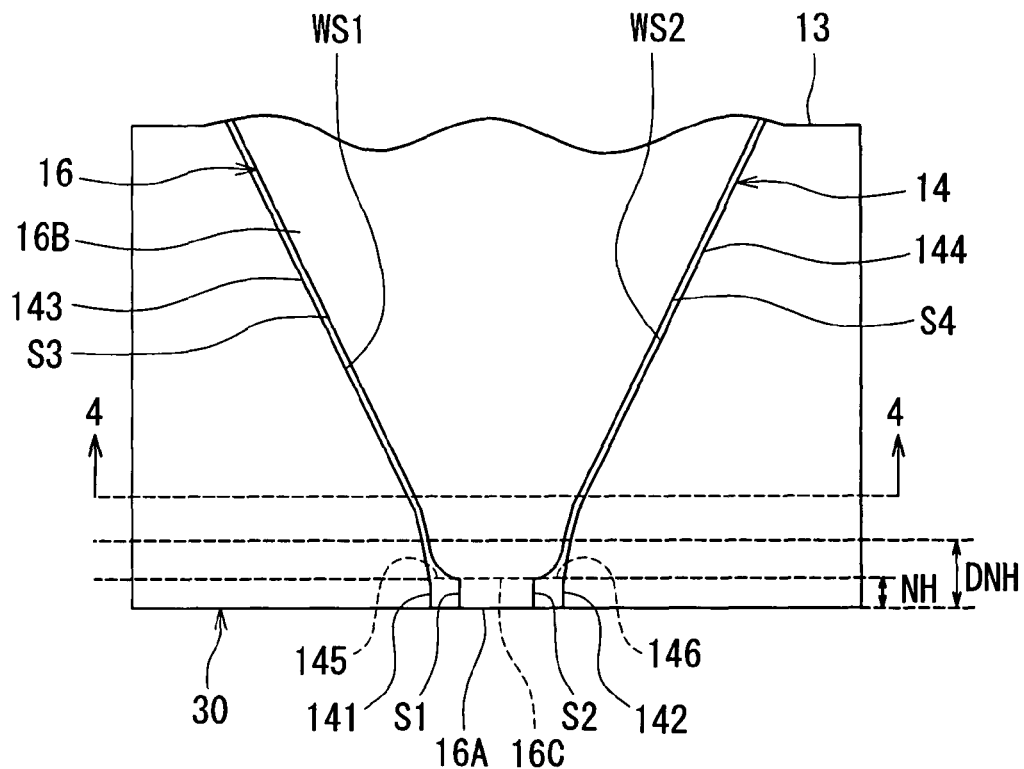
FIG. 2 is a top view of part of the pole layer of the magnetic head of the first embodiment of the invention.
Figure 3:
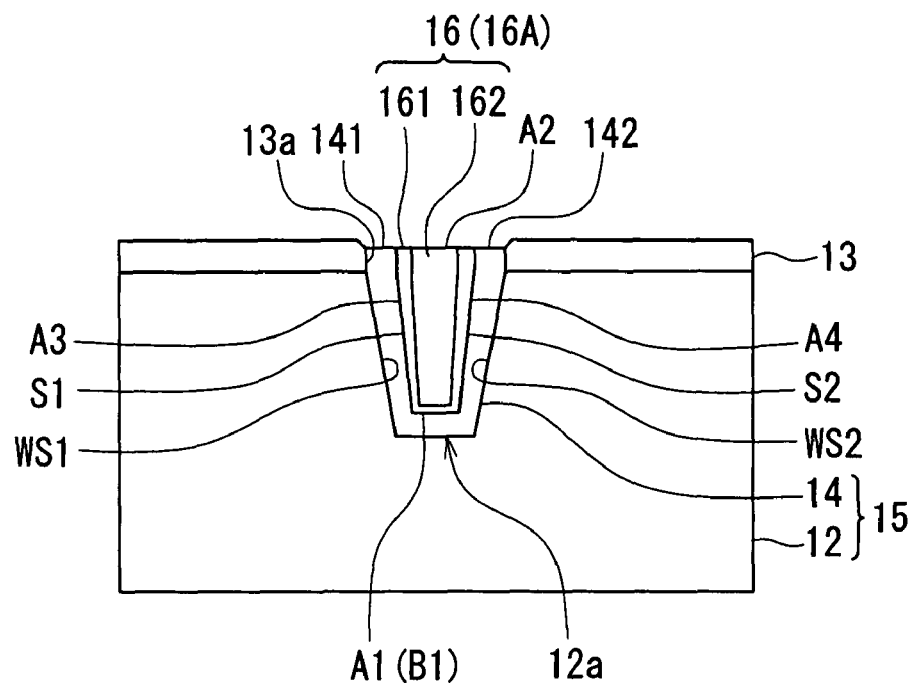
FIG. 3 is a front view of part of the medium facing surface of the magnetic head of the first embodiment of the invention.
Figure 4:
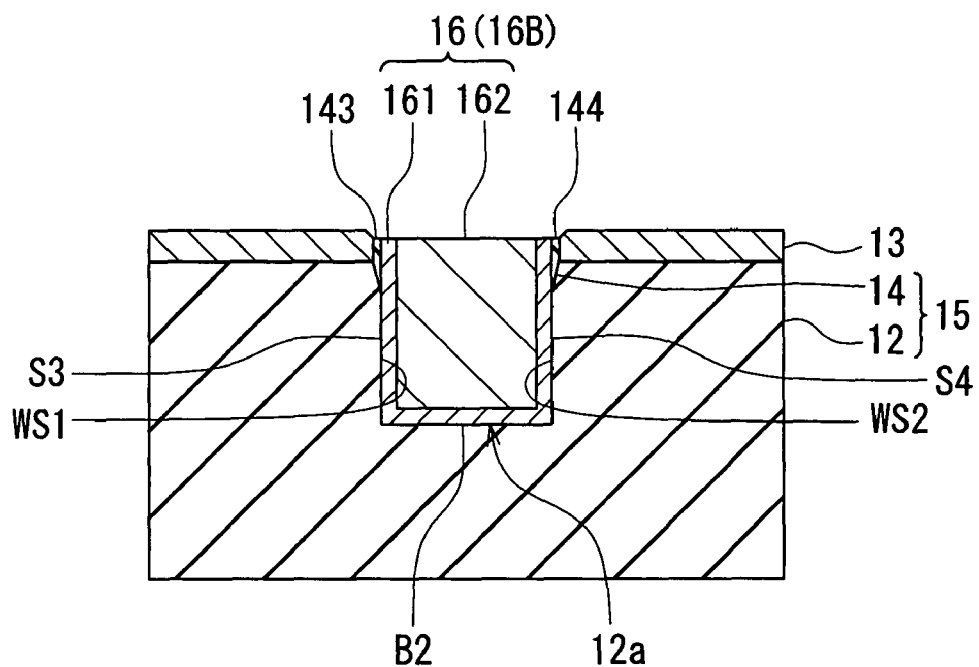
FIG. 4 is a cross-sectional view illustrating part of a cross section of the magnetic head of the first embodiment of the invention, the cross section being parallel to the medium facing surface.

Reference is now made to FIG. 1 to FIG. 4 to describe the shapes of the pole layer 16 and the encasing section 15 in detail. FIG. 1 is a perspective view of part of the pole layer 16 near the medium facing surface 30. FIG. 2 is a top view of part of the pole layer 16 near the medium facing surface 30. FIG. 3 is a front view of part of the medium facing surface 30 of the magnetic head of the embodiment. FIG. 4 is a cross-sectional view illustrating part of a cross section of the magnetic head of the embodiment parallel to the medium facing surface 30. FIG. 4 illustrates the cross section taken along line 4-4 of FIG. 2.

As shown in FIG. 1 and FIG. 2, the pole layer 16 includes: a track width defining portion 16A having an end face located in the medium facing surface 30 and an end opposite to the end face; and a wide portion 16B connected to the end of the track width defining portion 16A and having a width greater than that of the track width defining portion 16A. The end face of the track width defining portion 16A located in the medium facing surface 30 defines the track width. In the example shown in FIG. 2, the track width defining portion 16A has a width that does not substantially change in accordance with the distance from the medium facing surface 30. The distance from the medium facing surface 30 to the boundary 16C between the track width defining portion 16A and the wide portion 16B is within a range of 10 to 300 nm. In the embodiment, the distance from the medium facing surface 30 to the point at which the width of the pole layer 16 starts to increase is called a neck height NH. In the example shown in FIG. 2, the neck height NH is equal to the distance from the medium facing surface 30 to the boundary 16C between the track width defining portion 16A and the wide portion 16B. In the example shown in FIG. 2, the distance from the medium facing surface 30 to the boundary 16C between the track width defining portion 16A and the wide portion 16B, that is, the neck height NH, may be within a range of 10 to 20 nm.

In FIG. 2, "DNH" denotes a neck height that would be obtained in the case where the pole layer 16 is formed in an encasing groove patterned by photolithography, without forming the nonmagnetic film 14 (such a neck height is hereinafter referred to as design neck height). In the example shown in FIG. 2, the neck height NH is smaller than the design neck height DNH.

Figure 16:
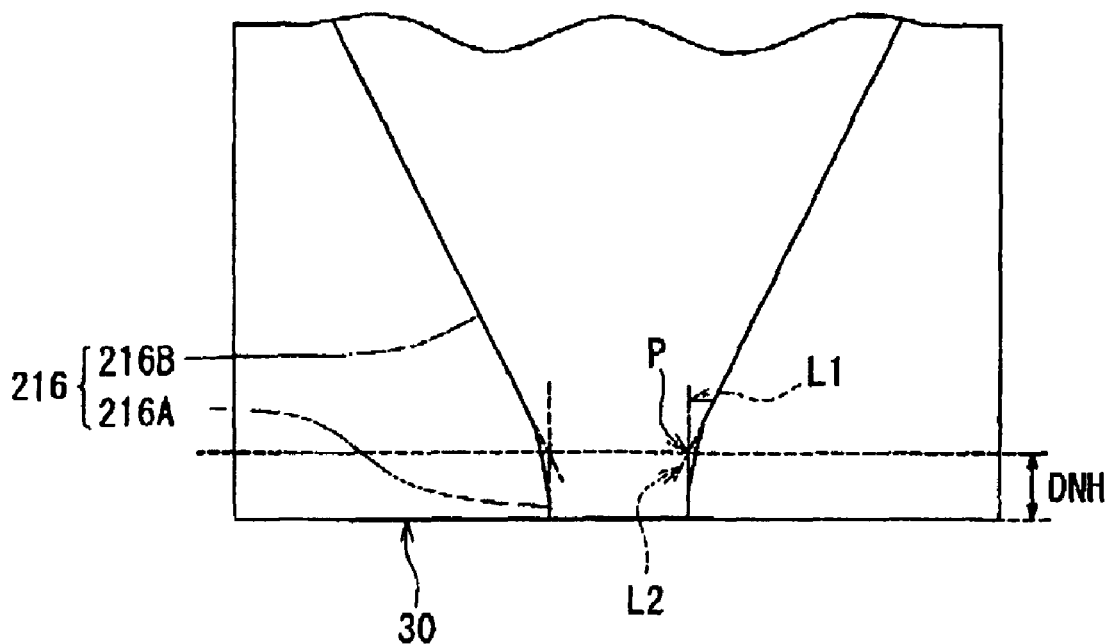
FIG. 16 is a top view of part of a pole layer of a first comparative example.

Reference is now made to FIG. 16 to describe the design neck height DNH. FIG. 16 illustrates a pole layer 216 formed in an encasing groove patterned by photolithography without forming the nonmagnetic film 14. The pole layer 216 includes: a track width defining portion 216A having an end face located in the medium facing surface 30 and an end opposite to the end face; and a wide portion 216B connected to the end of the track width defining portion 216A and having a width greater than that of the track width defining portion 216A. In the case where the pole layer 216 is formed in an encasing groove patterned by photolithography without forming the nonmagnetic film 14, it is difficult to precisely form a portion of the side surface of the pole layer 216 near the boundary between the track width defining portion 216A and the wide portion 216B. Consequently, as shown in FIG. 16, the portion of the pole layer 216 near the boundary between the track width defining portion 216A and the wide portion 216B is likely to have such a shape that the width gradually increases with increasing distance from the medium facing surface 30. Here, the position of the boundary between the track width defining portion 216A and the wide portion 216B and the design neck height DNH are defined as follows. In the top surface of the pole layer 216, the intersection point of imaginary straight lines L1 and L2 is represented by P. The imaginary straight line L1 passes through the intersection point of the medium facing surface 30 and the side portion of the track width defining portion 216A, and extends in the direction orthogonal to the medium facing surface 30. The imaginary straight line L2 extends from a straight-line portion of the side portion of the wide portion 216B contiguous to the side portion of the track width defining portion 216A in the direction in which this straight-line portion extends. The position of an imaginary plane that passes through this point P and is parallel to the medium facing surface 30 is defined as the position of the boundary between the track width defining portion 216A and the wide portion 216B. The distance between the medium facing surface 30 and the point P is defined as the design neck height DNH.

As shown in FIG. 2, the track width defining portion 16A has a first side surface S1 and a second side surface S2 that are located on opposite sides in the direction of track width. The wide portion 16B has a third side surface S3 contiguous to the first side surface S1, and a fourth side surface S4 contiguous to the second side surface S2.

As shown in FIG. 2 to FIG. 4, the encasing layer 12 has a first wall surface WS1 and a second wall surface WS2 that form the encasing groove 12a. In FIG. 2, the lines marked with WS1 and WS2 respectively indicate the positions of the wall surfaces WS1 and WS2 in the top surface of the encasing layer 12. The first wall surface WS1 is opposed to the first side surface S1 and the third side surface S3, while the second wall surface WS2 is opposed to the second side surface S2 and the fourth side surface S4.

The nonmagnetic film 14 includes: a first portion 141 located between the first side surface S1 and the first wall surface WS1; a second portion 142 located between the second side surface S2 and the second wall surface WS2; a third portion 143 located between the third side surface S3 and the first wall surface WS1; and a fourth portion 144 located between the fourth side surface S4 and the second wall surface WS2.

As shown in FIG. 4, the third portion 143 does not occupy the entire region between the third side surface S3 and the first wall surface WS1, but occupies only part of this entire region, the part being near the top surface of the encasing layer 12. As a result, the third side surface S3 touches the first wall surface WS1 in the region in which the third portion 143 does not exist in the entire region between the third side surface S3 and the first wall surface WS1. Similarly, the fourth portion 144 does not occupy the entire region between the fourth side surface S4 and the second wall surface WS2, but occupies only part of this entire region, the part being near the top surface of the encasing layer 12. As a result, the fourth side surface S4 touches the second wall surface WS2 in the region in which the fourth portion 144 does not exist in the entire region between the fourth side surface S4 and the second wall surface WS2.

In the nonmagnetic film 14, the thickness of the third portion 143 is smaller than the thickness of the first portion 141, and the thickness of the fourth portion 144 is smaller than the thickness of the second portion 142. As a result, the distance between the third side surface S3 and the first wall surface WS1 is smaller than the distance between the first side surface S1 and the first wall surface WS1, and the distance between the fourth side surface S4 and the second wall surface WS2 is smaller than the distance between the second side surface S2 and the second wall surface WS2.

As shown in FIG. 2, the thickness of each of the first portion 141 and the second portion 142 is substantially uniform, regardless of the distance from the medium facing surface 30. The thickness of each of the first portion 141 and the second portion 142 is within a range of 20 to 80 nm, for example. However, the thickness of each of the first portion 141 and the second portion 142 is not limited to this range but can be of any value, in accordance with the track width. In a region near the boundary 145 between the first portion 141 and the third portion 143, the thickness of the third portion 143 gradually decreases with increasing distance from the medium facing surface 30, whereas in the other region the thickness of the third portion 143 is substantially uniform, regardless of the distance from the medium facing surface 30. Similarly, in a region near the boundary 146 between the second portion 142 and the fourth portion 144, the thickness of the fourth portion 144 gradually decreases with increasing distance from the medium facing surface 30, whereas in the other region the thickness of the fourth portion 144 is substantially uniform, regardless of the distance from the medium facing surface 30.

It is preferred that the region in which the thickness of the third portion 143 gradually decreases with increasing distance from the medium facing surface 30 and the region in which the thickness of the fourth portion 144 gradually decreases with increasing distance from the medium facing surface 30 each have a length of 20 nm or smaller as taken in the direction orthogonal to the medium facing surface 30. This length may be zero.

As shown in FIG. 3, the end face of the track width defining portion 16A located in the medium facing surface 30 has: a first side A1 that is closer to the top surface of the substrate 1; a second side A2 opposite to the first side A1; a third side A3 connecting an end of the first side A1 and an end of the second side A2 to each other; and a fourth side A4 connecting the other end of the first side A1 and the other end of the second side A2 to each other. The second side A2 has a width that defines the track width. The width of the end face of the track width defining portion 16A located in the medium facing surface 30 decreases with decreasing distance from the first side A1. Each of the third side A3 and the fourth side A4 is inclined with respect to the direction orthogonal to the top surface of the substrate 1. The angle formed by each of the third side A3 and the fourth side A4 with respect to the direction orthogonal to the top surface of the substrate 1 is preferably within a range of 5 to 15 degrees, for example, and more preferably within a range of 8 to 12 degrees.

The length of the second side A2, that is, the track width, is within a range of 0.05 to 0.20 µm, for example. The thickness of the pole layer 16 taken in the medium facing surface 30 is within a range of 0.15 to 0.3 µm, for example.

As shown in FIG. 1, the distance between the first side surface S1 and the second side surface S2 taken in the direction of track width decreases with decreasing distance from the top surface of the substrate 1. The angle θ1 formed by the first side surface S1 with respect to the direction orthogonal to the top surface of the substrate 1 is equal to the angle formed by the third side A3 with respect to the direction orthogonal to the top surface of the substrate 1. Similarly, the angle θ2 formed by the second side surface S2 with respect to the direction orthogonal to the top surface of the substrate 1 is equal to the angle formed by the fourth side A4 with respect to the direction orthogonal to the top surface of the substrate 1. Therefore, each of the angles θ1 and θ2 is preferably within the range of 5 to 15 degrees, for example, and more preferably within the range of 8 to 12 degrees.

The distance between the third side surface S3 and the fourth side surface S4 taken in the direction of track width may be uniform regardless of the distance from the top surface of the substrate 1, or may decrease or increase with decreasing distance from the top surface of the substrate 1.

In the case where the distance between the third side surface S3 and the fourth side surface S4 taken in the direction of track width is uniform regardless of the distance from the top surface of the substrate 1, the angle formed by the third side surface S3 with respect to the direction orthogonal to the top surface of the substrate 1 and the angle formed by the fourth side surface S4 with respect to the direction orthogonal to the top surface of the substrate 1 are each zero degree.

In the embodiment, in the case where the distance between the third side surface S3 and the fourth side surface S4 taken in the direction of track width decreases with decreasing distance from the top surface of the substrate 1, the angle formed by the third side surface S3 with respect to the direction orthogonal to the top surface of the substrate 1 is smaller than the angle θ1 formed by the first side surface S1 with respect to the direction orthogonal to the top surface of the substrate 1, and the angle formed by the fourth side surface S4 with respect to the direction orthogonal to the top surface of the substrate 1 is smaller than the angle θ2 formed by the second side surface S2 with respect to the direction orthogonal to the top surface of the substrate 1. In this case, it is preferred that each of the angle formed by the third side surface S3 with respect to the direction orthogonal to the top surface of the substrate 1 and the angle formed by the fourth side surface S4 with respect to the direction orthogonal to the top surface of the substrate 1 be as close as possible to zero degree.

FIG. 2 illustrates an example in which the distance from the medium facing surface 30 to the boundary 16C between the track width defining portion 16A and the wide portion 16B is smaller than the design neck height DNH. However, the distance from the medium facing surface 30 to the boundary 16C between the track width defining portion 16A and the wide portion 16B may be either equal to or greater than the design neck height DNH. Such examples will be illustrated later as a first and a second modification example.

As shown in FIG. 1 and FIG. 3, the track width defining portion 16A has a first bottom surface B1 that is a surface closer to the top surface of the substrate 1. On the other hand, as shown in FIG. 1 and FIG. 4, the wide portion 16B has a second bottom surface B2 that is a surface closer to the top surface of the substrate 1. The second bottom surface B2 is located closer to the top surface of the substrate 1 than is the first bottom surface B1.

Reference is now made to FIG. 7A to FIG. 14B to describe a method of manufacturing the magnetic head of the embodiment. In FIG. 7A to FIG. 14B, "ABS" indicates an imaginary plane located at the target position of the medium facing surface 30. The portions located below the encasing layer 12 are omitted in FIG. 7A to FIG. 14B.

In the method of manufacturing the magnetic head of the embodiment, first, as shown in FIG. 5, the insulating layer 2, the bottom shield layer 3 and the bottom shield gap film 4 are formed in this order on the substrate 1. Next, the MR element 5 and leads (not shown) connected to the MR element 5 are formed on the bottom shield gap film 4. Next, the MR element 5 and the leads are covered with the top shield gap film 6. Next, the top shield layer 7, the nonmagnetic layer 81, the second top shield layer 82 and the insulating layer 83 are formed in this order on the top shield gap film 6. Next, the coil 9 and the insulating layers 10 and 11 are formed on the insulating layer 83. Next, the top surfaces of the coil 9 and the insulating layers 10 and 11 are flattened by chemical mechanical polishing (hereinafter referred to as CMP), for example.

Figure 7A:
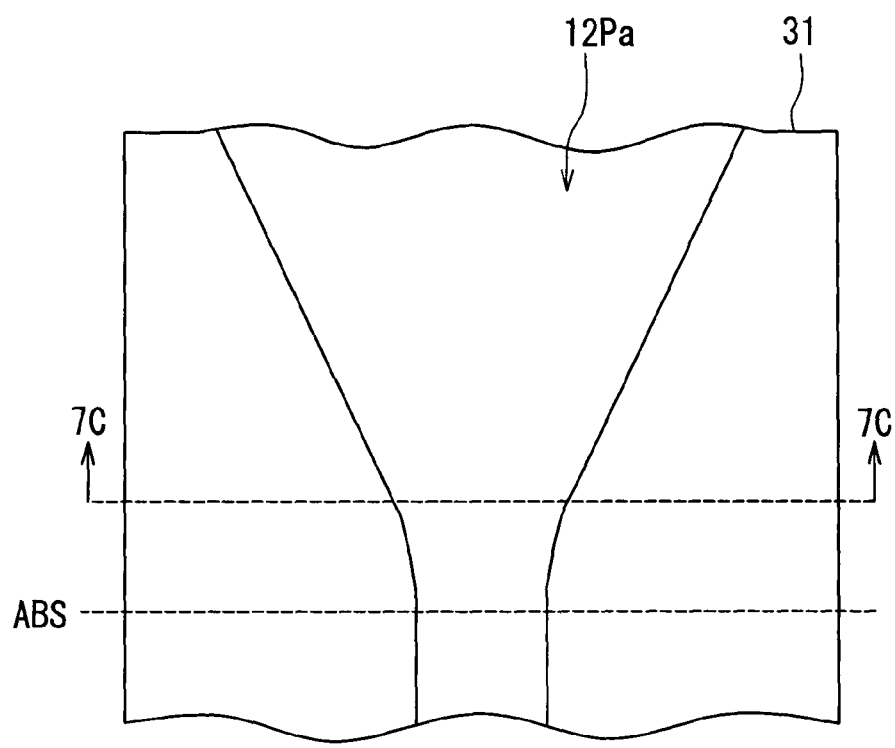
FIG. 7A to FIG. 7D are views for illustrating a step of a method of manufacturing the magnetic head of the first embodiment of the invention.
Figure 7B:
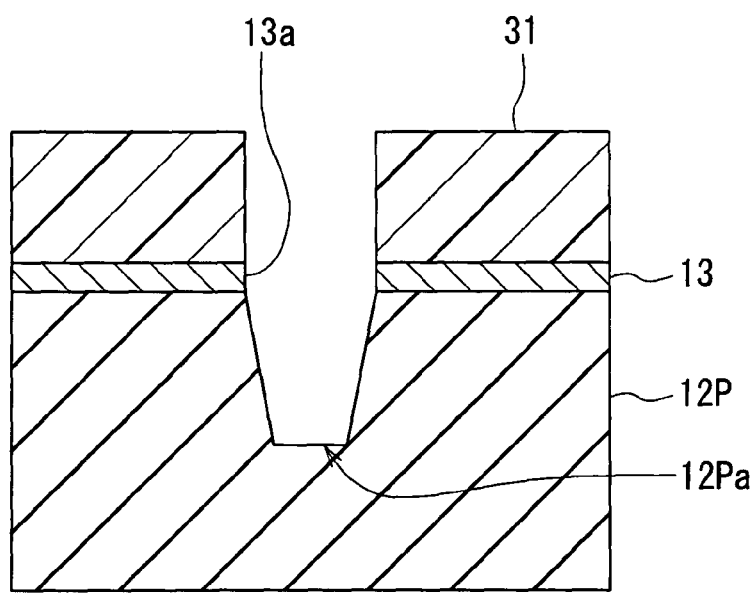
Figure 7C:
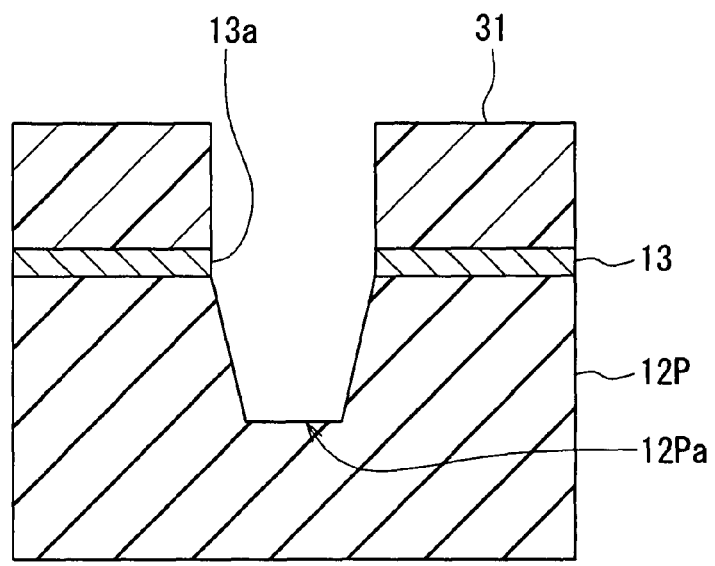
Figure 7D:
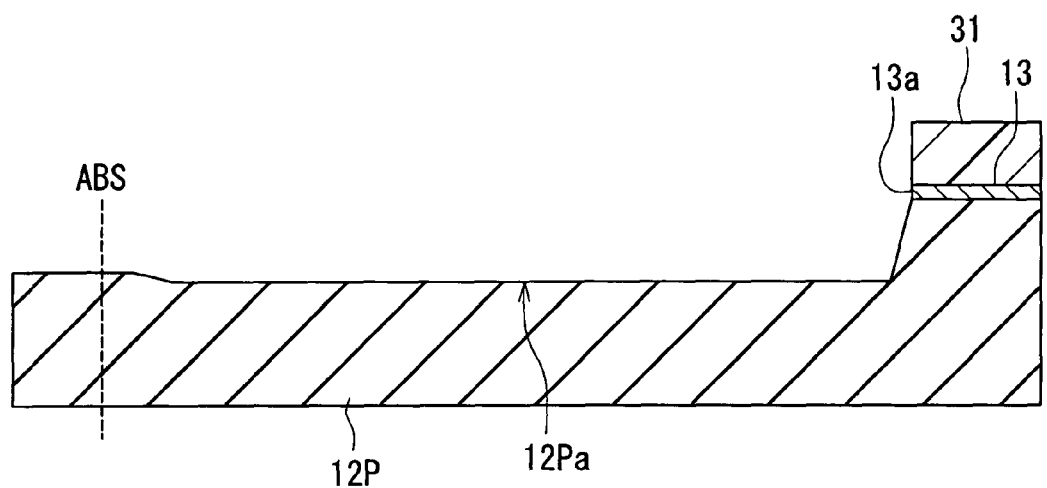

FIG. 7A to FIG. 7D illustrate the next step. FIG. 7A is a top view of a stack of layers obtained in the course of the manufacture of the magnetic head. FIG. 7B is a cross-sectional view illustrating a cross section of the stack of layers of FIG. 7A taken in the plane ABS. FIG. 7C is a cross-sectional view of the stack of layers of FIG. 7A taken along line 7C-7C. FIG. 7D is a cross-sectional view illustrating a cross section of the stack of layers of FIG. 7A orthogonal to the plane ABS and the top surface of the substrate.

In this step, first, a nonmagnetic layer 12P is formed on the flattened top surfaces of the coil 9 and the insulating layers 10 and 11, the nonmagnetic layer 12P being intended to become the encasing layer 12 later by undergoing formation of the encasing groove 12a therein. Next, the encasing groove defining layer 13 is formed by sputtering, for example, on the nonmagnetic layer 12P. The encasing groove defining layer 13 has a thickness within a range of 20 to 100 nm, for example.

Next, a mask 31 for forming the opening 13a in the encasing groove defining layer 13 is formed on the encasing groove defining layer 13. The mask 31 has an opening having a shape corresponding to the opening 13a and the encasing groove 12a. The mask 31 is formed by patterning a photoresist layer by photolithography. Next, the encasing groove defining layer 13 is selectively etched using the mask 31. The penetrating opening 13a is thereby formed in the encasing groove defining layer 13. The opening 13a has a shape corresponding to the plane geometry of the pole layer 16 to be formed later.

Next, a portion of the nonmagnetic layer 12P exposed from the opening 13a of the encasing groove defining layer 13 is selectively etched, using the mask 31 and the encasing groove defining layer 13 as etching masks, to thereby form in the nonmagnetic layer 12P an initial groove 12Pa that is to become the encasing groove 12a later by undergoing etching. Next, the mask 31 is removed. The edge of the opening 13a of the encasing groove defining layer 13 is located directly above the edge of the initial groove 12Pa in the top surface of the nonmagnetic layer 12P.

The etching of the nonmagnetic layer 12P is performed by reactive ion etching or ion beam etching, for example. This step is performed such that a portion of the wall surface of the initial groove 12Pa that is to be opposed to the first and the second side surface S1 and S2 of the pole layer 16 forms an angle within a range of 5 to 15 degrees, for example, or preferably within a range of 8 to 12 degrees, with respect to the direction orthogonal to the top surface of the substrate 1.

Figure 8A:
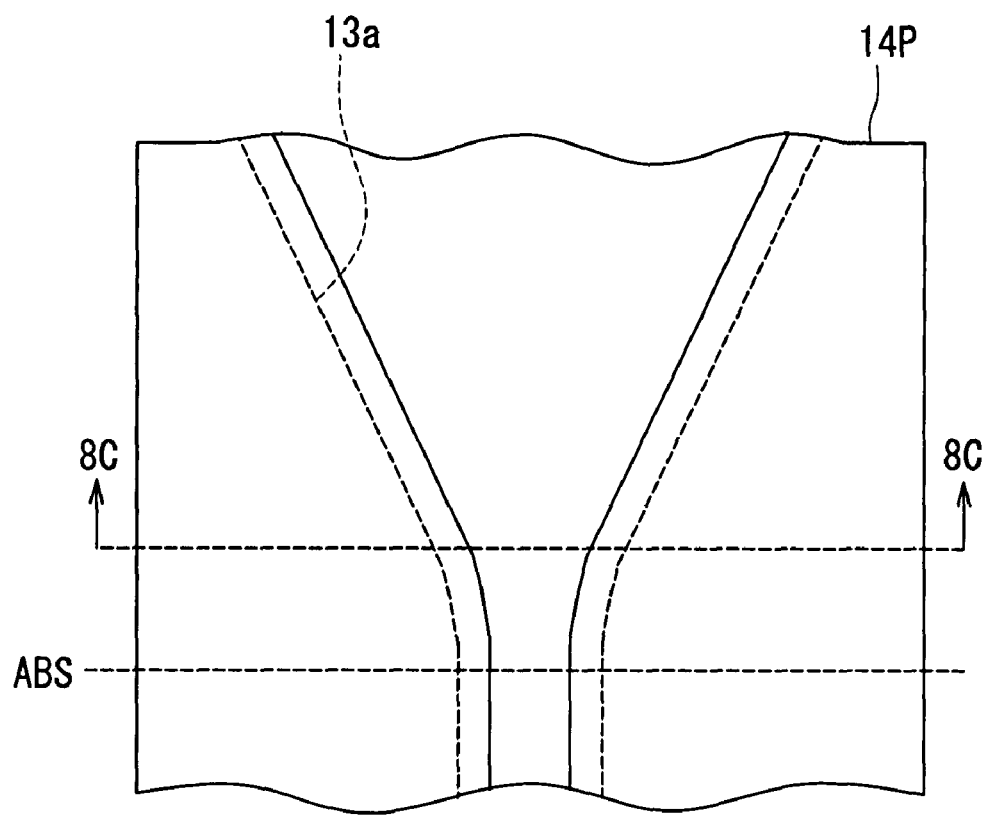
FIG. 8A to FIG. 8D are views for illustrating a step that follows the step of FIG. 7A to FIG. 7D.
Figure 8B:
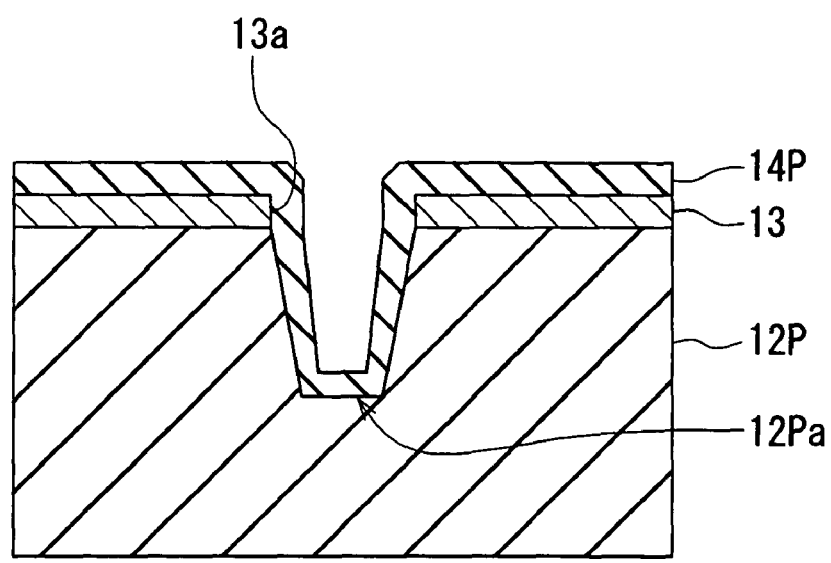
Figure 8C:
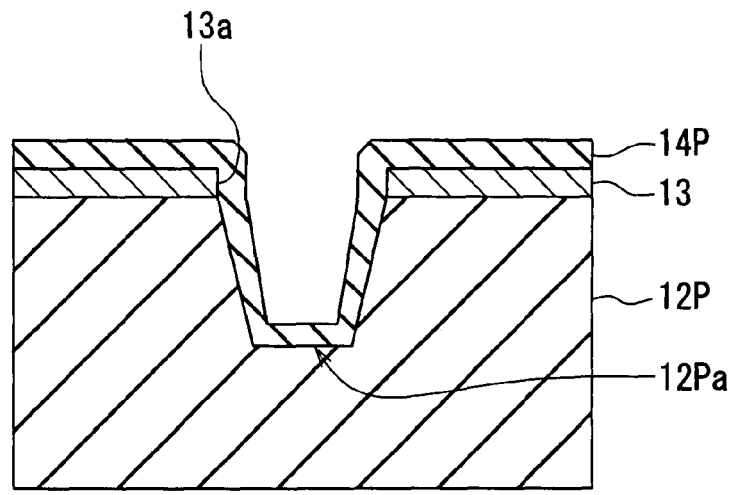
Figure 8D:
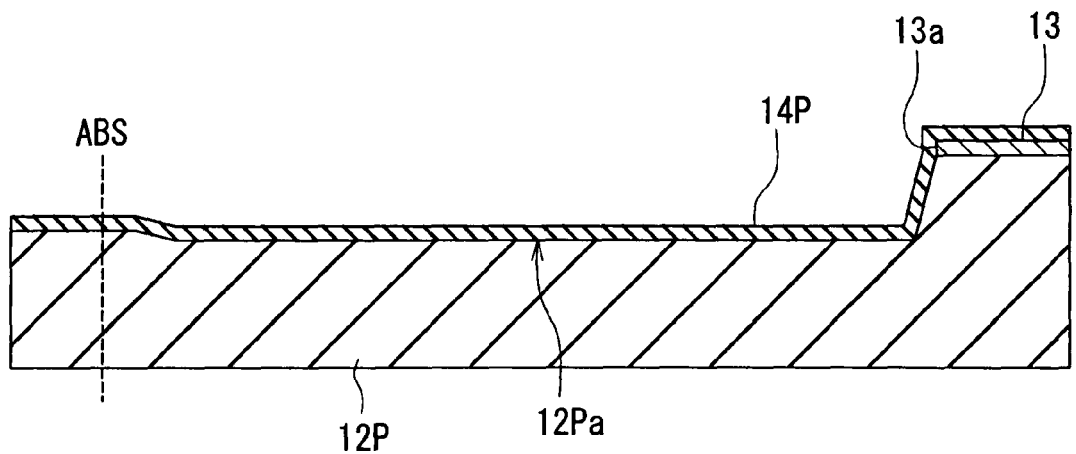

FIG. 8A to FIG. 8D illustrate the next step. FIG. 8A is a top view of a stack of layers obtained in the course of the manufacture of the magnetic head. FIG. 8B is a cross-sectional view illustrating a cross section of the stack of layers of FIG. 8A taken in the plane ABS. FIG. 8C is a cross-sectional view of the stack of layers of FIG. 8A taken along line 8C-8C. FIG. 8D is a cross-sectional view illustrating a cross section of the stack of layers of FIG. 8A orthogonal to the plane ABS and the top surface of the substrate.

In this step, a film to be etched 14P is formed on the entire top surface of the stack of layers, the film to be etched 14P being intended to become the nonmagnetic film 14 later by undergoing partial etching. The film to be etched 14P is also formed in the initial groove 12Pa. The film to be etched 14P is formed by sputtering or chemical vapor deposition (hereinafter referred to as CVD), for example. The thickness of the film to be etched 14P can be controlled with precision. In the case of forming the film to be etched 14P by CVD, it is preferred to employ, in particular, so-called atomic layer CVD (hereinafter referred to as ALCVD) in which formation of a single atomic layer is repeated. In this case, the thickness of the film to be etched 14P can be controlled with higher precision. In the case of forming the film to be etched 14P by ALCVD, it is preferable to use alumina, in particular, as the material of the film to be etched 14P. In the case of using a semiconductor material to form the film to be etched 14P, it is preferred that the film to be etched 14P be formed by ALCVD at low temperatures (around 200° C.) or by low-pressure CVD at low temperatures. The semiconductor material for use as the material of the film to be etched 14P is preferably undoped polycrystalline silicon or amorphous silicon.

Figure 9A:
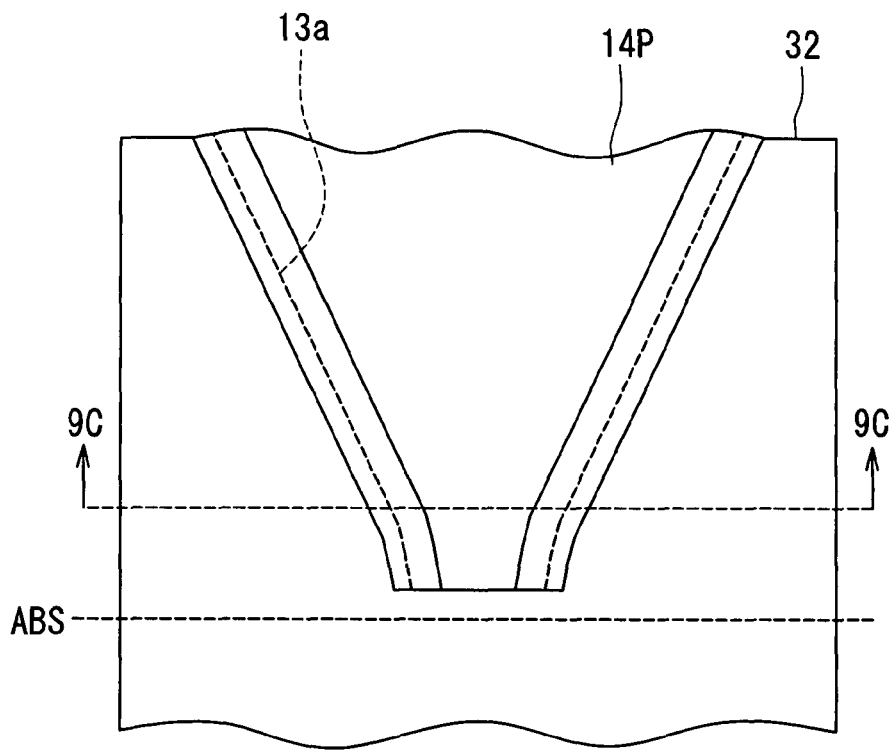
FIG. 9A to FIG. 9D are views for illustrating a step that follows the step of FIG. 8A to FIG. 8D.
Figure 9B:
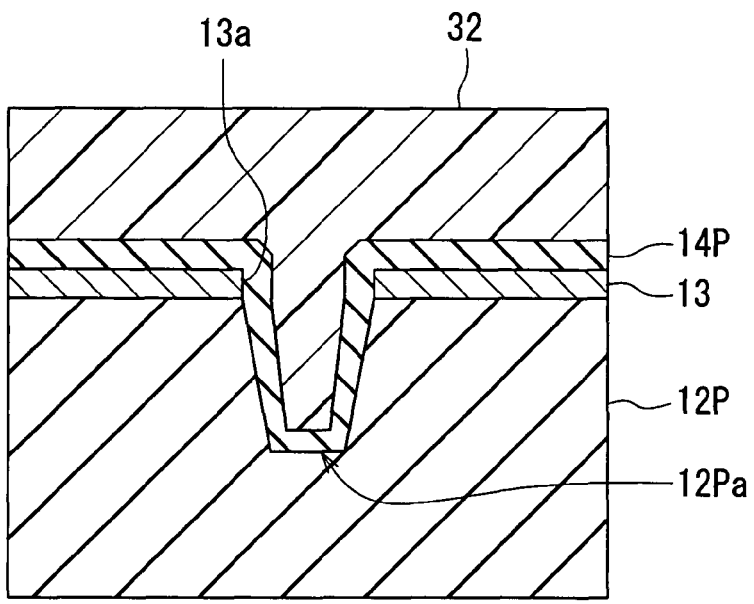
Figure 9C:
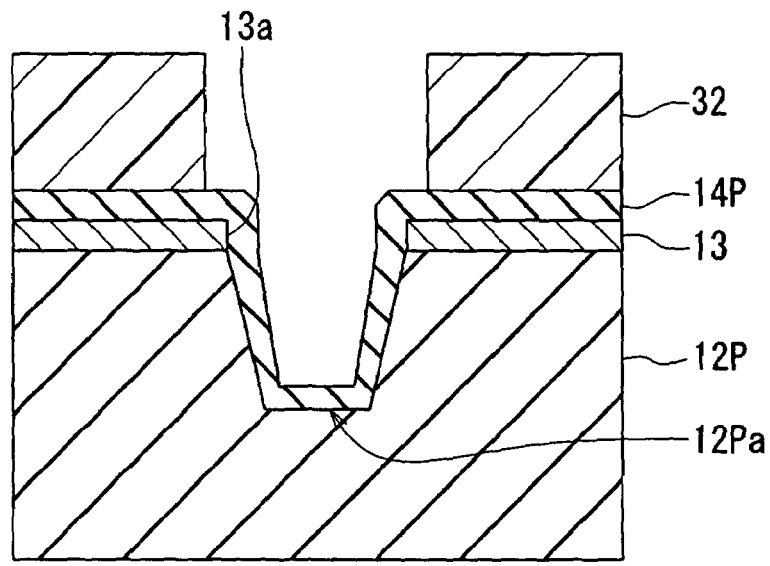
Figure 9D:
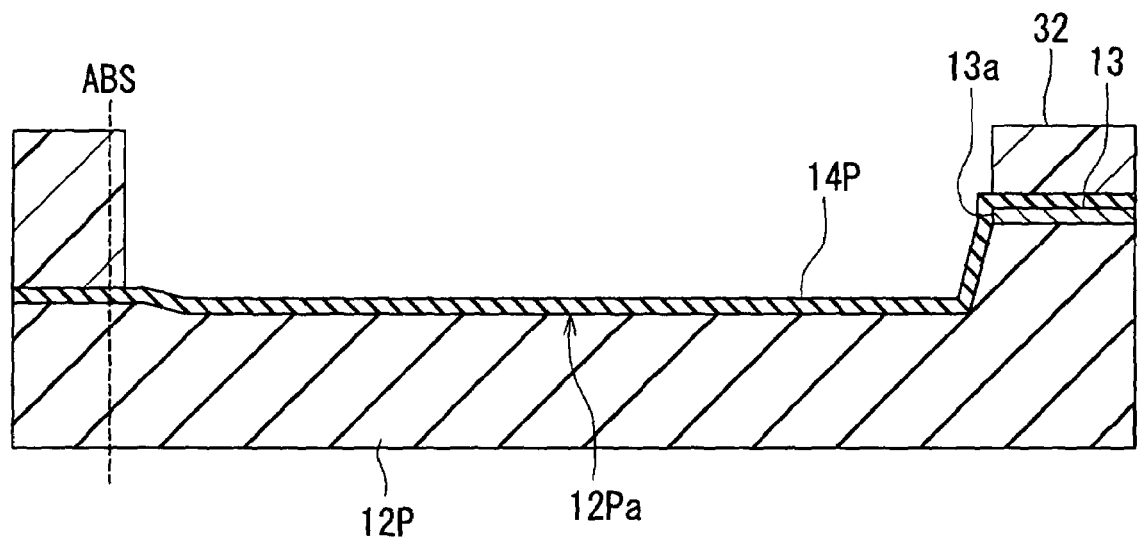

FIG. 9A to FIG. 9D illustrate the next step. FIG. 9A is a top view of a stack of layers obtained in the course of the manufacture of the magnetic head. FIG. 9B is a cross-sectional view illustrating a cross section of the stack of layers of FIG. 9A taken in the plane ABS. FIG. 9C is a cross-sectional view of the stack of layers of FIG. 9A taken along line 9C-9C. FIG. 9D is a cross-sectional view illustrating a cross section of the stack of layers of FIG. 9A orthogonal to the plane ABS and the top surface of the substrate.

In this step, formed is a mask 32 for covering a portion of the film to be etched 14P that is to become the first portion 141 and the second portion 142 of the nonmagnetic film 14 later. The mask 32 is formed by patterning a photoresist layer by photolithography.

Figure 10A:
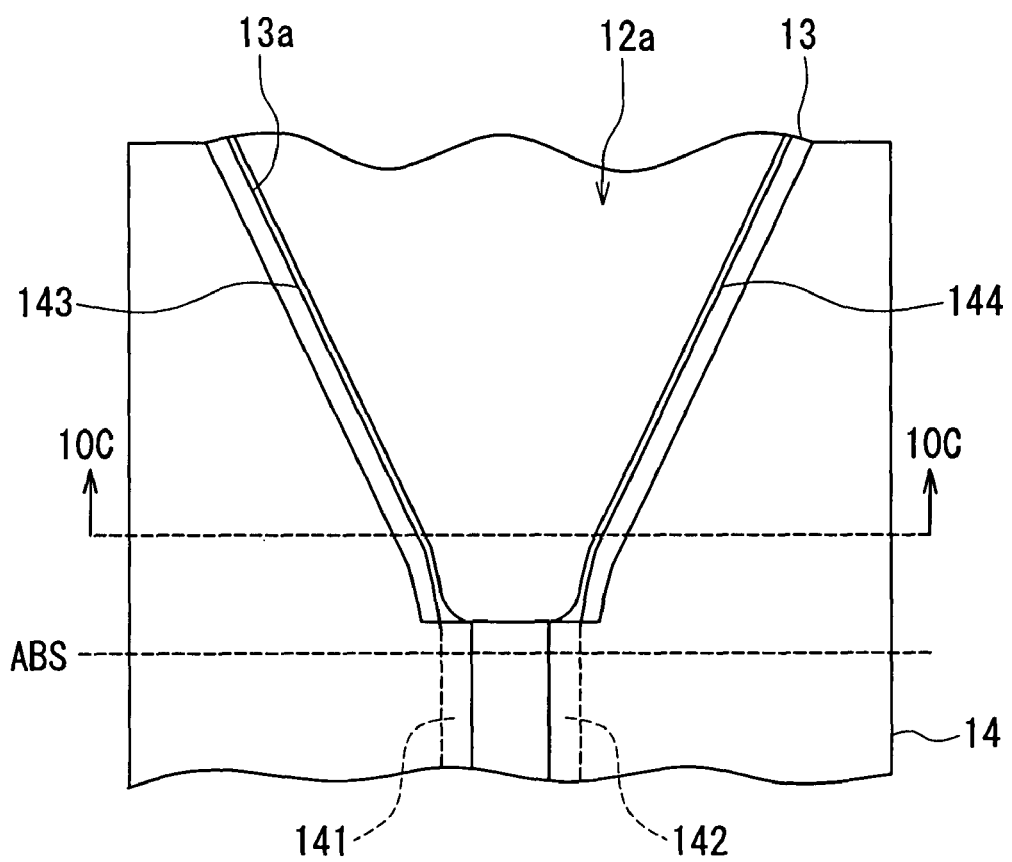
FIG. 10A to FIG. 10D are views for illustrating a step that follows the step of FIG. 9A to FIG. 9D.
Figure 10B:
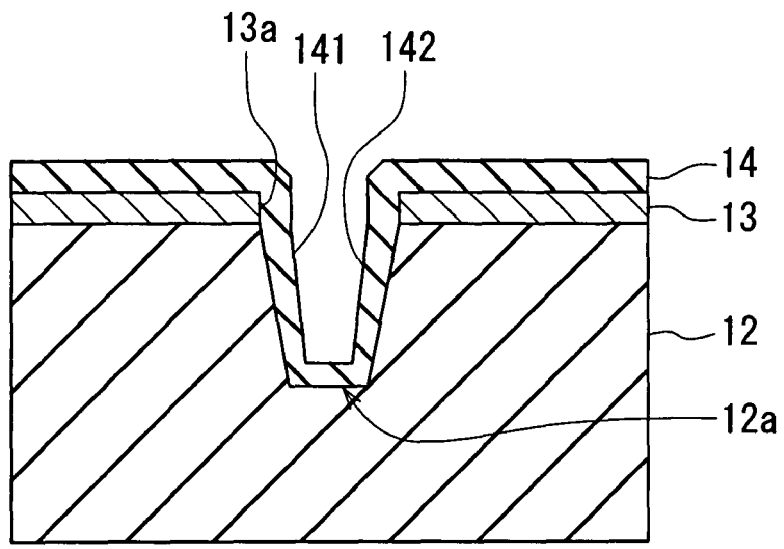
Figure 10C:
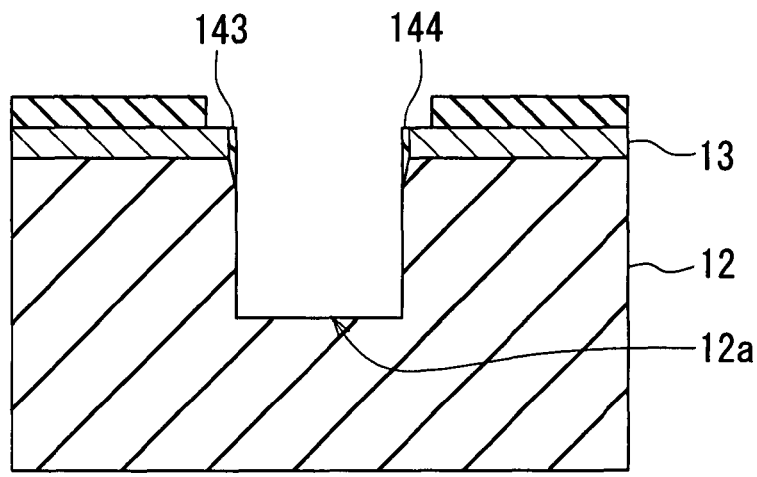
Figure 10D:
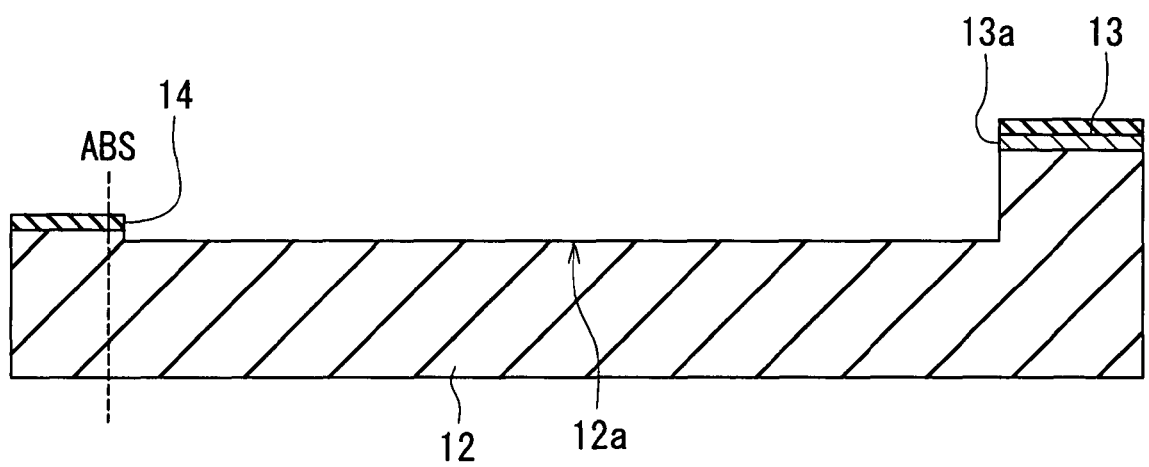

FIG. 10A to FIG. 10D illustrate the next step. FIG. 10A is a top view of a stack of layers obtained in the course of the manufacture of the magnetic head. FIG. 10B is a cross-sectional view illustrating a cross section of the stack of layers of FIG. 10A taken in the plane ABS. FIG. 10C is a cross-sectional view of the stack of layers of FIG. 10A taken along line 10C-10C. FIG. 10D is a cross-sectional view illustrating a cross section of the stack of layers of FIG. 10A orthogonal to the plane ABS and the top surface of the substrate.

In this step, the first portion 141 to the fourth portion 144 of the nonmagnetic film 14 are formed by etching at least part of a portion of the film to be etched 14P that is not covered with the mask 32, using the mask 32 and the encasing groove defining layer 13 as etching masks. The film 14P thereby becomes the nonmagnetic film 14. At this time, the nonmagnetic layer 12P is also partially etched, using the mask 32 and the encasing groove defining layer 13 as etching masks, to thereby complete the encasing groove 12a. As a result, the initial groove 12Pa becomes the encasing groove 12a and the nonmagnetic layer 12P becomes the encasing layer 12. The etching of each of the film to be etched 14P and the nonmagnetic layer 12P is performed by reactive ion etching or ion beam etching, for example.

Figure 15:
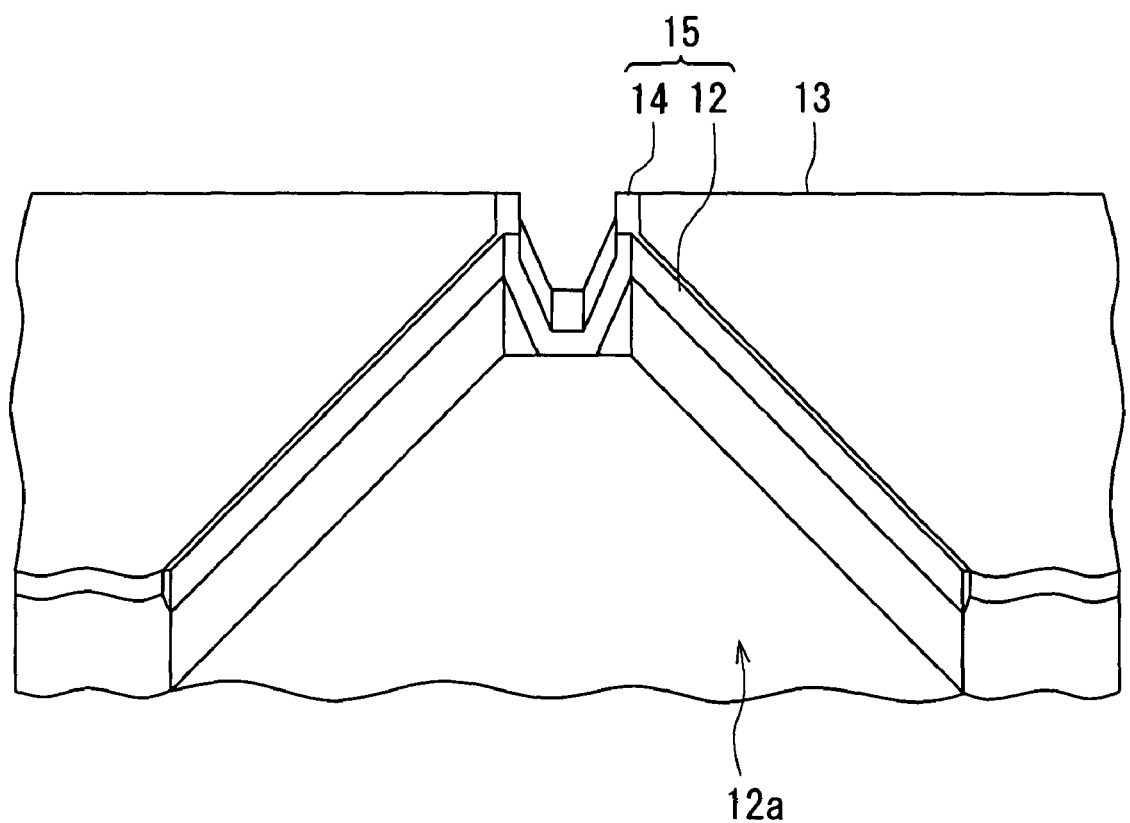
FIG. 15 is a perspective view of an encasing section of the first embodiment of the invention.

Through this step, the encasing section 15 including the encasing layer 12 and the nonmagnetic film 14 is completed. FIG. 15 is a perspective view of the encasing section 15. The encasing section 15 has a groove in which the pole layer 16 is to be formed later.

Figure 11A:
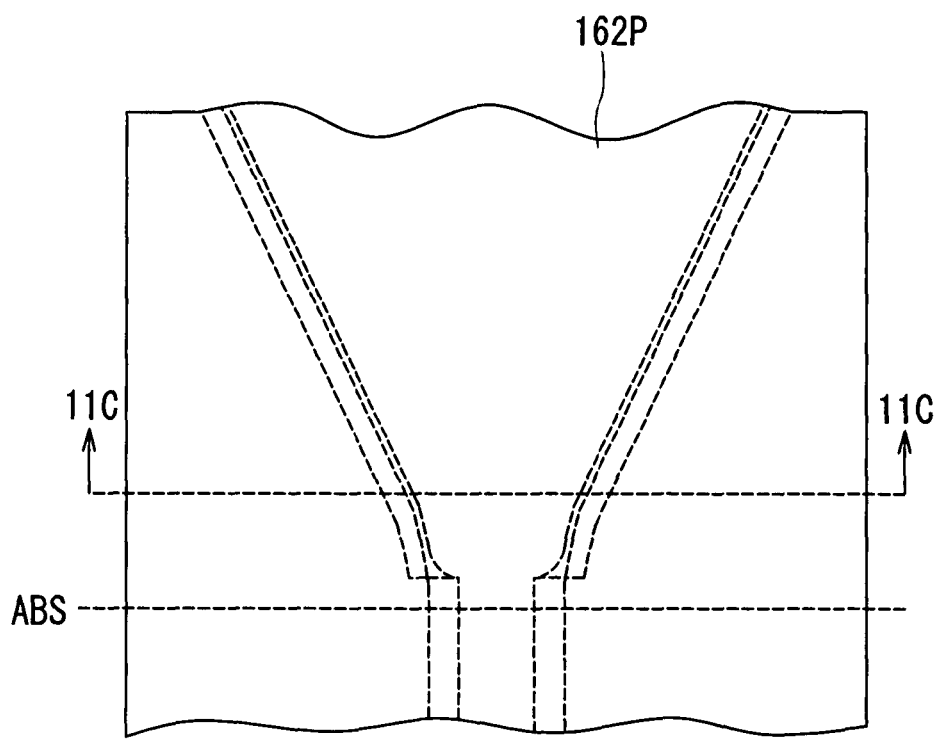
FIG. 11A to FIG. 11D are views for illustrating a step that follows the step of FIG. 10A to FIG. 10D.
Figure 11B:
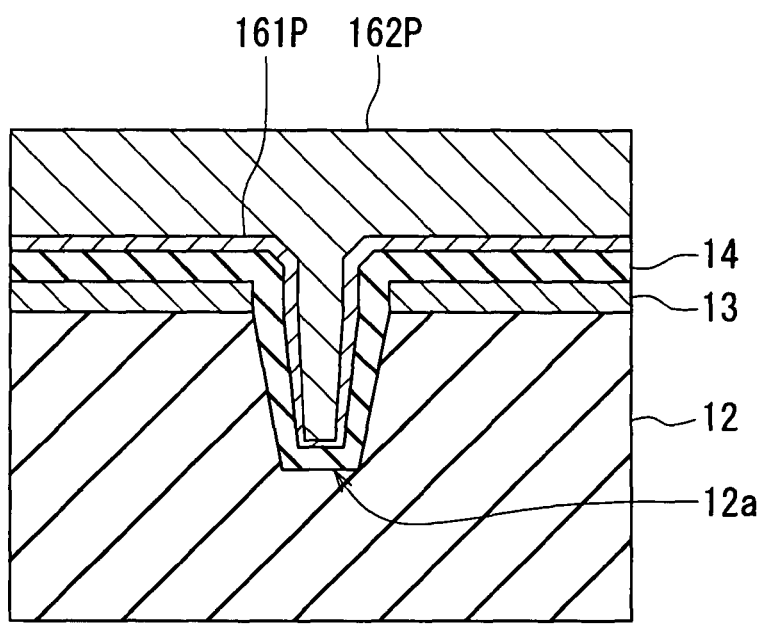
Figure 11C:
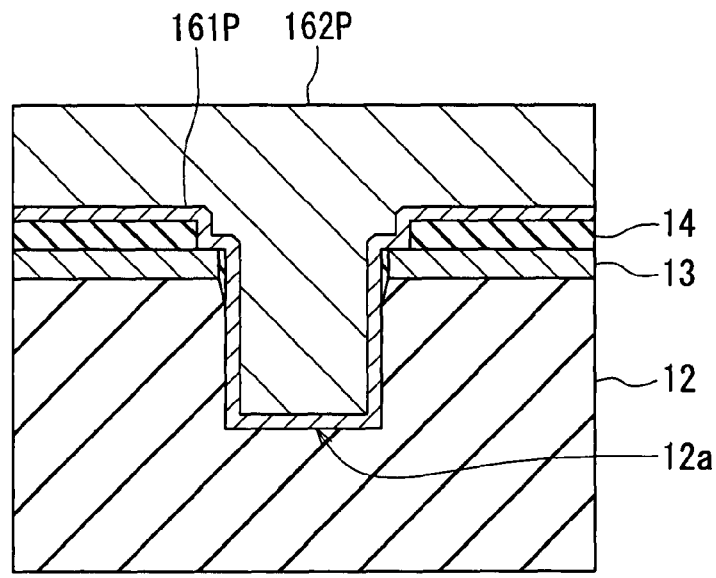
Figure 11D:
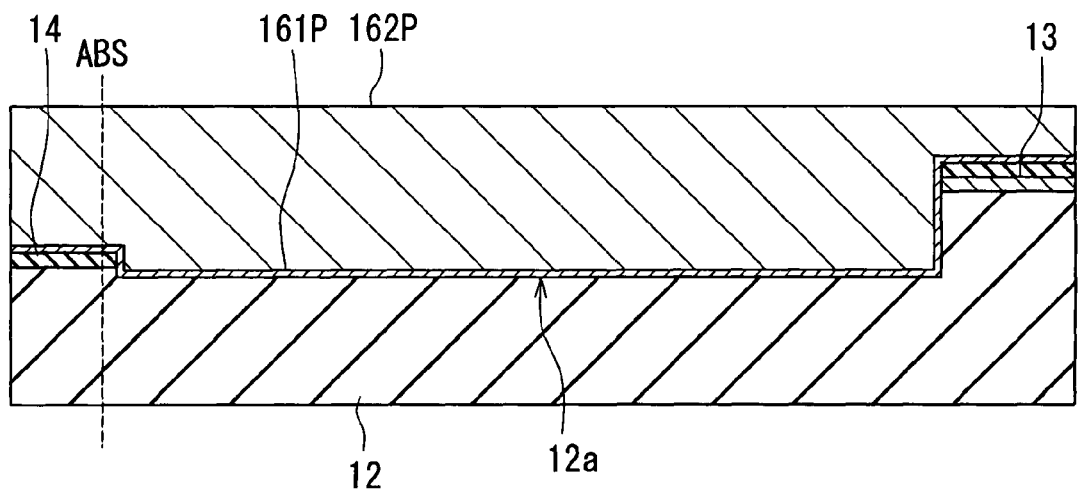

FIG. 11A to FIG. 11D illustrate the next step. FIG. 11A is a top view of a stack of layers obtained in the course of the manufacture of the magnetic head. FIG. 11B is a cross-sectional view illustrating a cross section of the stack of layers of FIG. 11A taken in the plane ABS. FIG. 11C is a cross-sectional view of the stack of layers of FIG. 11A taken along line 11C-11C. FIG. 11D is a cross-sectional view illustrating a cross section of the stack of layers of FIG. 11A orthogonal to the plane ABS and the top surface of the substrate.

In this step, first, a first magnetic layer 161P that is to become the first layer 161 of the pole layer 16 later is formed on the entire top surface of the stack of layers. The first magnetic layer 161P is formed by sputtering or ion beam deposition, for example. In the case of forming the first magnetic layer 161P by sputtering, it is preferred to employ collimation sputtering or long throw sputtering.

Next, a second magnetic layer 162P that is to become the second layer 162 of the pole layer 16 later is formed on the first magnetic layer 161P. The second magnetic layer 162P is formed by frame plating, for example. In this case, the first magnetic layer 161P is used as an electrode for plating. The second magnetic layer 162P may also be formed by making an unpatterned plating layer and then patterning this plating layer through etching.

Figure 12A:
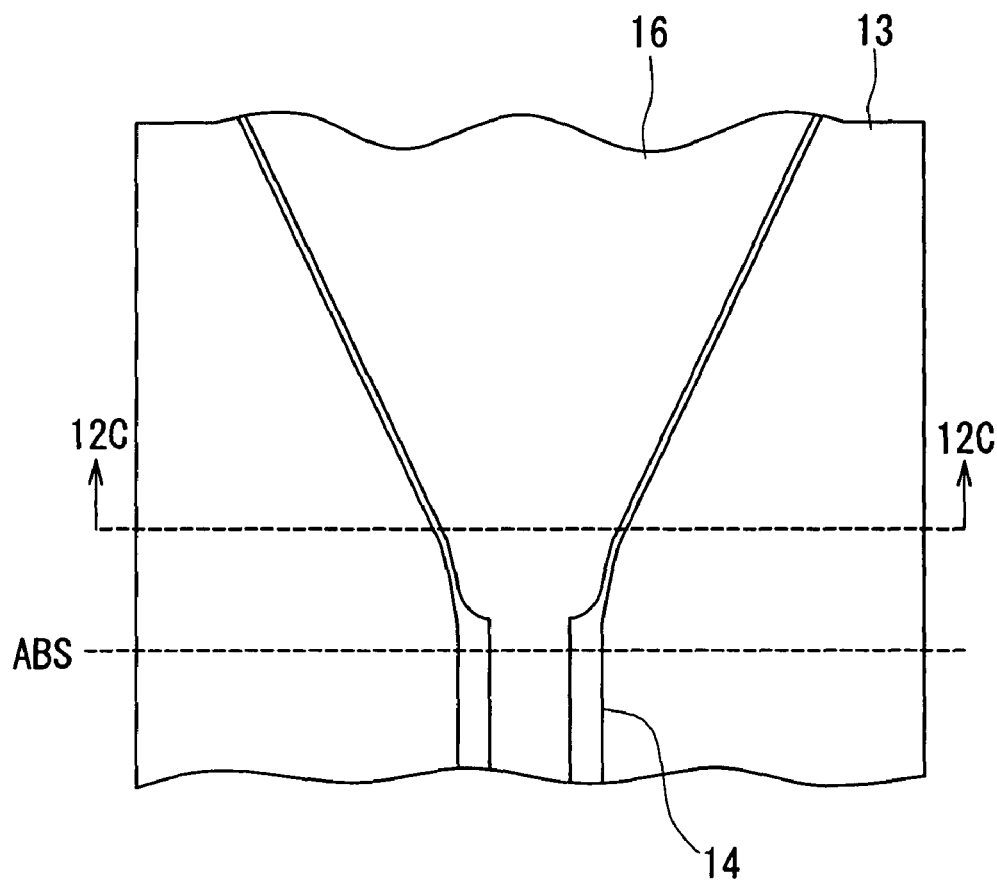
FIG. 12A to FIG. 12D are views for illustrating a step that follows the step of FIG. 11A to FIG. 11D.
Figure 12B:
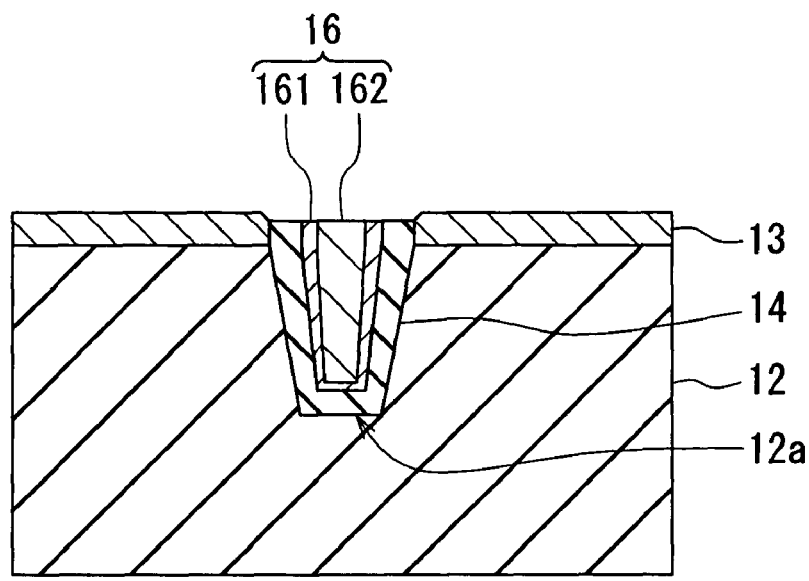
Figure 12C:
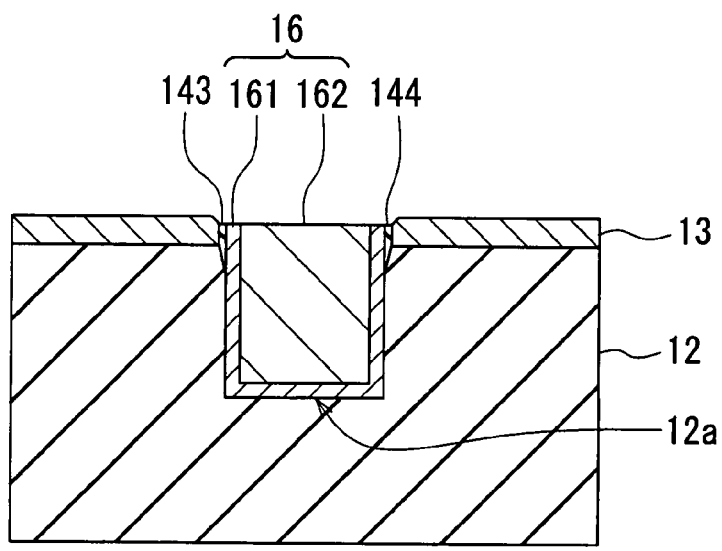
Figure 12D:
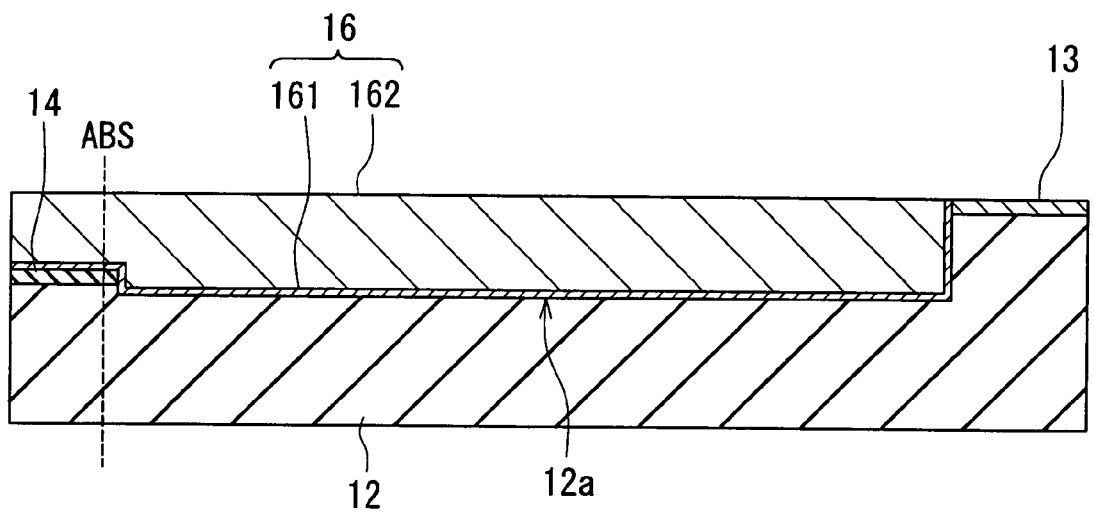

FIG. 12A to FIG. 12D illustrate the next step. FIG. 12A is a top view of a stack of layers obtained in the course of the manufacture of the magnetic head. FIG. 12B is a cross-sectional view illustrating a cross section of the stack of layers of FIG. 12A taken in the plane ABS. FIG. 12C is a cross-sectional view of the stack of layers of FIG. 12A taken along line 12C-12C. FIG. 12D is a cross-sectional view illustrating a cross section of the stack of layers of FIG. 12A orthogonal to the plane ABS and the top surface of the substrate.

In this step, first, a coating layer (not shown) made of alumina, for example, is formed to a thickness of 0.5 to 1.2 µm, for example, on the entire top surface of the stack of layers. Next, the coating layer, the second magnetic layer 162P and the first magnetic layer 161P are polished by CMP, for example, so that the encasing groove defining layer 13 is exposed. As a result, the magnetic layers 161P and 162P that remain become the first layer 161 and the second layer 162, respectively, thereby completing the pole layer 16.

Figure 13A:
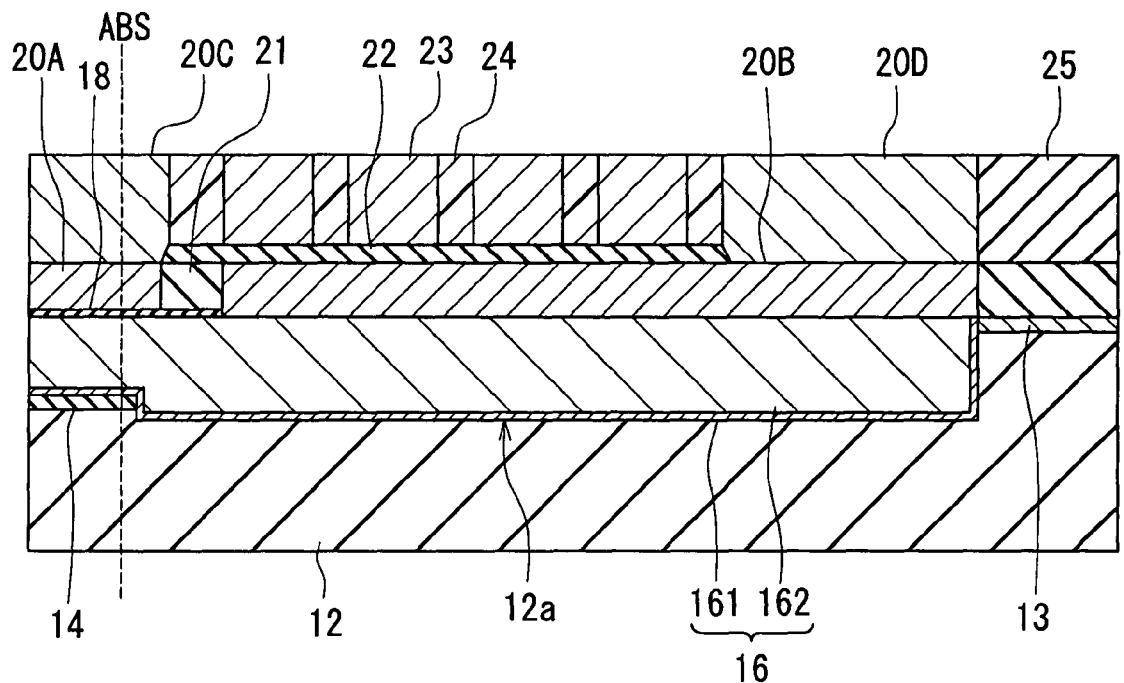
FIG. 13A and FIG. 13B are views for illustrating a step that follows the step of FIG. 12A to FIG. 12D.
Figure 13B:
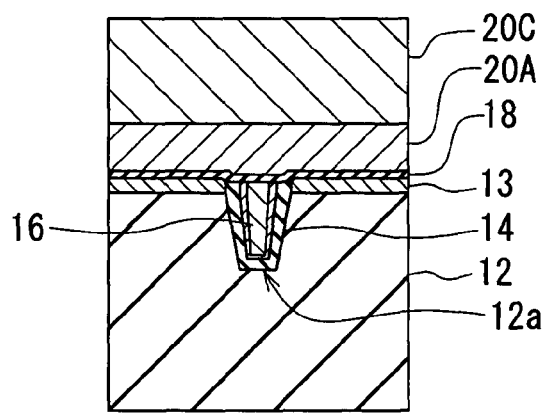

FIG. 13A and FIG. 13B illustrate the next step. FIG. 13A is a cross-sectional view of a stack of layers obtained in the course of the manufacture of the magnetic head. FIG. 13B is a cross-sectional view illustrating a cross section of the stack of layers of FIG. 13A taken in the plane ABS. In this step, first, the gap layer 18 is formed on the entire top surface of the stack of layers. The gap layer 18 is formed by sputtering or CVD, for example. In the case of forming the gap layer 18 by CVD, it is preferred to employ ALCVD, in particular. In the case of forming the gap layer 18 by ALCVD, it is preferred to use alumina, in particular, as the material of the gap layer 18.

Next, a portion of the gap layer 18 away from the medium facing surface 30 is selectively etched to thereby form an opening in the gap layer 18. Next, the first layer 20A is formed on the gap layer 18, and the yoke layer 20B is formed on a portion of the pole layer 16 where the opening of the gap layer 18 is formed. The first layer 20A and the yoke layer 20B may be formed by frame plating, or by making a magnetic layer through sputtering and then selectively etching this magnetic layer. Next, the nonmagnetic layer 21 is formed on the entire top surface of the stack of layers. Next, the nonmagnetic layer 21 is polished by CMP, for example, so that the first layer 20A and the yoke layer 20B are exposed, and the top surfaces of the first layer 20A, the yoke layer 20B and the nonmagnetic layer 21 are thereby flattened.

Next, the insulating layer 22 is formed on regions of the top surfaces of the yoke layer 20B and the nonmagnetic layer 21 in which the coil 23 is to be disposed. Next, the coil 23 is formed by frame plating, for example, such that at least part of the coil 23 is disposed on the insulating layer 22. Next, the second layer 20C and the coupling layer 20D are formed by frame plating, for example. Alternatively, the coil 23 may be formed after the second layer 20C and the coupling layer 20D are formed.

Next, the insulating layer 24 made of photoresist, for example, is selectively formed around the coil 23 and in the space between the respective adjacent turns of the coil 23. Next, the insulating layer 25 is formed on the entire top surface of the stack of layers. Next, the insulating layer 25 is polished by CMP, for example, so that the second layer 20C, the coupling layer 20D and the coil 23 are exposed, and the top surfaces of the second layer 20C, the coupling layer 20D, the coil 23, and the insulating layers 24 and 25 are thereby flattened.

Figure 14A:
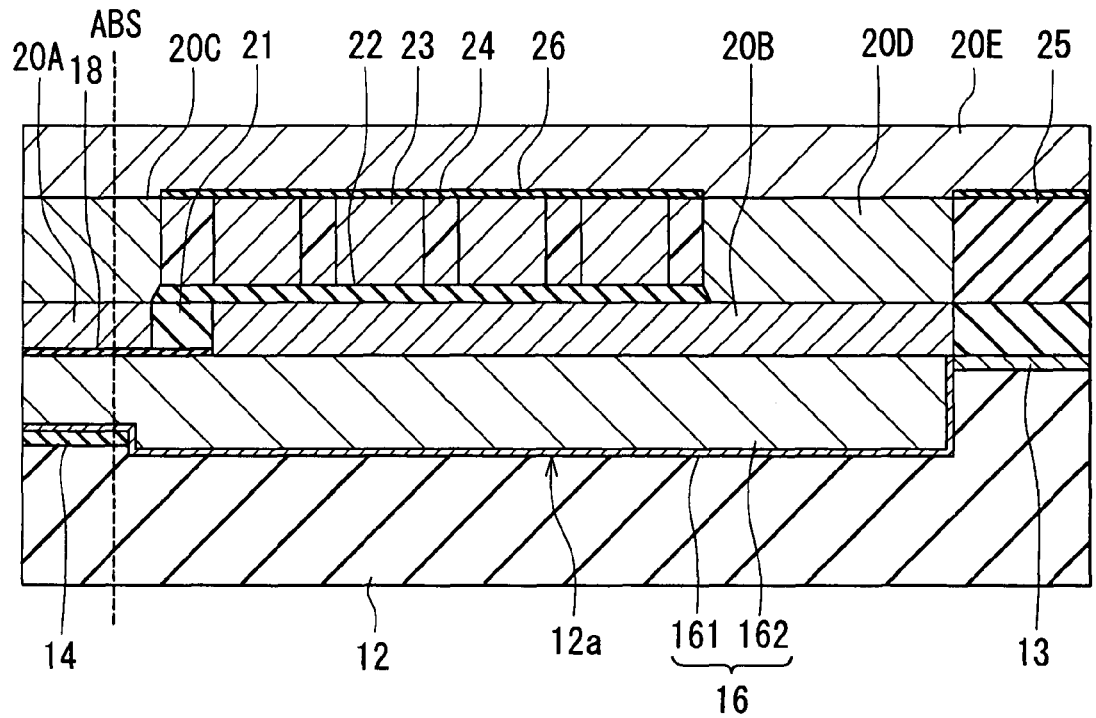
FIG. 14A and FIG. 14B are views for illustrating a step that follows the step of FIG. 13A and FIG. 13B.
Figure 14B:
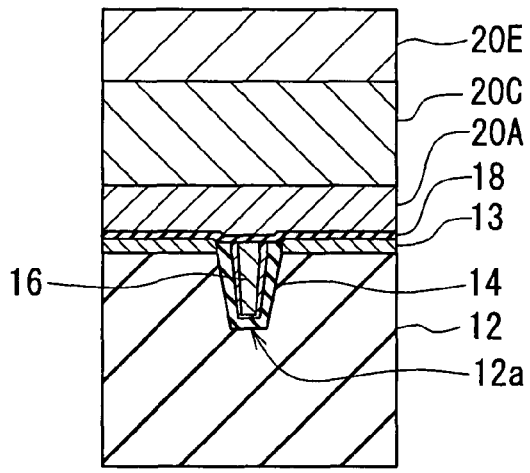

FIG. 14A and FIG. 14B illustrate the next step. FIG. 14A is a cross-sectional view of a stack of layers obtained in the course of the manufacture of the magnetic head. FIG. 14B is a cross-sectional view illustrating a cross section of the stack of layers of FIG. 14A taken in the plane ABS. In this step, first, the insulating layer 26 is formed on the coil 23 and the insulating layers 24 and 25. Next, the third layer 20E is formed by frame plating, for example, to complete the shield 20.

Next, as shown in FIG. 5, the protection layer 27 is formed to cover the entire top surface of the stack of layers. Wiring and terminals are then formed on the protection layer 27, the substrate is cut into sliders, and the steps including polishing of the medium facing surface 30 and fabrication of flying rails are performed. The magnetic head is thus completed.

The operation and effects of the magnetic head of the embodiment will now be described. In the magnetic head, the write head writes data on a recording medium while the read head reads data written on the recording medium. In the write head, the coil 23 generates a magnetic field that corresponds to data to be written on the recording medium. The pole layer 16 and the shield 20 form a magnetic path that allows magnetic flux corresponding to the magnetic field generated by the coil 23 to pass therethrough. The pole layer 16 allows the magnetic flux corresponding to the magnetic field generated by the coil 23 to pass and generates a write magnetic field used for writing the data on the recording medium by means of the perpendicular magnetic recording system. The shield 20 takes in a disturbance magnetic field applied from outside the magnetic head to the magnetic head. It is thereby possible to prevent erroneous writing on the recording medium caused by the disturbance magnetic field intensively taken in into the pole layer 16. The shield 20 also has a function of returning a magnetic flux that has been generated from the end face of the pole layer 16 (the track width defining portion 16A) located in the medium facing surface 30 and that has magnetized the recording medium.

According to the embodiment, in the medium facing surface 30, the end face of the shield 20 is located forward of the end face of the pole layer 16 along the direction T of travel of the recording medium (that is, located closer to the air outflow end of the slider) with a specific small distance provided therebetween by the gap layer 18. The position of an end of the bit pattern to be written on the recording medium is determined by the position of the end of the pole layer 16 that is closer to the gap layer 18 and located in the medium facing surface 30. The shield 20 takes in a magnetic flux generated from the end face of the pole layer 16 located in the medium facing surface 30 and expanding in directions except the direction orthogonal to the surface of the recording medium so as to prevent this flux from reaching the recording medium. It is thereby possible to prevent a direction of magnetization of the bit pattern already written on the recording medium from being changed due to the effect of the above-mentioned flux. As a result, according to the embodiment, it is possible to improve the linear recording density.

According to the embodiment, as shown in FIG. 3, the width of the end face of the track width defining portion 16A located in the medium facing surface 30 decreases with decreasing distance from the first side A1. This makes it possible to prevent the problems resulting from the skew.

In the embodiment, the pole layer 16 is disposed in the encasing groove 12a of the encasing layer 12 made of a nonmagnetic material, with the nonmagnetic film 14 disposed between the pole layer 16 and the encasing groove 12a. The nonmagnetic film 14 includes: the first portion 141 located between the first side surface S1 and the first wall surface WS1; and the second portion 142 located between the second side surface S2 and the second wall surface WS2. Therefore, the width of the track width defining portion 16A is smaller than the width of the portion of the encasing groove 12a in which the track width defining portion 16A is placed. This makes it easy to form the encasing groove 12a and to reduce the width of the track width defining portion 16A, particularly the width of the top surface of the track width defining portion 16A that defines the track width. As a result, according to the embodiment, it is possible to easily implement a track width that is smaller than the minimum track width that can be formed by photolithography, and to control the track width with accuracy.

The features of the pole layer 16 and the encasing section 15 of the embodiment will now be described. The encasing section 15 accommodates at least part of the pole layer 16. The encasing section 15 includes the encasing layer 12 and the nonmagnetic film 14. The encasing layer 12 has the encasing groove 12a that opens in the top surface of the encasing layer 12 and that accommodates the at least part of the pole layer 16. The nonmagnetic film 14 is disposed in the encasing groove 12a at a position between the encasing layer 12 and the pole layer 16. The pole layer 16 includes: the track width defining portion 16A having the end face located in the medium facing surface 30 and the end opposite to the end face; and the wide portion 16B connected to the end of the track width defining portion 16A and having a width greater than that of the track width defining portion 16A. The end face of the track width defining portion 16A located in the medium facing surface 30 defines the track width. The distance from the medium facing surface 30 to the boundary 16C between the track width defining portion 16A and the wide portion 16B is within a range of 10 to 300 nm.

The track width defining portion 16A has the first side surface S1 and the second side surface S2. The wide portion 16B has the third side surface S3 contiguous to the first side surface S1, and the fourth side surface S4 contiguous to the second side surface S2. The encasing layer 12 has the first wall surface WS1 and the second wall surface WS2 that form the encasing groove 12a. The first wall surface WS1 is opposed to the first side surface S1 and the third side surface S3, while the second wall surface WS2 is opposed to the second side surface S2 and the fourth side surface S4. The nonmagnetic film 14 includes: the first portion 141 located between the first side surface S1 and the first wall surface WS1; the second portion 142 located between the second side surface S2 and the second wall surface WS2; the third portion 143 located between the third side surface S3 and the first wall surface WS1; and the fourth portion 144 located between the fourth side surface S4 and the second wall surface WS2.

In the nonmagnetic film 14, the thickness of the third portion 143 is smaller than the thickness of the first portion 141, and the thickness of the fourth portion 144 is smaller than the thickness of the second portion 142. As a result, the distance between the third side surface S3 and the first wall surface WS1 is smaller than the distance between the first side surface S1 and the first wall surface WS1, and the distance between the fourth side surface S4 and the second wall surface WS2 is smaller than the distance between the second side surface S2 and the second wall surface WS2.

Figure 17:
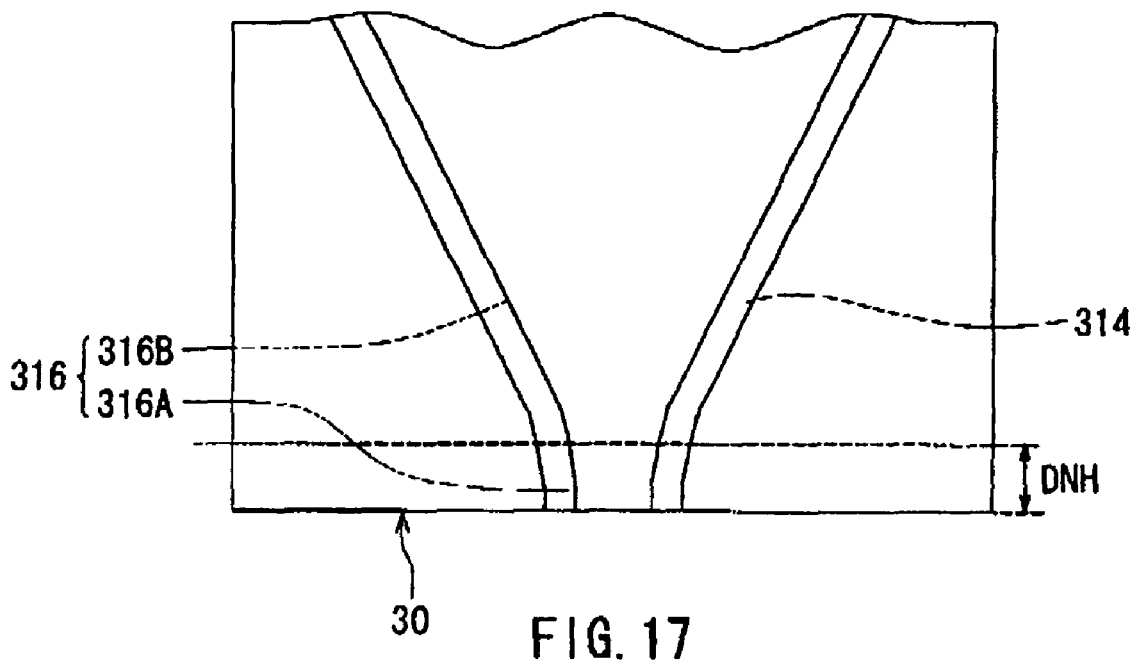
FIG. 17 is a top view of part of a pole layer of a second comparative example.

Reference is now made to FIG. 16 and FIG. 17 to describe a first and a second comparative example against the embodiment. FIG. 16 is a top view of part of the pole layer 216 of the first comparative example. According to the first comparative example, as previously described, the pole layer 216 is formed in an encasing groove patterned by photolithography, without forming the nonmagnetic film 14. The pole layer 216 includes: a track width defining portion 216A having an end face located in the medium facing surface 30 and an end opposite to the end face; and a wide portion 216B connected to the end of the track width defining portion 216A and having a width greater than that of the track width defining portion 216A. In the case where the pole layer 216 is formed in an encasing groove patterned by photolithography without forming the nonmagnetic film 14 like this first comparative example, it is difficult to precisely form a portion of the side surface of the pole layer 216 near the boundary between the track width defining portion 216A and the wide portion 216B. As a result, as shown in FIG. 16, the portion of the pole layer 216 near the boundary between the track width defining portion 216A and the wide portion 216B is likely to have such a shape that the width gradually increases with increasing distance from the medium facing surface 30. For this reason, in the first comparative example, the position of the boundary between the track width defining portion 216A and the wide portion 216B and the design neck height DNH are defined in accordance with the method described previously with reference to FIG. 16.

FIG. 17 is a top view of part of a pole layer 316 of the second comparative example. According to the second comparative example, the pole layer 316 is formed in an encasing groove patterned by photolithography, after forming a nonmagnetic film 314 having a uniform thickness. The pole layer 316 includes: a track width defining portion 316A having an end face located in the medium facing surface 30 and an end opposite to the end face; and a wide portion 316B connected to the end of the track width defining portion 316A and having a width greater than that of the track width defining portion 316A. As is the case with the first comparative example, it is also difficult in the second comparative example to precisely form a portion of the side surface of the pole layer 316 near the boundary between the track width defining portion 316A and the wide portion 316B. As a result, as shown in FIG. 17, the portion of the pole layer 316 near the boundary between the track width defining portion 316A and the wide portion 316B is likely to have such a shape that the width gradually increases with increasing distance from the medium facing surface 30. For this reason, also in the second comparative example, the position of the boundary between the track width defining portion 316A and the wide portion 316B and the design neck height DNH are defined in accordance with the same method as the first comparative example.

In each of the first and the second comparative example, the portion of the pole layer 216, 316 near the boundary between the track width defining portion 216A, 316A and the wide portion 216B, 316B is likely to have such a shape that the width gradually increases with increasing distance from the medium facing surface 30, and the position of the boundary between the track width defining portion 216A, 316A and the wide portion 216B, 316B is not definite. Furthermore, in each of the first and the second comparative example, it is typically required that the design neck height DNH be 100 nm or greater in order to make the track width substantially uniform regardless of variations in the position of the medium facing surface 30. For these reasons, according to the first and the second comparative example, it is difficult to make the track width and the neck height be of small values and to precisely control the track width and the neck height. Consequently, according to the first and the second comparative example, it is difficult to improve the write characteristics by controlling the track width and the neck height.

In contrast, according to the embodiment, the previously described features of the pole layer 16 and the encasing section 15 make it easy to reduce the track width defined by the end face of the track width defining portion 16A located in the medium facing surface 30, and furthermore, the position of the boundary 16C between the track width defining portion 16A and the wide portion 16B is definite, in contrast to the first and the second comparative example. The embodiment therefore allows both the neck height NH and the track width to be of small values and to be precisely controllable. According to the embodiment, in particular, it is possible to attain a small neck height NH such as 10 to 20 nm and to control the neck height NH with precision. Thus, according to the embodiment, it is possible to define the track width with precision and to improve the write characteristics such as the overwrite property by controlling the neck height NH with precision.

Furthermore, according to the embodiment, in a portion of the wide portion 16B near the boundary 16C between the track width defining portion 16A and the wide portion 16B, it is possible to increase the cross-sectional area of the pole layer 16 taken in the direction orthogonal to the direction in which magnetic flux flows. As a result, according to the embodiment, it is possible to improve the write characteristics such as the overwrite property. This effect is particularly noticeable when the angle formed by the third side surface S3 with respect to the direction orthogonal to the top surface of the substrate 1 is smaller than the angle θ1 formed by the first side surface S1 with respect to the direction orthogonal to the top surface of the substrate 1, and the angle formed by the fourth side surface S4 with respect to the direction orthogonal to the top surface of the substrate 1 is smaller than the angle θ2 formed by the second side surface S2 with respect to the direction orthogonal to the top surface of the substrate 1.

In the embodiment, the track width defining portion 16A has the first bottom surface B1 while the wide portion 16B has the second bottom surface B2, and the second bottom surface B2 is located closer to the top surface of the substrate 1 than is the first bottom surface B1. As a result, according to the embodiment, it is possible to increase the thickness of the wide portion 16B so as to introduce magnetic flux of great magnitude to the medium facing surface 30 through the pole layer 16, while reducing the thickness of the pole layer 16 taken in the medium facing surface 30 so as to effectively prevent the problems resulting from the skew.

MODIFICATION EXAMPLES

Figure 18:
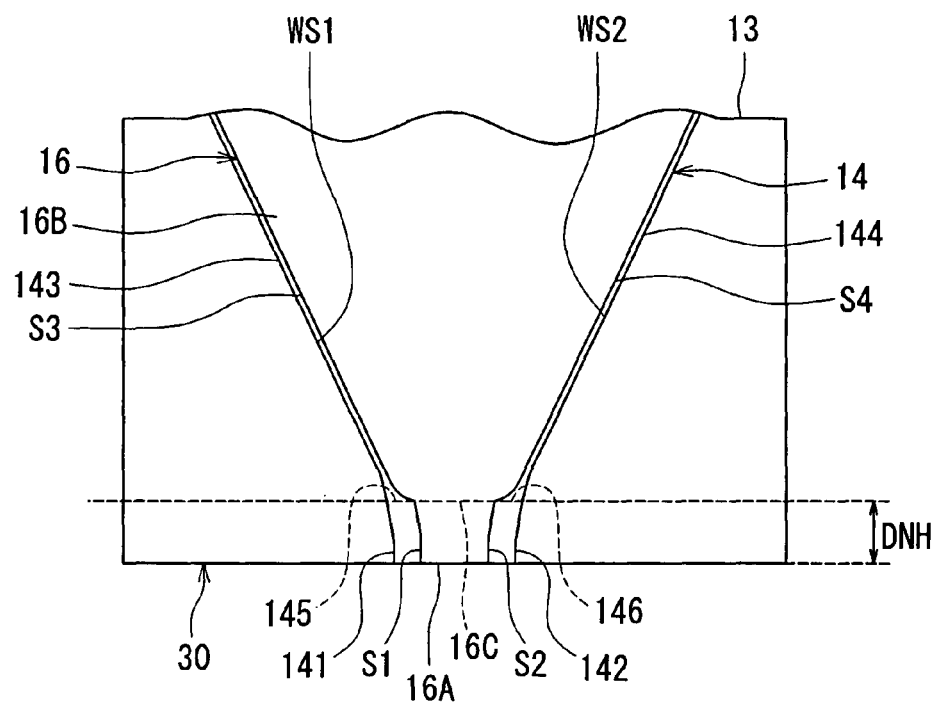
FIG. 18 is a top view of part of a pole layer of a first modification example of the first embodiment of the invention.
Figure 19:
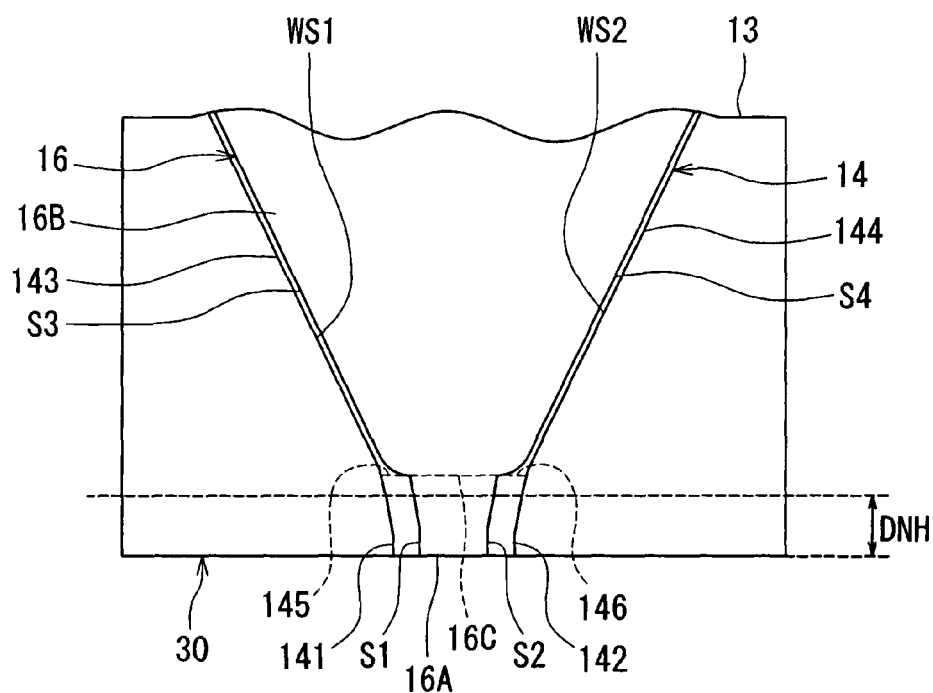
FIG. 19 is a top view of part of a pole layer of a second modification example of the first embodiment of the invention.

Reference is now made to FIG. 18 and FIG. 19 to describe a first and a second modification example of the embodiment. FIG. 18 is a top view of part of the pole layer 16 of the first modification example. FIG. 19 is a top view of part of the pole layer 16 of the second modification example.

In the first modification example shown in FIG. 18, the distance from the medium facing surface 30 to the boundary 16C between the track width defining portion 16A and the wide portion 16B is equal to the design neck height DNH.

In the second modification example shown in FIG. 18, the distance from the medium facing surface 30 to the boundary 16C between the track width defining portion 16A and the wide portion 16B is greater than the design neck height DNH.

In each of the first and the second modification example, the effective neck height coincides with the design neck height DNH. The remainder of configuration, function and effects of the first and the second modification example are similar to those of the magnetic head shown in FIG. 1 to FIG. 6.

Second Embodiment

Figure 20:
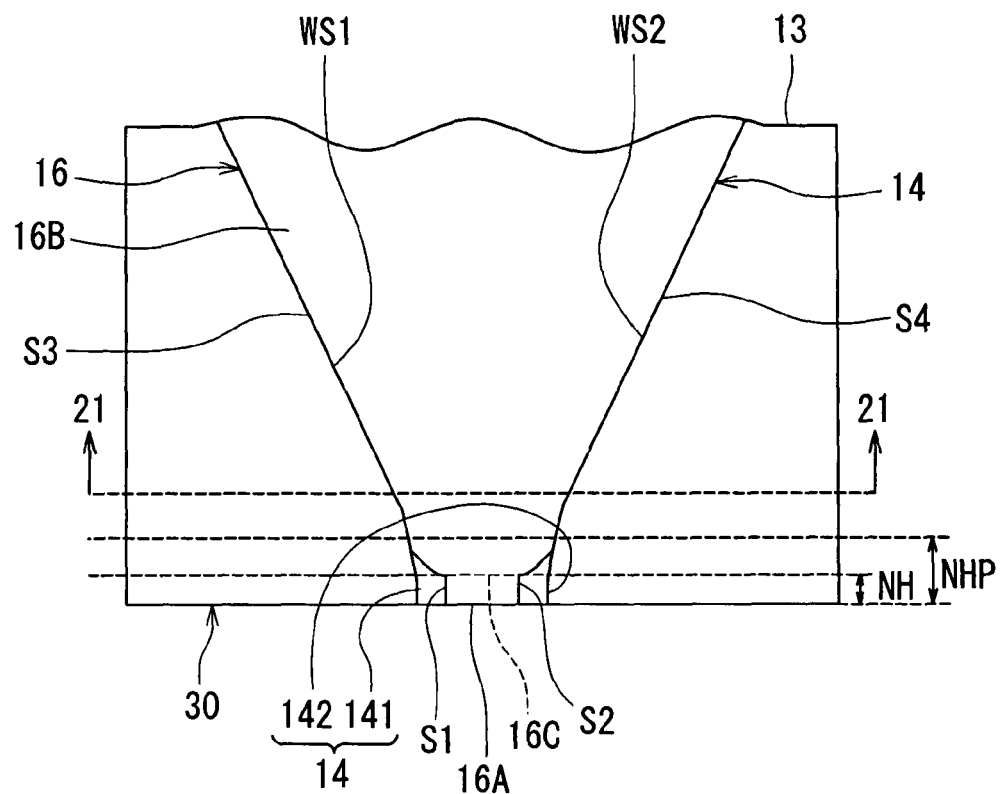
FIG. 20 is a top view of part of a pole layer of a magnetic head of a second embodiment of the invention.
Figure 21:
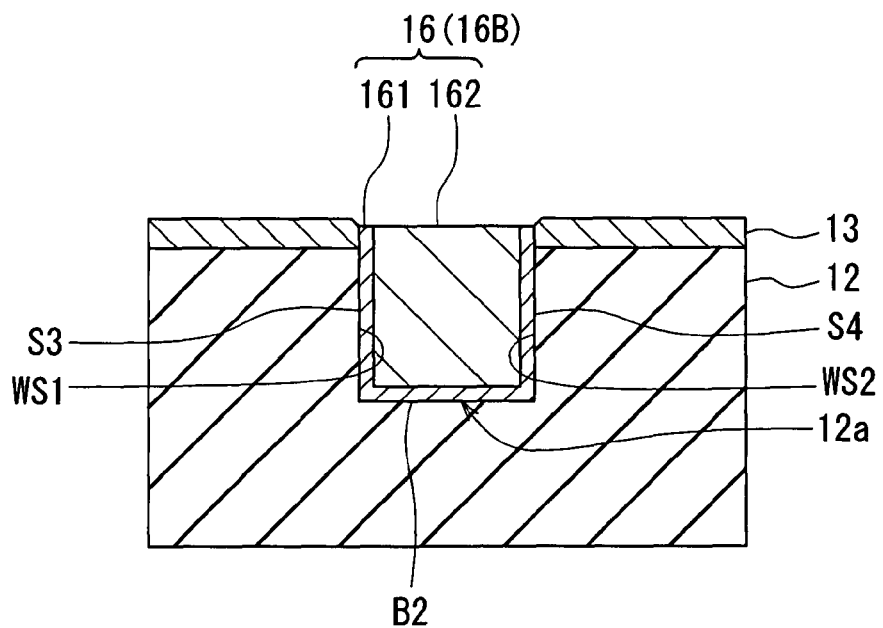
FIG. 21 is a cross-sectional view illustrating part of cross section of the magnetic head of the second embodiment of the invention, the cross section being parallel to the medium facing surface.
Figure 22:
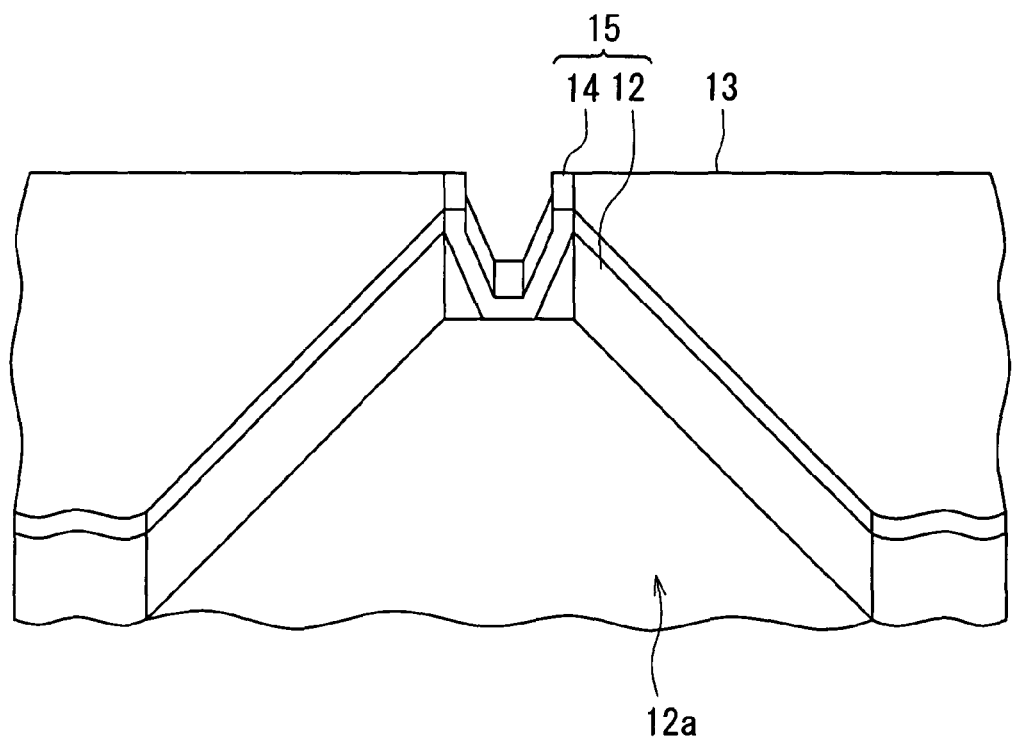
FIG. 22 is a perspective view of an encasing section of the second embodiment of the invention.

Reference is now made to FIG. 20 to FIG. 22 to describe a magnetic head and a method of manufacturing the same of a second embodiment of the invention. FIG. 20 is a top view of part of the pole layer 16 of the embodiment near the medium facing surface 30. FIG. 21 is a cross-sectional view illustrating part of a cross section of the magnetic head of the embodiment parallel to the medium facing surface 30. FIG. 21 illustrates the cross section taken along line 21-21 of FIG. 20. FIG. 22 is a perspective view of the encasing section 15 of the embodiment.

In the magnetic head of the second embodiment, except in some region near the boundary 16C between the track width defining portion 16A and the wide portion 16B, the third side surface S3 touches the first wall surface WS1 and the fourth side surface S4 touches the second wall surface WS2.

According to the method of manufacturing the magnetic head of the second embodiment, in the step of etching the film to be etched 14P illustrated in FIG. 10A to FIG. 10D, almost all of the portion of the film to be etched 14P that is not covered with the mask 32 is removed. As a result, in a region farther from the medium facing surface 30 than the boundary 16C between the track width defining portion 16A and the wide portion 16B, the first and the second wall surface WS1 and WS2 of the encasing layer 12 are almost entirely exposed, except part of the region near the boundary 16C.

According to the method of manufacturing the magnetic head of the second embodiment, in the step of forming the pole layer 16 illustrated in FIG. 11A to FIG. 12D, the pole layer 16 is formed such that the third side surface S3 touches the first wall surface WS1 and the fourth side surface S4 touches the second wall surface WS2, except in some region near the boundary 16C between the track width defining portion 16A and the wide portion 16B.

The remainder of configuration, function and effects of the second embodiment are similar to those of the first embodiment. Modifications similar to the first and the second modification example of the first embodiment are also possible for the second embodiment.

Third Embodiment

Figure 23:
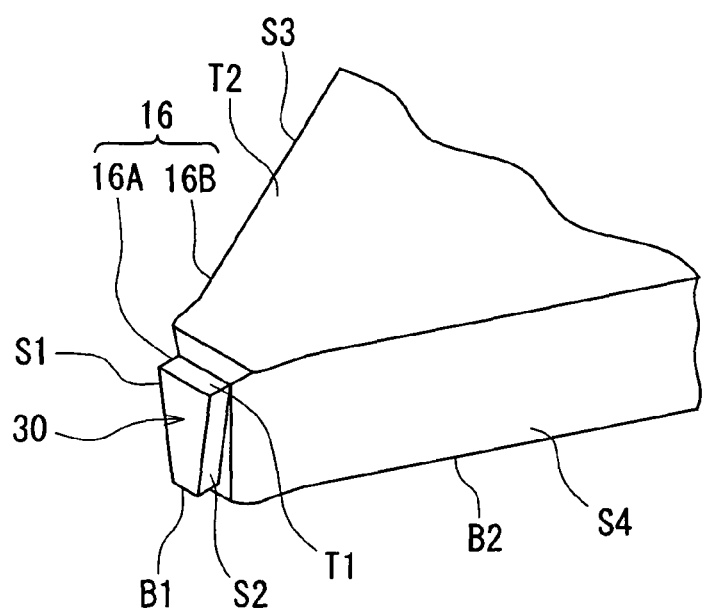
FIG. 23 is a perspective view of part of a pole layer of a magnetic head of a third embodiment of the invention.
Figure 24:
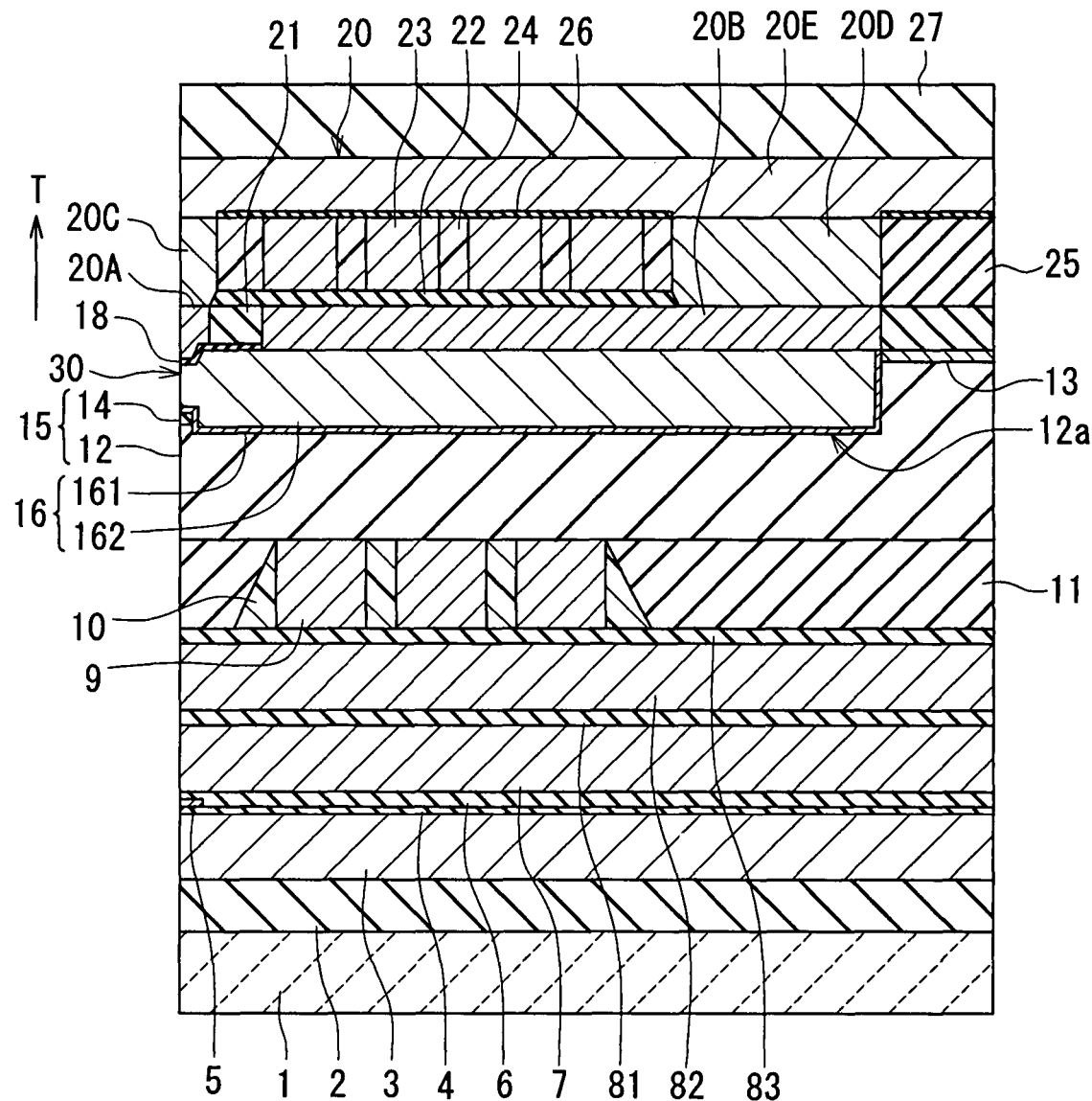
FIG. 24 is a cross-sectional view for illustrating the configuration of the magnetic head of the third embodiment of the invention.
Figure 25:
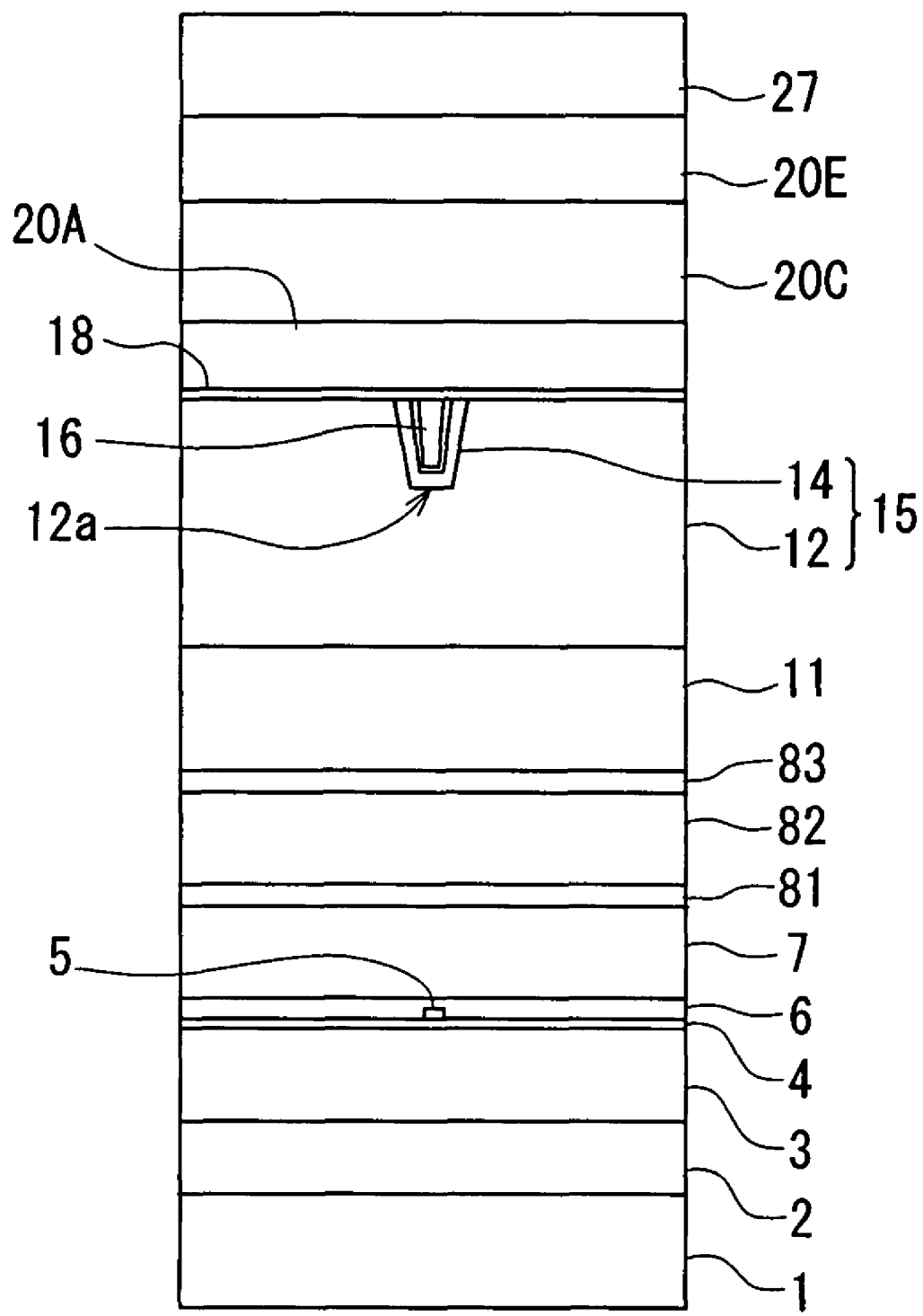
FIG. 25 is a front view of the medium facing surface of the magnetic head of the third embodiment of the invention.

A magnetic head and a method of manufacturing the same of a third embodiment of the invention will now be described. First, reference is made to FIG. 23 to FIG. 25 to describe the configuration of the magnetic head of the third embodiment. FIG. 23 is a perspective view of part of the pole layer 16 of the embodiment near the medium facing surface 30. FIG. 24 is a cross-sectional view for illustrating the configuration of the magnetic head of the embodiment. FIG. 25 is a front view of the medium facing surface of the magnetic head of the embodiment. In the pole layer 16 of the embodiment, the track width defining portion 16A has a first top surface T1 that is a surface farther from the top surface of the substrate 1, and the wide portion 16B has a second top surface T2 that is a surface farther from the top surface of the substrate 1. The second top surface T2 is located farther from the top surface of the substrate 1 than is the first top surface T1.

Furthermore, in the embodiment, the gap layer 18 is provided to cover the whole of the first top surface T1 and part of the second top surface T2. The first layer 20A of the shield 20 has a bottom surface that bends to be opposed to the whole of the first top surface T1 and part of the second top surface T2, with the gap layer 18 disposed in between.

Figure 26:
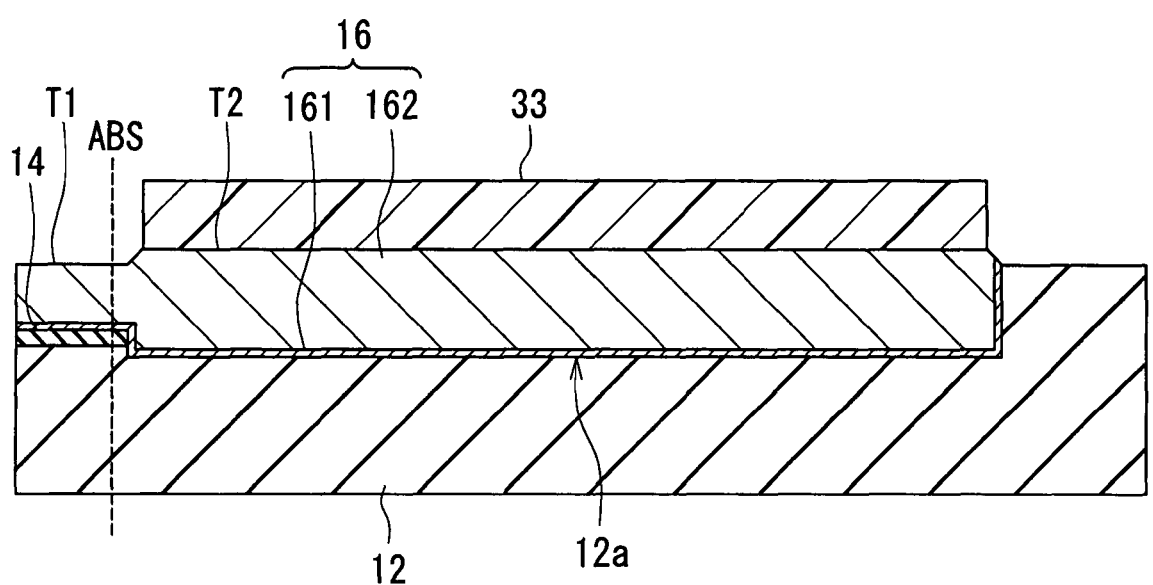
FIG. 26 is a cross-sectional view for illustrating a step of a method of manufacturing the magnetic head of the third embodiment of the invention.

Reference is now made to FIG. 26 to describe the method of manufacturing the magnetic head of the third embodiment. FIG. 26 is a cross-sectional view for illustrating a step of the method of manufacturing the magnetic head of the third embodiment. In FIG. 26, "ABS" denotes an imaginary plane located at the target position of the medium facing surface 30. The portion located below the encasing layer 12 is omitted in FIG. 26.

The method of manufacturing the magnetic head of the third embodiment includes the steps up to the step illustrated in FIG. 12A to FIG. 12D that are the same as those of the first embodiment. In the third embodiment, however, the pole layer 16 is not yet completed at the point at which the step illustrated in FIG. 12A to FIG. 12D is finished. In the next step of the third embodiment, as shown in FIG. 26, a mask 33 is formed on the magnetic layers 161P and 162P that are to become the pole layer 16. The mask 33 covers portions of the top surfaces of the magnetic layers 161P and 162P to be the second top surface T2. The mask 33 is formed by, for example, patterning a photoresist layer by photolithography. Next, in the region that is not covered with the mask 33, the magnetic layers 161P and 162P, the nonmagnetic film 14 and the encasing groove defining layer 13 are etched by ion beam etching, for example. This etching is performed until the top surface of the encasing layer 12 is exposed, for example. As a result, the top surfaces T1 and T2 are formed at the top surfaces of the magnetic layers 161P and 162P, and the magnetic layers 161P and 162P thereby become the first layer 161 and the second layer 162, respectively. The pole layer 16 is thus completed. Next, the mask 33 is removed. The steps that follow are the same as those described with reference to FIG. 13A to FIG. 14B.

In the third embodiment, the track width defining portion 16A has a first top surface T1 that is a surface farther from the top surface of the substrate 1, and the wide portion 16B has a second top surface T2 that is a surface farther from the top surface of the substrate 1. The second top surface T2 is located farther from the top surface of the substrate 1 than is the first top surface T1. As a result, according to the embodiment, it is possible to increase the thickness of the wide portion 16B so as to introduce magnetic flux of great magnitude to the medium facing surface 30 through the pole layer 16, while reducing the thickness of the pole layer 16 taken in the medium facing surface 30 so as to effectively prevent the problems resulting from the skew.

The remainder of configuration, function and effects of the third embodiment are similar to those of the first or the second embodiment. Modifications similar to the first and the second modification example of the first embodiment are also possible for the third embodiment.

Fourth Embodiment

Figure 27:
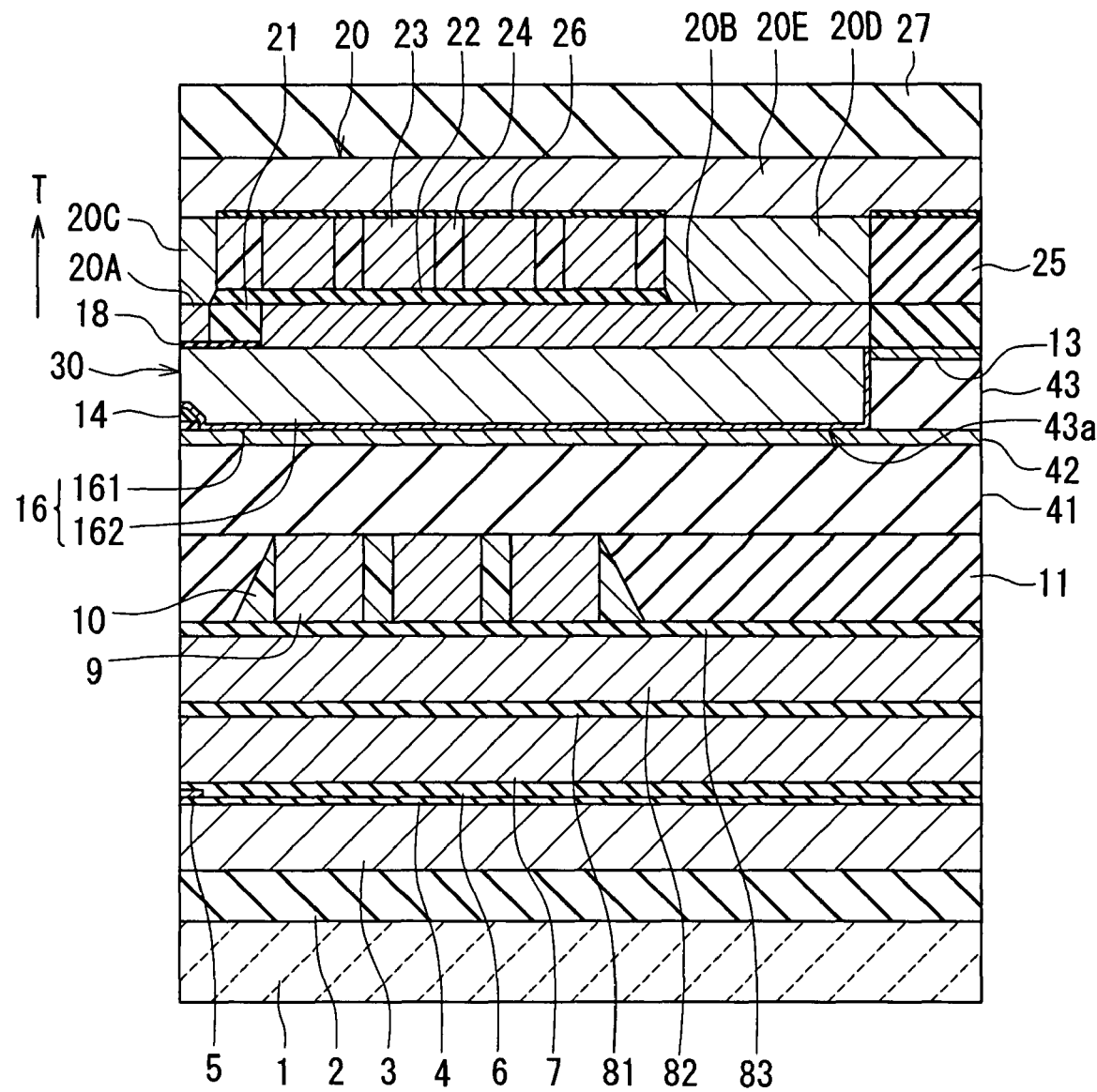
FIG. 27 is a cross-sectional view for illustrating the configuration of a magnetic head of a fourth embodiment of the invention.
Figure 28:
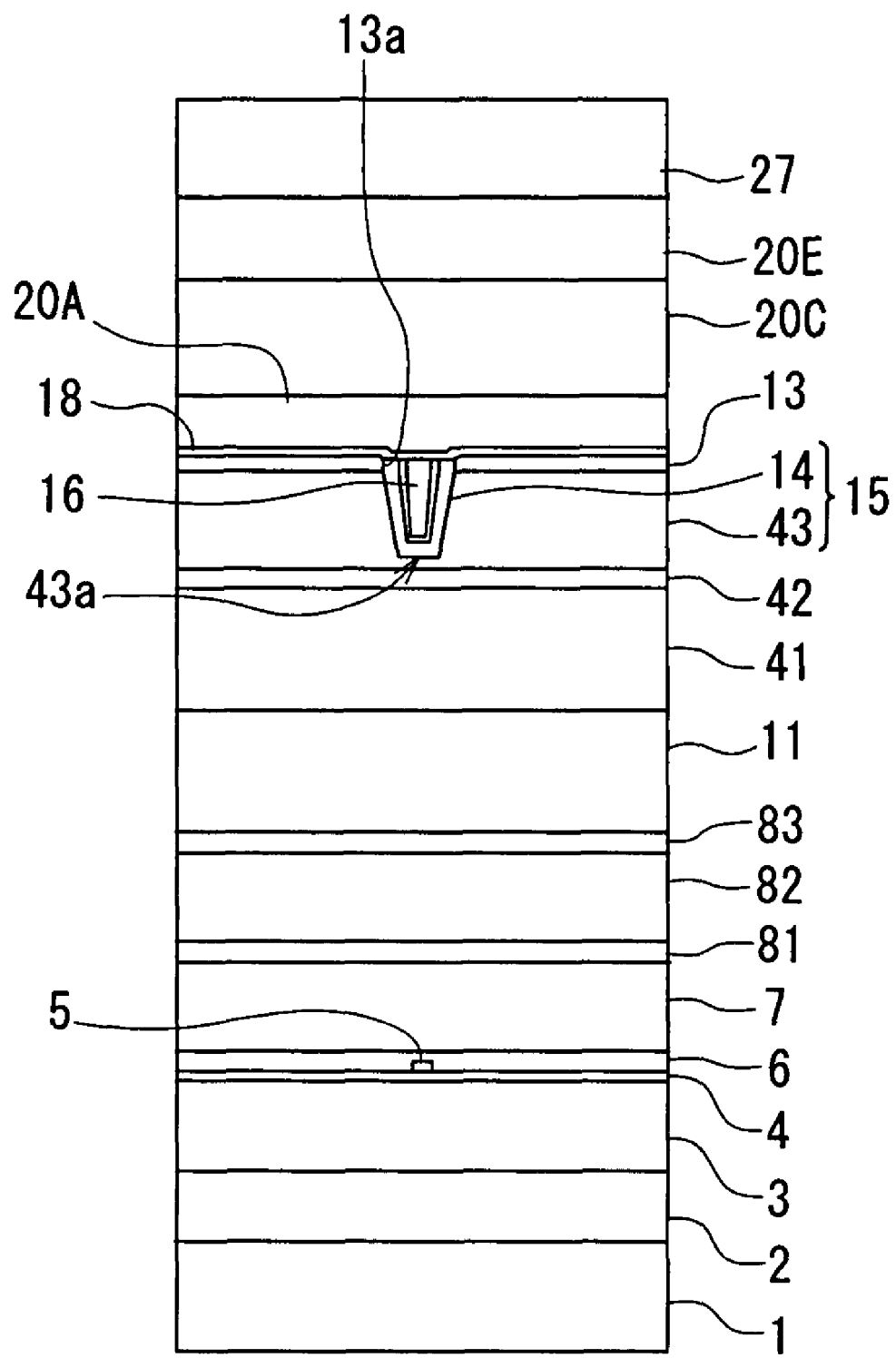
FIG. 28 is a front view of the medium facing surface of the magnetic head of the fourth embodiment of the invention.

A magnetic head and a method of manufacturing the same of a fourth embodiment of the invention will now be described. First, reference is made to FIG. 27 and FIG. 28 to describe the configuration of the magnetic head of the fourth embodiment. FIG. 27 is a cross-sectional view for illustrating the configuration of the magnetic head of the embodiment. FIG. 28 is a front view of the medium facing surface of the magnetic head of the embodiment. FIG. 27 illustrates a cross section orthogonal to the medium facing surface and the top surface of the substrate. The arrow marked with T in FIG. 27 shows the direction of travel of the recording medium.

The magnetic head of the fourth embodiment includes, in place of the encasing layer 12 of the first embodiment, an insulating layer 41 made of an insulating material and disposed on the top surfaces of the coil 9 and the insulating layers 10 and 11, a bottom forming layer 42 disposed on the insulating layer 41, and an encasing layer 43 made of a nonmagnetic material and disposed on the bottom forming layer 42. The insulating layer 41 is made of alumina, for example. The bottom forming layer 42 can be made of any of Ru, NiB, NiP, NiCr, Pd, V, Cr, Nb, Te, Rh, Ir, Re, TaO, Rb, Cs, NiCu, NiPd, AlN, AlF, SiC, and TiC, for example. SiC is particularly preferable as the material of the bottom forming layer 42. The encasing layer 43 has an encasing groove 43a that opens in the top surface of the encasing layer 43. The material of the encasing layer 43 is the same as that of the encasing layer 12 of the first embodiment.

The bottom forming layer 42 is disposed below the encasing layer 43 and touches the encasing layer 43. At least part of a portion of the encasing groove 43a in which the wide portion 16B of the pole layer 16 is placed penetrates the encasing layer 43. The bottom of the portion of the encasing groove 43a that penetrates the encasing layer 43 is formed by the top surface of the bottom forming layer 42. In the encasing groove 43a, the nonmagnetic film 14 is provided between the encasing layer 43 and the pole layer 16. In the embodiment, the encasing section 15 includes the encasing layer 43 and the nonmagnetic film 14. At least part of the pole layer 16 is placed in the groove of the encasing section 15.

In the fourth embodiment, the top surface of the portion of the nonmagnetic film 14 located below the track width defining portion 16A of the pole layer 16 has a portion that is inclined with respect to the direction orthogonal to the medium facing surface 30 such that the distance from the top surface of the substrate 1 decreases with increasing distance from the medium facing surface 30 (this portion will be hereinafter referred to as an inclined portion). The bottom surface B1 of the track width defining portion 16A has a portion that is inclined with respect to the direction orthogonal to the medium facing surface 30 such that the distance from the top surface of the substrate 1 decreases with increasing distance from the medium facing surface 30, in correspondence with the above-described inclined portion.

Figure 29:
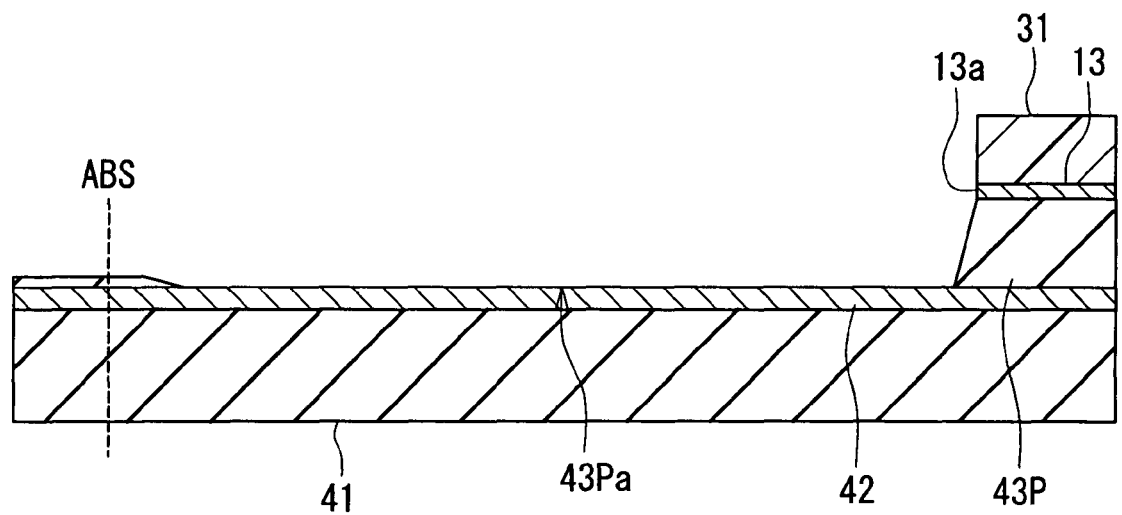
FIG. 29 is a cross-sectional view for illustrating a step of a method of manufacturing the magnetic head of the fourth embodiment of the invention.

Reference is now made to FIG. 29 to describe the method of manufacturing the magnetic head of the fourth embodiment. FIG. 29 is a cross-sectional view for illustrating a step of the method of manufacturing the magnetic head of the fourth embodiment. In FIG. 29, "ABS" denotes an imaginary plane located at the target position of the medium facing surface 30. The portion located below the insulating layer 41 is omitted in FIG. 29.

The method of manufacturing the magnetic head of the fourth embodiment includes the steps up to the step of flattening the top surfaces of the coil 9 and the insulating layers 10 and 11 that are the same as those of the first embodiment. In the next step of the fourth embodiment, as shown in FIG. 29, the insulating layer 41 and the bottom forming layer 42 are formed in this order on the flattened top surfaces of the coil 9 and the insulating layers 10 and 11, and then a nonmagnetic layer 43P is formed on the bottom forming layer 42, the nonmagnetic layer 43P being intended to become the encasing layer 43 later by undergoing formation of the encasing groove 43a therein. Next, the encasing groove defining layer 13 is formed on the nonmagnetic layer 43P by sputtering, for example. Next, as in the first embodiment, the encasing groove defining layer 13 is etched using the mask 31 to thereby form the opening 13a in the encasing groove defining layer 13. Next, as in the first embodiment, a portion of the nonmagnetic layer 43P exposed from the opening 13a of the encasing groove defining layer 13 is selectively etched, using the mask 31 and the encasing groove defining layer 13 as etching masks, to thereby form in the nonmagnetic layer 43P an initial groove 43Pa that is to become the encasing groove 43a later by undergoing etching. Next, the mask 31 is removed. The edge of the opening 13a of the encasing groove defining layer 13 is located directly above the edge of the initial groove 43Pa in the top surface of the nonmagnetic layer 43P. The method of etching the nonmagnetic layer 43P is the same as the method of etching the nonmagnetic layer 12P of the first embodiment.

In the step of etching the nonmagnetic layer 43P, as shown in FIG. 29, at least part of a portion of the initial groove 43Pa in which the wide portion 16B of the pole layer 16 is to be placed later is formed to penetrate the nonmagnetic layer 43P.

According to the fourth embodiment, the steps that follow are the same as those described with reference to FIG. 8A to FIG. 14B in the first embodiment, except that the nonmagnetic layer 12P and the encasing layer 12 of the first embodiment are replaced with the nonmagnetic layer 43P and the encasing layer 43 and additional steps described below are performed in the fourth embodiment.

The additional steps in the fourth embodiment are performed after the step illustrated in FIG. 10A to FIG. 10D. That is, in the fourth embodiment, after the nonmagnetic film 14 having the shape shown in FIG. 10C is formed by etching the film to be etched 14P, the top surface of a portion of the nonmagnetic film 14 on which the track width defining portion 16A is to be formed later is partially etched to thereby form the inclined portion previously described. The inclined portion can be formed by, for example, etching the nonmagnetic film 14 together with part of the mask 32 after the step illustrated in FIG. 10A to FIG. 10D, or etching the nonmagnetic film 14 using a mask for forming the inclined portion, the mask being formed after the mask 32 is removed. This etching is performed by, for example, RIE with an etching gas containing $CF_4$, $Cl_2$ and $BCl_3$. During this etching, the initial groove 43Pa cannot become deep since the bottom forming layer 42 exists below the nonmagnetic layer 43P.

Alternatively, in the fourth embodiment, the above-described additional steps may be omitted so that the top surface of the portion of the nonmagnetic film 14 located below the track width defining portion 16A and the bottom surface B1 of the track width defining portion 16A may be formed into shapes the same as those of the first embodiment.

According to the fourth embodiment, it is possible to precisely control the maximum depth of the encasing groove 43a by the bottom forming layer 42. As a result, according to the embodiment, it is possible to precisely control the thickness of the pole layer 16.

The remainder of configuration, function and effects of the fourth embodiment are similar to those of the first or the second embodiment. Modifications similar to the first and the second modification example of the first embodiment are also possible for the fourth embodiment. Furthermore, in the fourth embodiment, the first and the second top surface T1 and T2 may be formed in the pole layer 16, as in the third embodiment.

Fifth Embodiment

Figure 30:
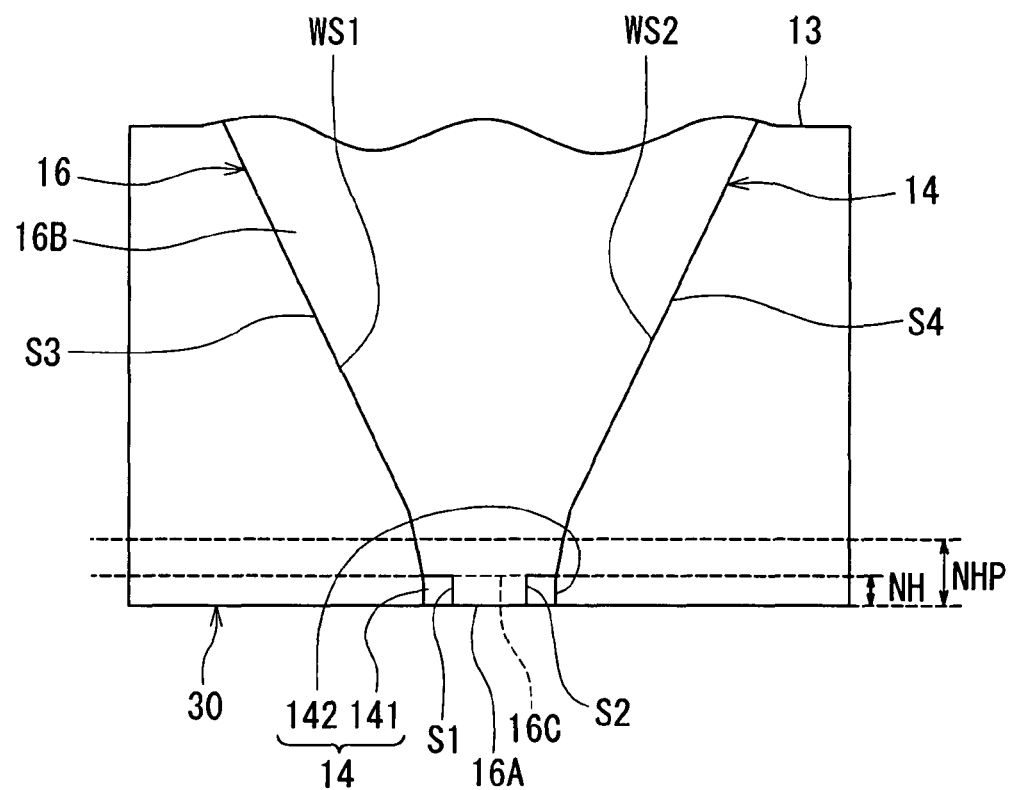
FIG. 30 is a top view of part of a pole layer of a magnetic head of a fifth embodiment of the invention.

A magnetic head and a method of manufacturing the same of a fifth embodiment of the invention will now be described. First, reference is made to FIG. 30 to describe the configuration of the magnetic head of the fifth embodiment. FIG. 30 is a top view of part of the pole layer 16 of the fifth embodiment near the medium facing surface 30. In the magnetic head of the fifth embodiment, the nonmagnetic film 14 has only the first portion 141 located between the first side surface S1 and the first wall surface WS1 and the second portion 142 located between the second side surface S2 and the second wall surface WS2. Furthermore, in the fifth embodiment, the third side surface S3 entirely touches the first wall surface WS1, and the fourth side surface S4 entirely touches the second wall surface WS2.

The method of manufacturing the magnetic head of the fifth embodiment will now be described. The method of manufacturing the magnetic head of the fifth embodiment includes the steps up to the step of forming the initial groove 12Pa in the nonmagnetic layer 12P as illustrated in FIG. 7A to FIG. 7D that are the same as those of the first embodiment. In the fifth embodiment, this step of forming the initial groove 12Pa is called a first etching step.

Figure 31A:
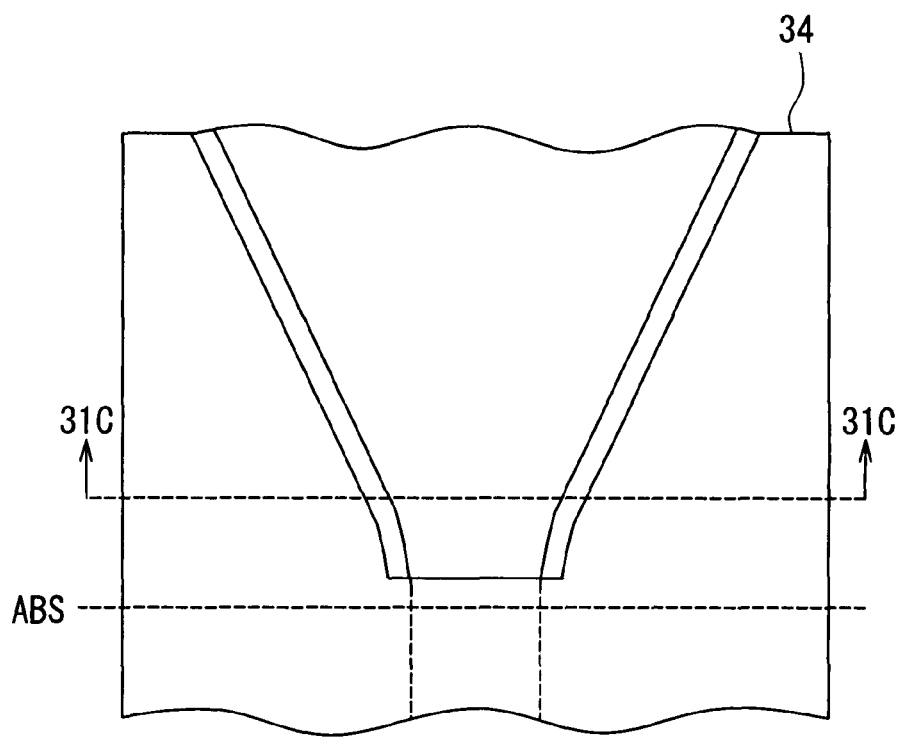
FIG. 31A to FIG. 31D are views for illustrating a step of a method of manufacturing the magnetic head of the fifth embodiment of the invention.
Figure 31B:
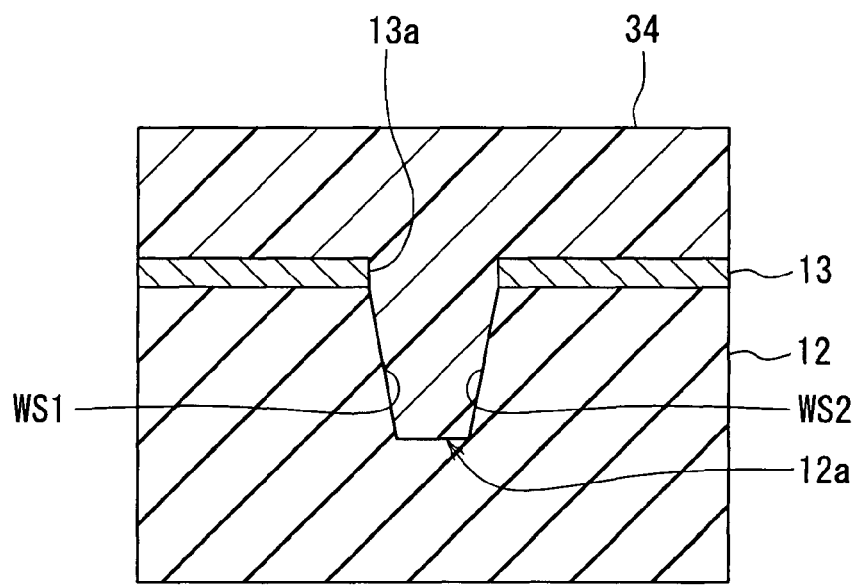
Figure 31C:
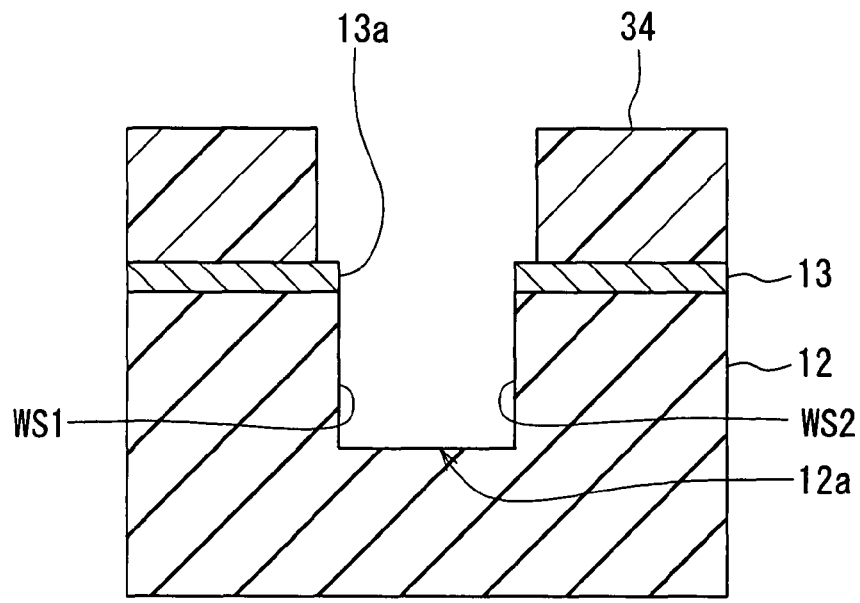
Figure 31D:
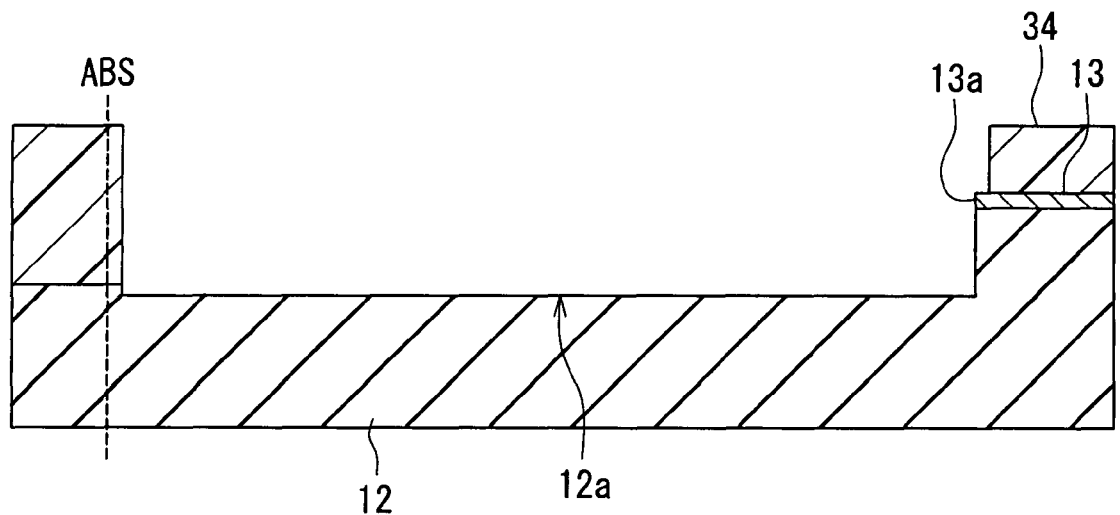

FIG. 31A to FIG. 31D illustrate the next step. FIG. 31A is a top view of a stack of layers obtained in the course of the manufacture of the magnetic head. FIG. 31B is a cross-sectional view illustrating a cross section of the stack of layers of FIG. 31A taken in the plane ABS. FIG. 31C is a cross-sectional view of the stack of layers of FIG. 31A taken along line 31C-31C. FIG. 31D is a cross-sectional view illustrating a cross section of the stack of layers of FIG. 31A orthogonal to the plane ABS and the top surface of the substrate.

In this step, first, formed is a mask 34 for covering portions of the initial groove 12Pa and the opening 13a in which the track width defining portion 16A is to be placed later. The mask 34 is formed by, for example, patterning a photoresist layer by photolithography. Next, a portion of the initial groove 12Pa that is not covered with the mask 34 is etched using the mask 34 and the encasing groove defining layer 13 as etching masks, so that the encasing groove 12a is completed. The nonmagnetic layer 12P thereby becomes the encasing layer 12. This step is called a second etching step. The second etching step is performed by reactive ion etching or ion beam etching, for example. The second etching step may be performed by isotropic etching, as well as anisotropic etching such as reactive ion etching or ion beam etching. Isotropic etching in this case may be wet etching or dry etching. In the case of employing wet etching, an alkaline etchant is used. Next, the mask 34 is removed.

According to the fifth embodiment, in the first etching step, portions of the encasing groove 12a that are to be opposed to the first and the second side surface S1 and S2 and the first bottom surface B1 of the pole layer 16 are formed. In the second etching step, portions of the encasing groove 12a that are to be opposed to the third and the fourth side surface S3 and S4 and the second bottom surface B2 of the pole layer 16 are formed.

Figure 32A:
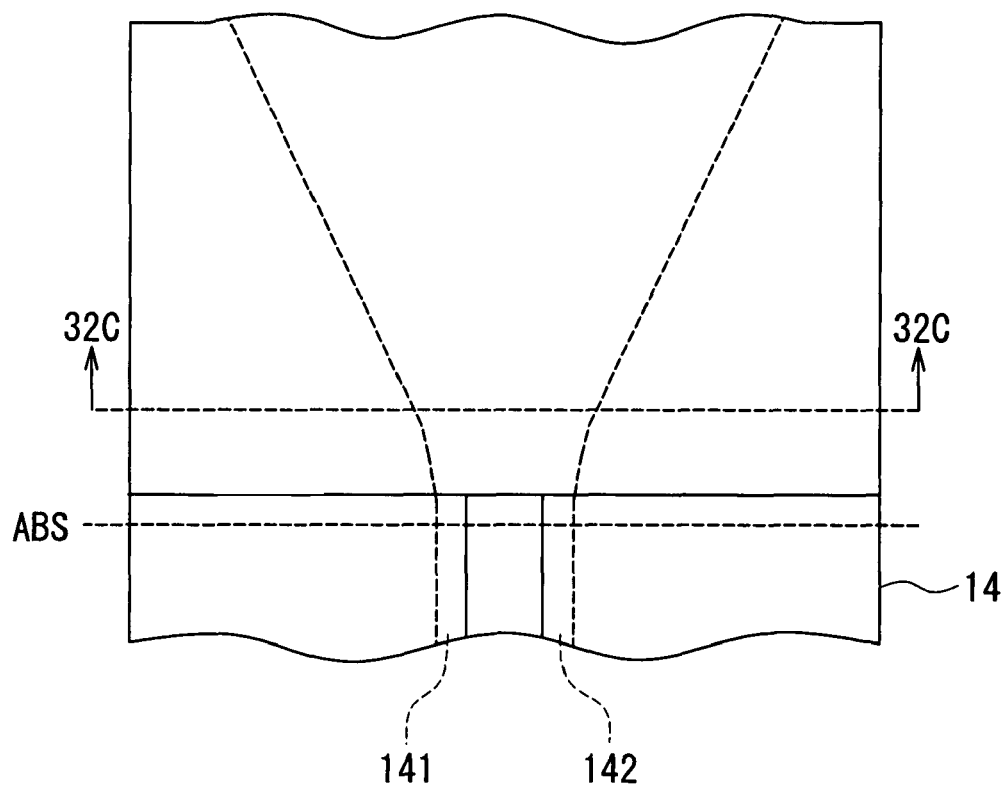
FIG. 32A to FIG. 32D are views for illustrating a step that follows the step of FIG. 31A to FIG. 31D.
Figure 32B:
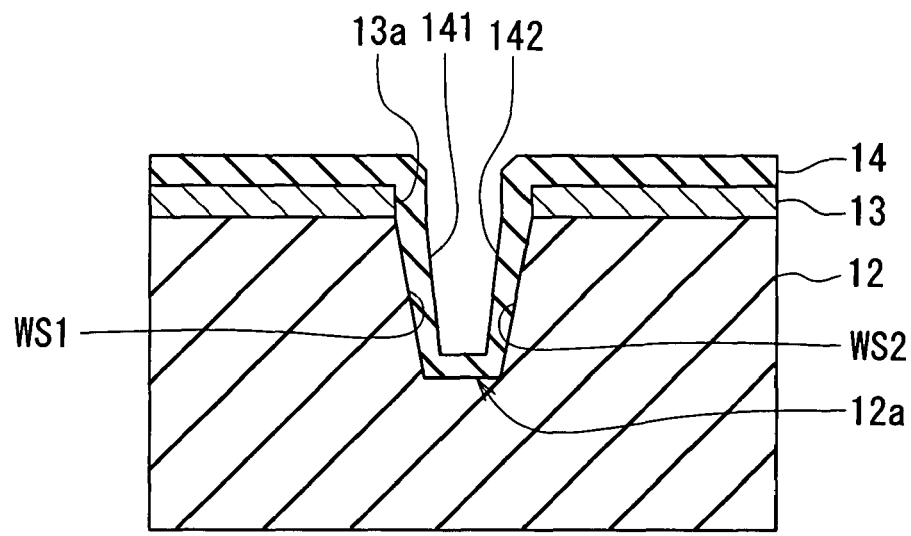
Figure 32C:
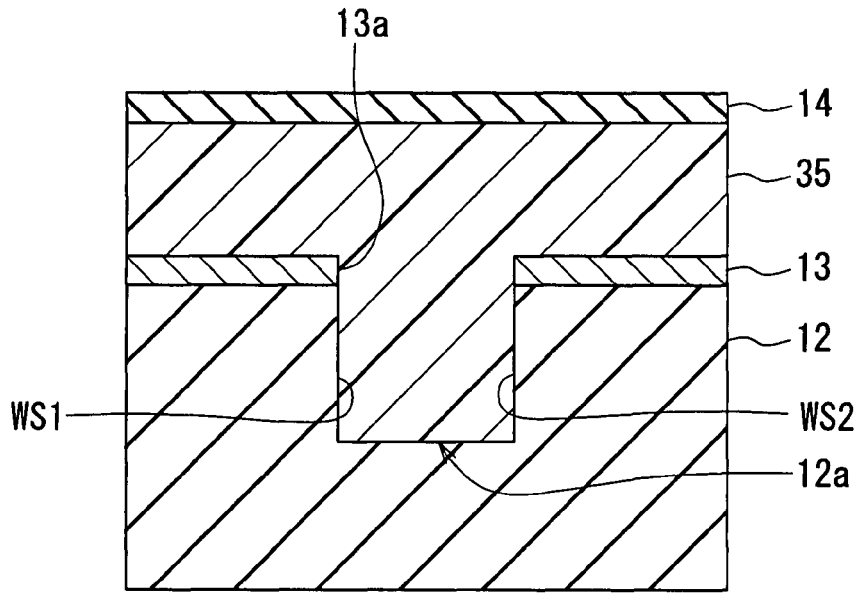
Figure 32D:
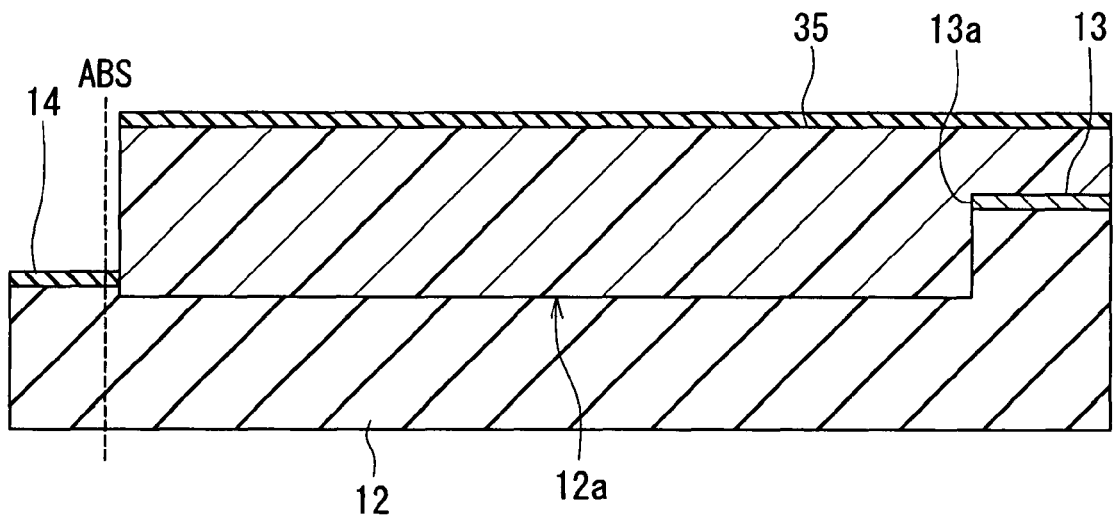

FIG. 32A to FIG. 32D illustrate the next step. FIG. 32A is a top view of a stack of layers obtained in the course of the manufacture of the magnetic head. FIG. 32B is a cross-sectional view illustrating a cross section of the stack of layers of FIG. 32A taken in the plane ABS. FIG. 32C is a cross-sectional view of the stack of layers of FIG. 32A taken along line 32C-32C. FIG. 32D is a cross-sectional view illustrating a cross section of the stack of layers of FIG. 32A orthogonal to the plane ABS and the top surface of the substrate.

In this step, first, formed is a mask 35 for covering the portion of the encasing groove 12a in which the wide portion 16B is to be placed later. Next, the nonmagnetic film 14 is formed to cover portions of the first and the second wall surface WS1 and WS2 of the encasing layer 12 that are not covered with the mask 35. As shown in FIG. 32A and FIG. 32B, the nonmagnetic film 14 includes the first portion 141 ad the second portion 142. Next, the mask 35 is removed.

According to the fifth embodiment, the steps that follow are the same as those described with reference to FIG. 11A to FIG. 14B in the first embodiment.

According to the fifth embodiment, it is possible to form the nonmagnetic film 14 to have the first portion 141 and the second portion 142 only. As a result, according to the embodiment, the position of the boundary 16C between the track width defining portion 16A and the wide portion 16B is definite.

The remainder of configuration, function and effects of the fifth embodiment are similar to those of the first embodiment. Modifications similar to the first and the second modification example of the first embodiment are also possible for the fifth embodiment. Furthermore, in the fifth embodiment, the first and the second top surface T1 and T2 may be formed in the pole layer 16, as in the third embodiment. Furthermore, in the fifth embodiment, the insulating layer 41, the bottom forming layer 42 and the encasing layer 43 may be provided in place of the encasing layer 12, as in the fourth embodiment.

Sixth Embodiment

A magnetic head and a method of manufacturing the same of a sixth embodiment of the invention will now be described.

Figure 33:
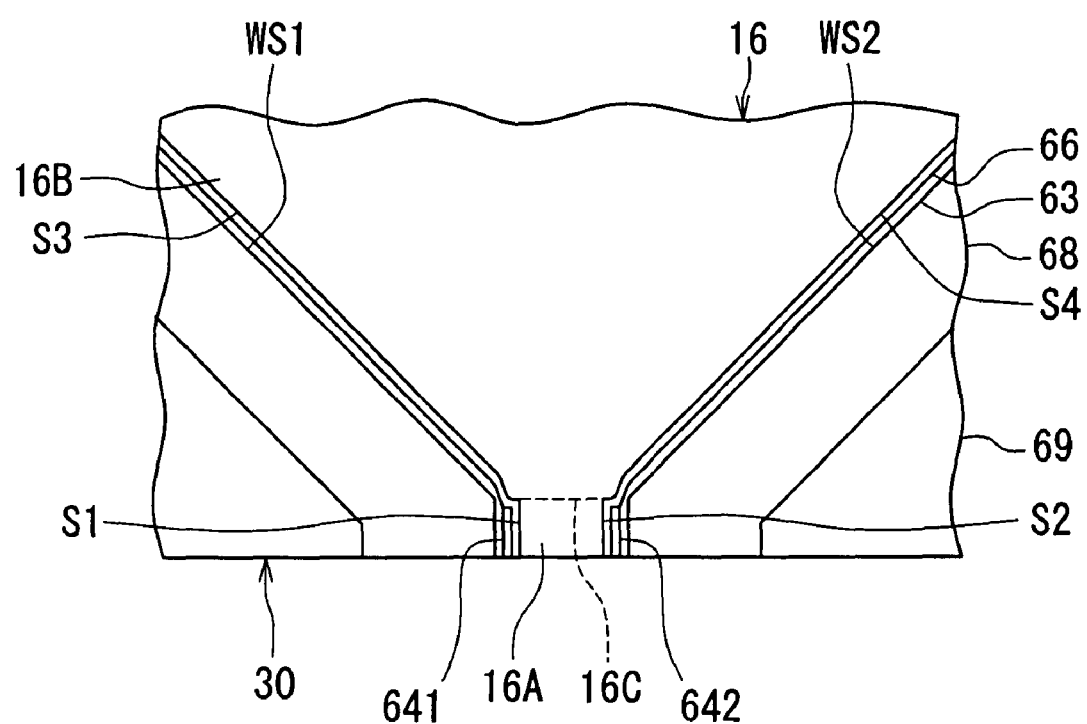
FIG. 33 is a top view of part of a pole layer of a magnetic head of a sixth embodiment of the invention.
Figure 34:
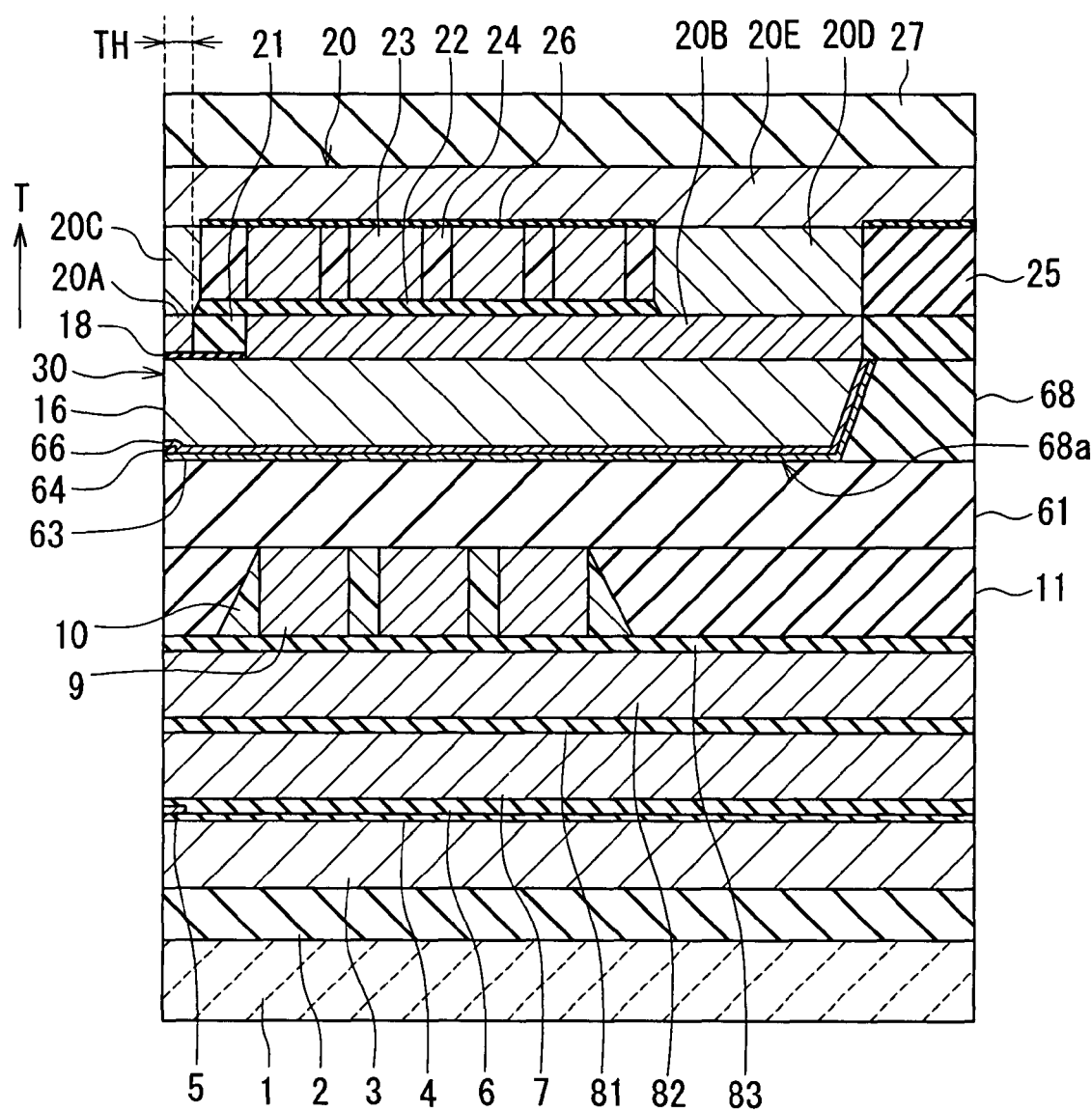
FIG. 34 is a cross-sectional view for illustrating the configuration of the magnetic head of the sixth embodiment of the invention.
Figure 35:
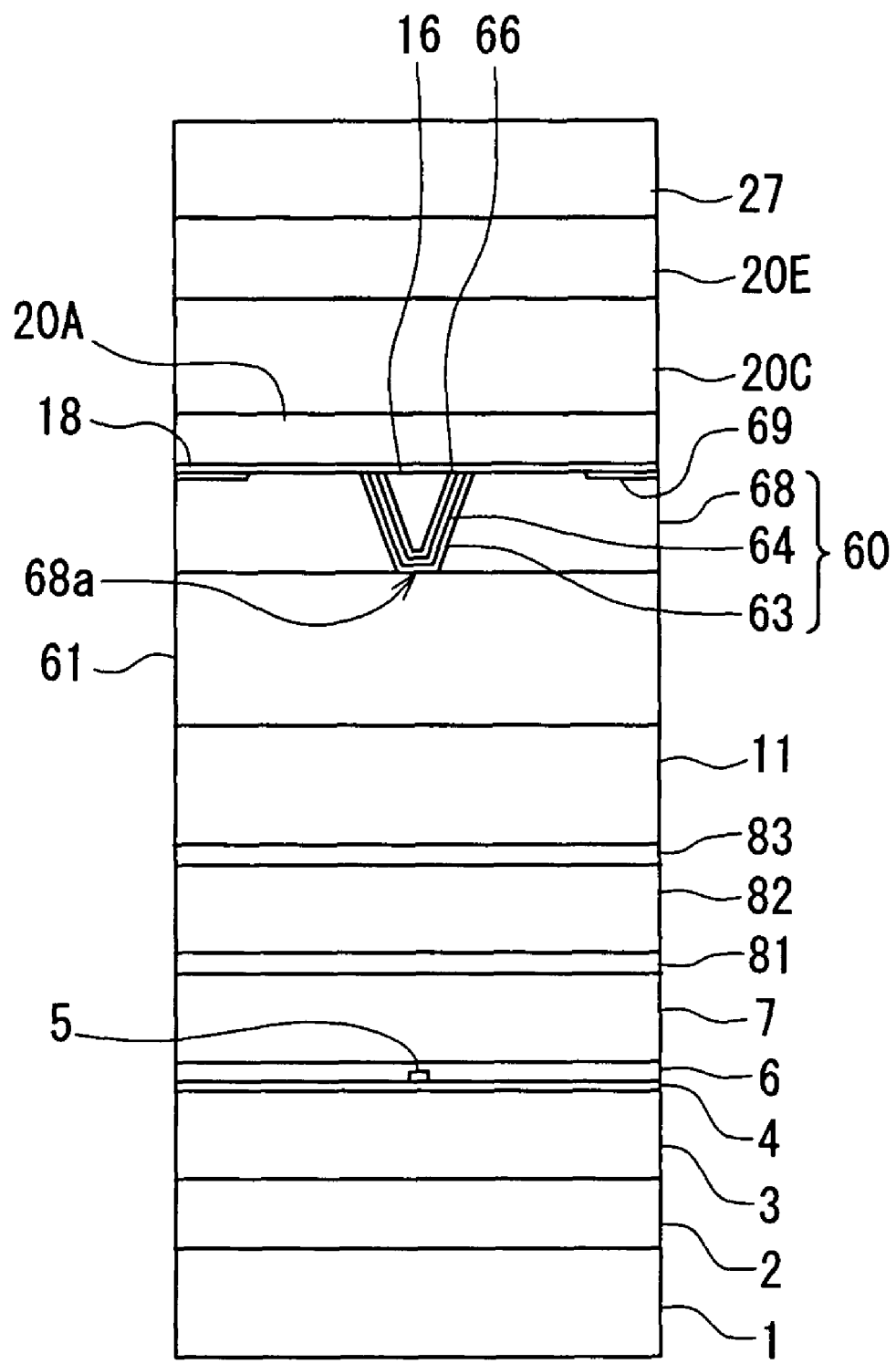
FIG. 35 is a front view of the medium facing surface of the magnetic head of the sixth embodiment of the invention.

First, reference is made to FIG. 33 to FIG. 35 to describe the configuration of the magnetic head of the sixth embodiment. FIG. 33 is a top view of part of the pole layer 16 of the embodiment near the medium facing surface 30. FIG. 34 is a cross-sectional view for illustrating the configuration of the magnetic head of the embodiment. FIG. 35 is a front view of the medium facing surface of the magnetic head of the embodiment. FIG. 34 illustrates a cross section orthogonal to the medium facing surface and the top surface of the substrate. The arrow marked with T in FIG. 34 shows the direction of travel of the recording medium.

The magnetic head of the sixth embodiment includes, in place of the encasing layer 12 of the first embodiment, an insulating layer 61 made of an insulating material and disposed on the top surfaces of the coil 9 and the insulating layers 10 and 11, and an encasing layer 68 made of a nonmagnetic material and disposed on the insulating layer 61. The insulating layer 61 and the encasing layer 68 are each made of alumina, for example. The encasing layer 68 has an encasing groove 68a that opens in the top surface of the encasing layer 68 and that accommodates at least part of the pole layer 16.

The magnetic head of the sixth embodiment further includes, in place of the nonmagnetic film 14 of the first embodiment, nonmagnetic films 63 and 64 and a seed layer 66. The nonmagnetic films 63 and 64 and the seed layer 66 are located in the encasing groove 68a, between the encasing layer 68 and the pole layer 16. The nonmagnetic films 63 and 64 and the seed layer 66 are disposed in this order, which is the order of closeness to the encasing layer 68. Each of the nonmagnetic films 63 and 64 and the seed layer 66 has a thickness within a range of 20 to 80 nm, for example.

The nonmagnetic film 63 and the seed layer 66 can be made of, for example, a nonmagnetic metal material the same as that used for the encasing groove defining layer 13 of the first embodiment. Alternatively, the seed layer 66 may be made of a magnetic material, as is the pole layer 16. The nonmagnetic film 64 can be made of a material the same as the material of the nonmagnetic film 14 of the first embodiment, for example. The nonmagnetic films 63 and 64 correspond to the nonmagnetic film of the present invention. The encasing layer 68 and the nonmagnetic films 63 and 64 constitute an encasing section 60 of the sixth embodiment. The magnetic head of the sixth embodiment does not include the encasing groove defining layer 13.

The pole layer 16 includes the track width defining portion 16A and the wide portion 16B, as in the first embodiment. The track width defining portion 16A has the first side surface S1 and the second side surface S2 that are located on opposite sides in the direction of track width. The wide portion 16B has the third side surface S3 contiguous to the first side surface S1, and the fourth side surface S4 contiguous to the second side surface S2. Like the encasing layer 12 of the first embodiment, the encasing layer 68 has a first wall surface WS1 and a second wall surface WS2 that form the encasing groove 68a. The first wall surface WS1 is opposed to the first side surface S1 and the third side surface S3, while the second wall surface WS2 is opposed to the second side surface S2 and the fourth side surface S4.

The nonmagnetic film 64 has only a first portion 641 located between the first side surface S1 and the first wall surface WS1 and a second portion 642 located between the second side surface S2 and the second wall surface WS2. As a result, the distance between the third side surface S3 and the first wall surface WS1 is smaller than the distance between the first side surface S1 and the first wall surface WS1, and the distance between the fourth side surface S4 and the second wall surface WS2 is smaller than the distance between the second side surface S2 and the second wall surface WS2.

Reference is now made to FIG. 36A to FIG. 44C to describe the method of manufacturing the magnetic head of the sixth embodiment. The method of manufacturing the magnetic head of the sixth embodiment includes the steps up to the step of flattening the top surfaces of the coil 9 and the insulating layers 10 and 11 that are the same as those of the first embodiment.

Figure 36A:
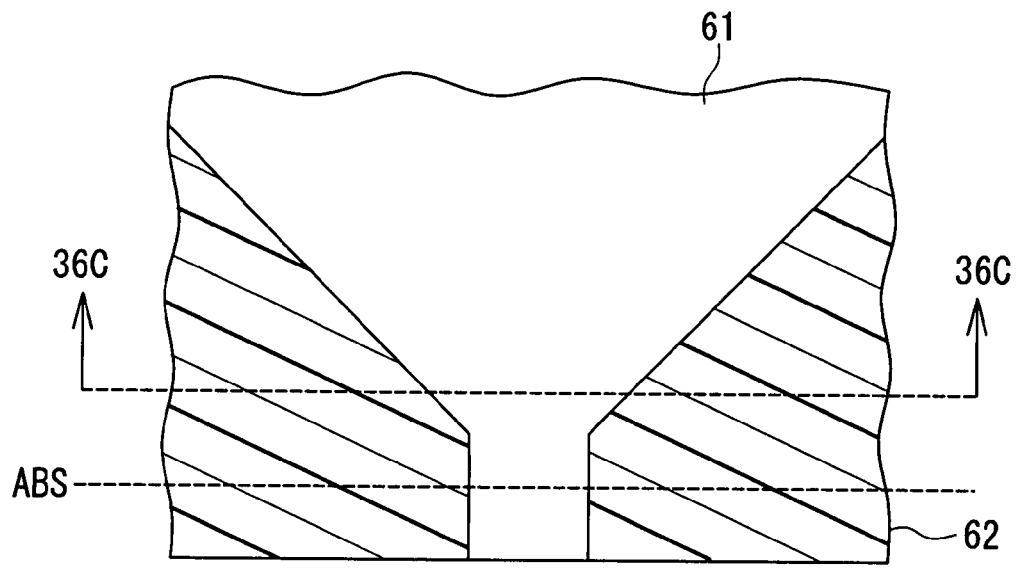
FIG. 36A to FIG. 36C are views for illustrating a step of a method of manufacturing the magnetic head of the sixth embodiment of the invention.
Figure 36B:
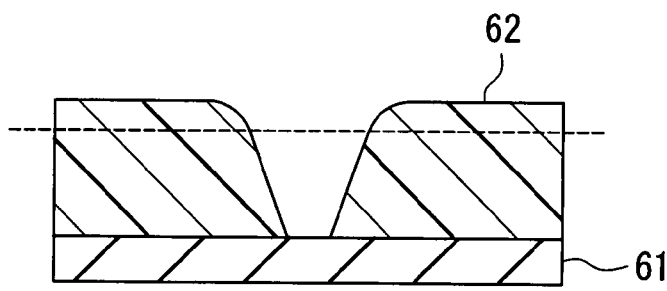
Figure 36C:
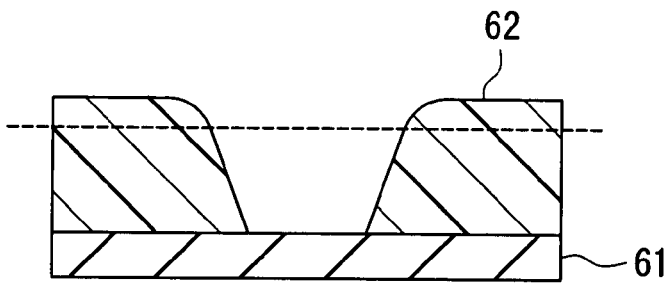

FIG. 36A to FIG. 36C illustrate the next step. FIG. 36A is a cross-sectional view of a stack of layers obtained in the course of the manufacture of the magnetic head. FIG. 36B is a cross-sectional view illustrating a cross section of the stack of layers of FIG. 36A taken in the plane ABS. FIG. 36C is a cross-sectional view of the stack of layers of FIG. 36A taken along line 36C-36C. FIG. 36A illustrates a cross section taken at the position indicated with broken lines in FIG. 36B and FIG. 36C.

In this step, first, the insulating layer 61 is formed on the flattened top surfaces of the coil 9 and the insulating layers 10 and 11. Next, a frame 62 is formed on the insulating layer 61. The frame 62 has a groove in which the pole layer 16 is to be formed later. The frame 62 is formed by, for example, patterning a photoresist layer by photolithography. The frame 62 has a thickness of 0.8 µm, for example.

Figure 37A:
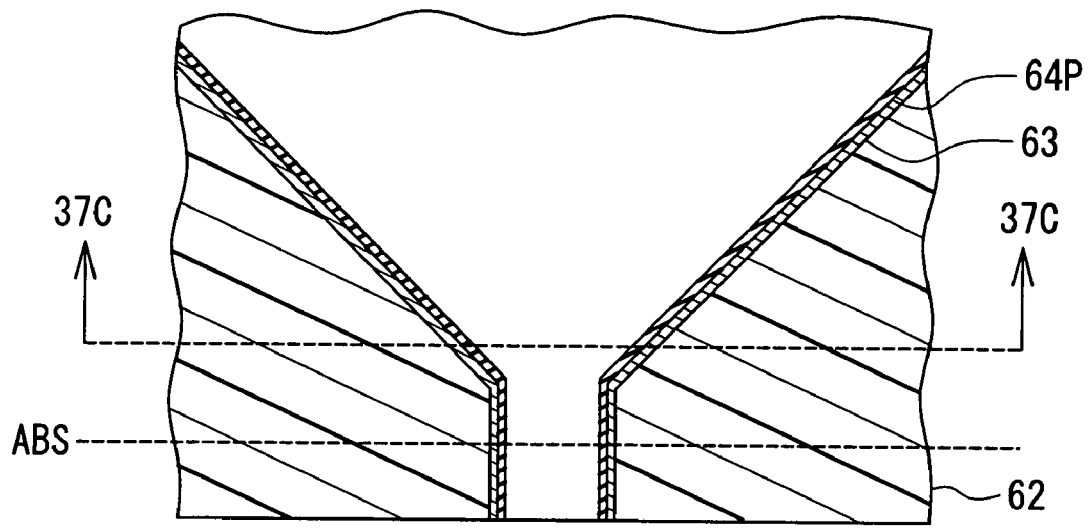
FIG. 37A to FIG. 37C are views for illustrating a step that follows the step of FIG. 36A to FIG. 36C.
Figure 37B:
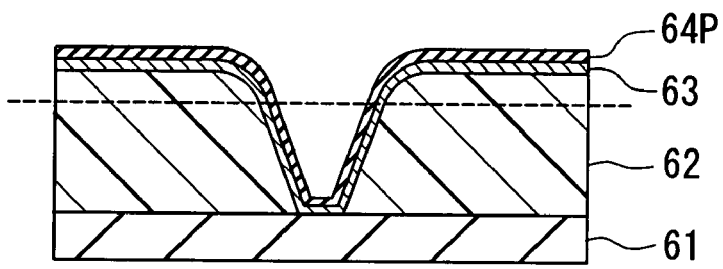
Figure 37C:
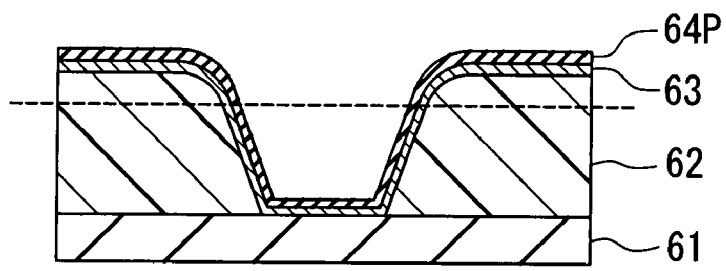

FIG. 37A to FIG. 37C illustrate the next step. FIG. 37A is a cross-sectional view of a stack of layers obtained in the course of the manufacture of the magnetic head. FIG. 37B is a cross-sectional view illustrating a cross section of the stack of layers of FIG. 37A taken in the plane ABS. FIG. 37C is a cross-sectional view of the stack of layers of FIG. 37A taken along line 37C-37C. FIG. 37A illustrates a cross section taken at the position indicated with broken lines in FIG. 37B and FIG. 37C. In this step, first, the nonmagnetic film 63 is formed on the entire top surface of the stack of layers by sputtering or ALCVD, for example. Next, a film to be etched 64P is formed on the entire top surface of the stack of layers, the film to be etched 64P being intended to become the nonmagnetic film 64 later by undergoing partial etching. The method of forming the film to be etched 64P is the same as the method of forming the film to be etched 14P of the first embodiment.

Figure 38A:
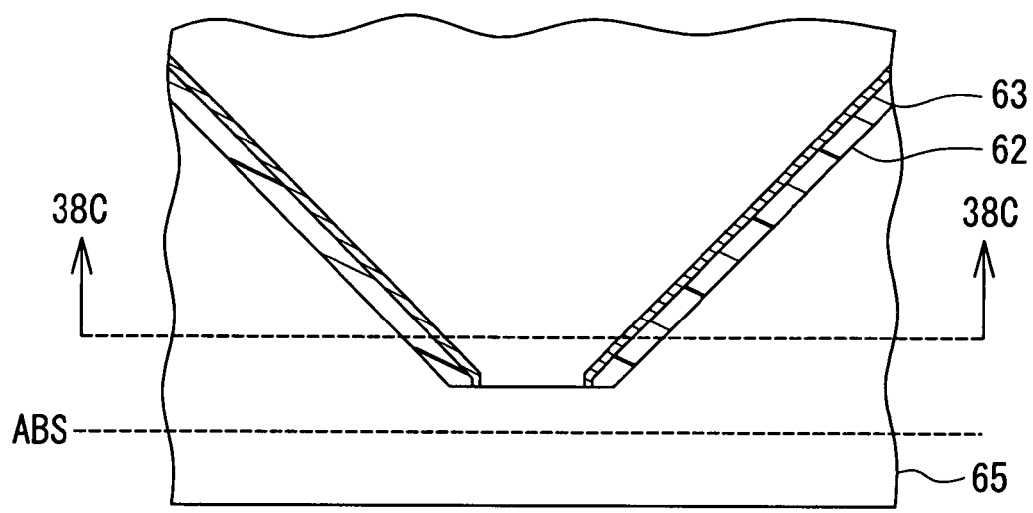
FIG. 38A to FIG. 38C are views for illustrating a step that follows the step of FIG. 37A to FIG. 37C.
Figure 38B:
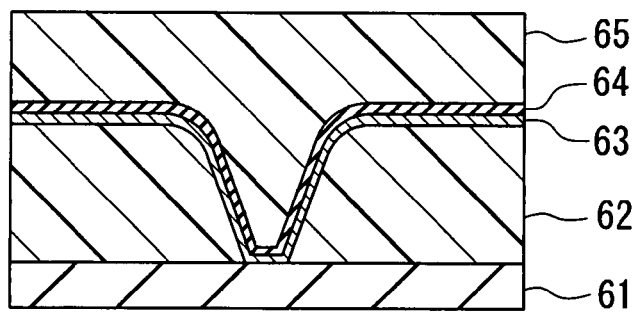
Figure 38C:
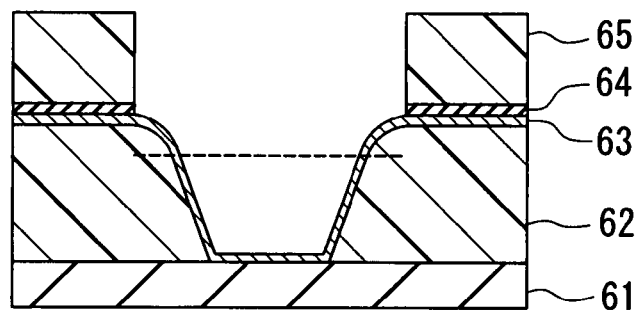

FIG. 38A to FIG. 38C illustrate the next step. FIG. 38A is a partially cut-out top view of a stack of layers obtained in the course of the manufacture of the magnetic head. FIG. 38B is a cross-sectional view illustrating a cross section of the stack of layers of FIG. 38A taken in the plane ABS. FIG. 38C is a cross-sectional view of the stack of layers of FIG. 38A taken along line 38C-38C. In FIG. 38A the hatched part illustrates a cross section taken at the position indicated with broken lines in FIG. 38C.

In this step, formed is a mask 65 for covering a portion of the film to be etched 64P that is to become the first portion 641 and the second portion 642 of the nonmagnetic film 64 later. The mask 65 is formed by patterning a photoresist layer by photolithography. Next, a portion of the film to be etched 64P that is not covered with the mask 65 is etched at least partially. As a result, the portion of the film 64P that is located in the region where the wide portion 16B of the pole layer 16 is to be formed later is removed, and the film 64P thereby becomes the nonmagnetic film 64.

Figure 39A:
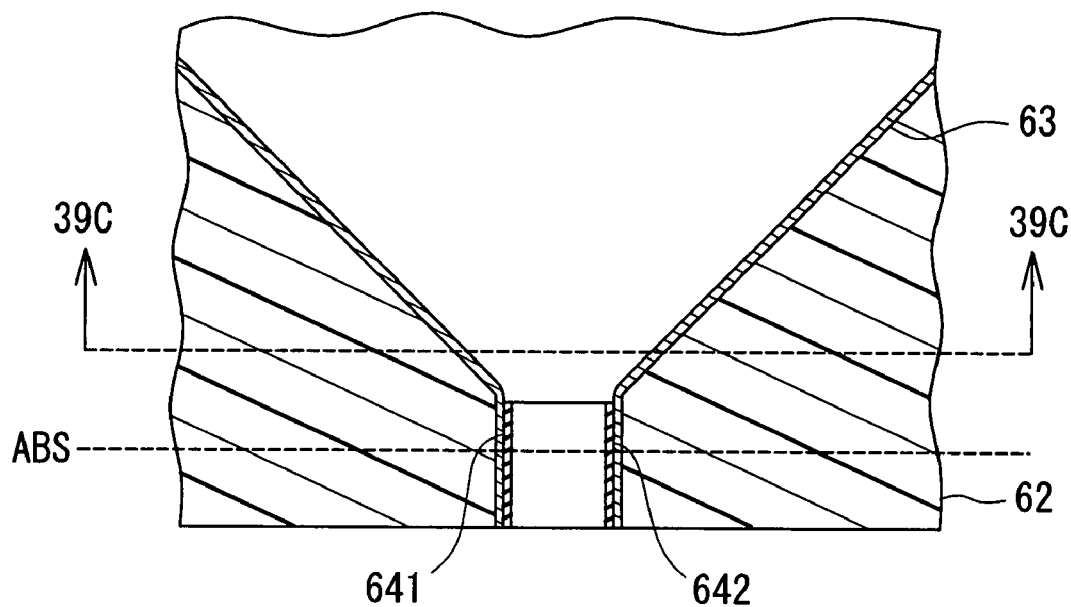
FIG. 39A to FIG. 39C are views for illustrating a step that follows the step of FIG. 38A to FIG. 38C.
Figure 39B:
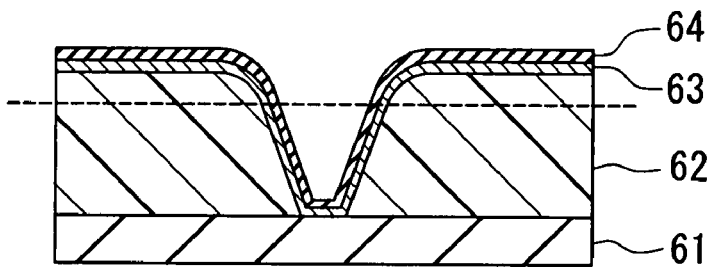
Figure 39C:
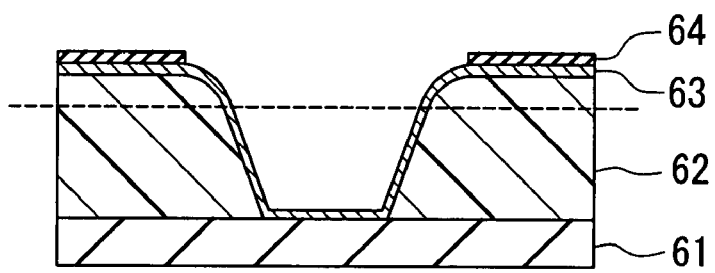

FIG. 39A to FIG. 39C illustrate the next step. FIG. 39A is a cross-sectional view of part of a stack of layers obtained in the course of the manufacture of the magnetic head. FIG. 39B is a cross-sectional view illustrating a cross section of the stack of layers of FIG. 39A taken in the plane ABS. FIG. 39C is a cross-sectional view of the stack of layers of FIG. 39A taken along line 39C-39C. FIG. 39A illustrates a cross section taken at the position indicated with broken lines in FIG. 39B and FIG. 39C. In this step, the mask 65 is removed.

Figure 40A:
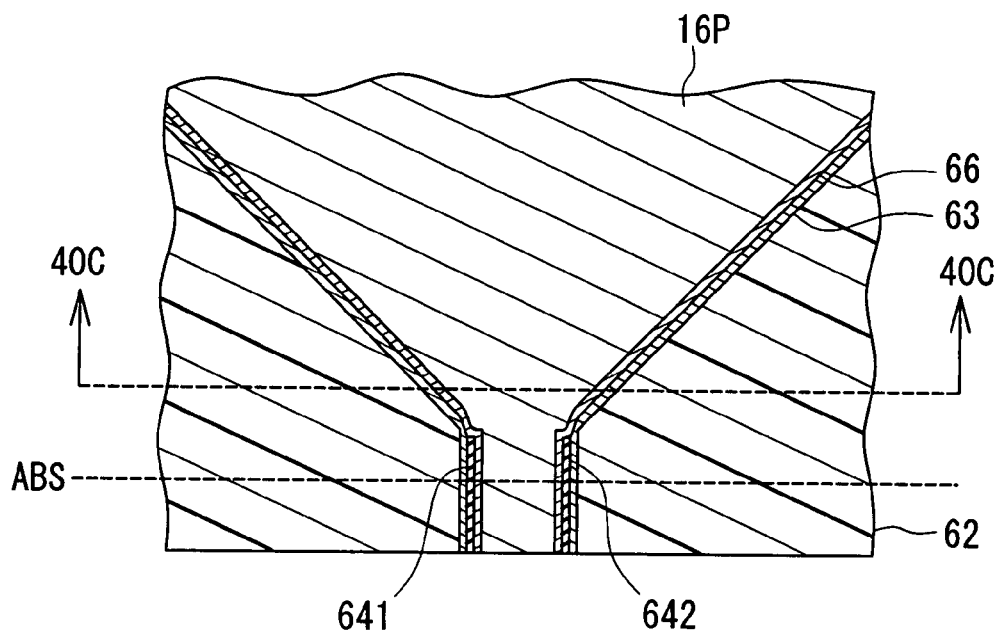
FIG. 40A to FIG. 40C are views for illustrating a step that follows the step of FIG. 39A to FIG. 39C.
Figure 40B:
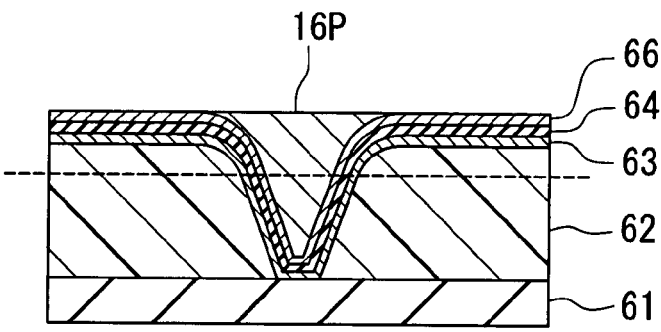
Figure 40C:
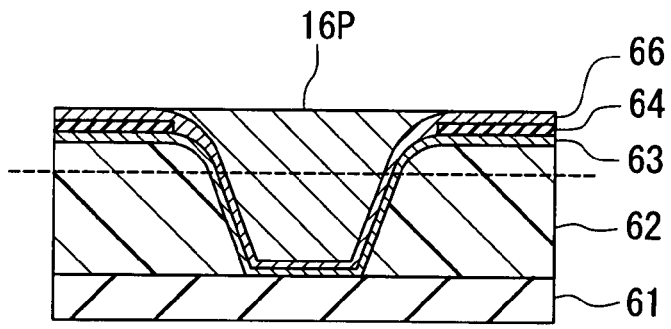

FIG. 40A to FIG. 40C illustrate the next step. FIG. 40A is a cross-sectional view of a stack of layers obtained in the course of the manufacture of the magnetic head. FIG. 40B is a cross-sectional view illustrating a cross section of the stack of layers of FIG. 40A taken in the plane ABS. FIG. 40C is a cross-sectional view of the stack of layers of FIG. 40A taken along line 40C-40C. FIG. 40A illustrates a cross section taken at the position indicated with broken lines in FIG. 40B and FIG. 40C.

In this step, first, the seed layer 66 is formed on the entire top surface of the stack of layers by sputtering or ALCVD, for example. Next, a magnetic layer 16P that is to become the pole layer 16 later is formed on the seed layer 66. The magnetic layer 16P has a thickness of 1.5 to 2.5 µm, for example. The magnetic layer 16P is formed by frame plating, for example. In the frame plating, the seed layer 66 is used as an electrode for plating. Alternatively, the magnetic layer 16P may be formed by making an unpatterned plating layer and then patterning this plating layer by etching. Next, the magnetic layer 16P is polished by CMP, for example, so that the seed layer 66 is exposed.

Figure 41A:
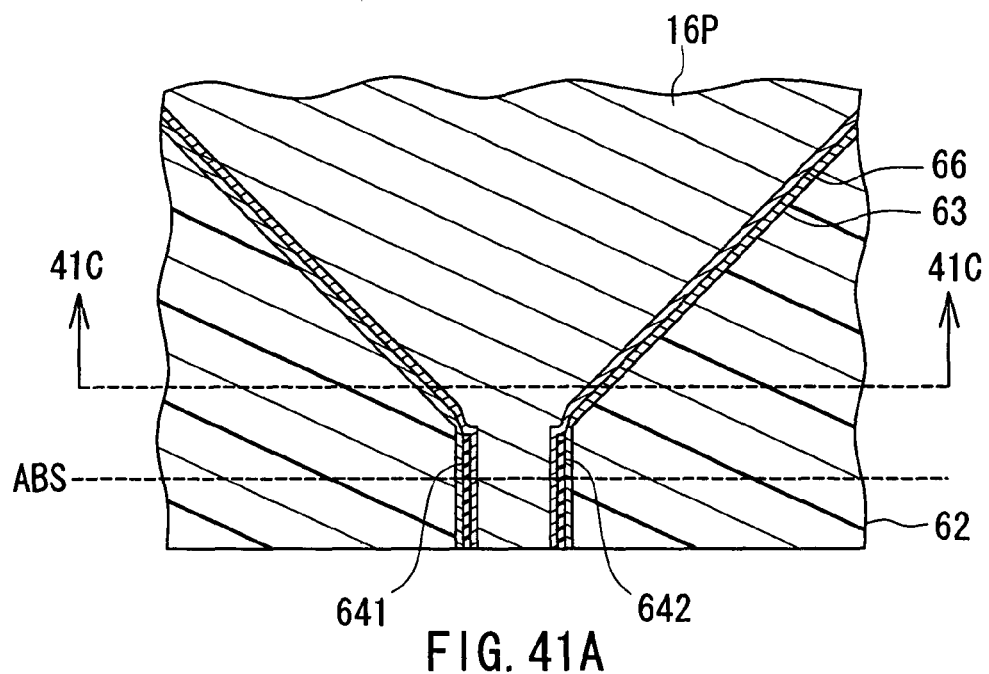
FIG. 41A to FIG. 41C are views for illustrating a step that follows the step of FIG. 40A to FIG. 40C.
Figure 41B:
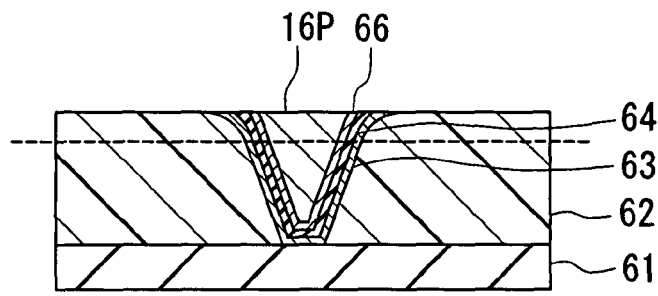
Figure 41C:
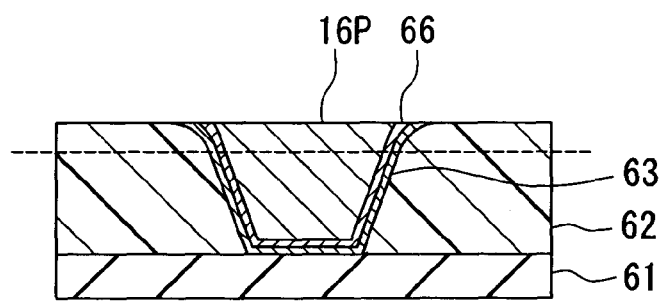

FIG. 41A to FIG. 41C illustrate the next step. FIG. 41A is a cross-sectional view of a stack of layers obtained in the course of the manufacture of the magnetic head. FIG. 41B is a cross-sectional view illustrating a cross section of the stack of layers of FIG. 41A taken in the plane ABS. FIG. 41C is a cross-sectional view of the stack of layers of FIG. 41A taken along line 41C-41C. FIG. 41A illustrates a cross section taken at the position indicated with broken lines in FIG. 41B and FIG. 41C. In this step, the entire top surface of the stack of layers is etched by ion beam etching, for example, so that the frame 62 is exposed.

Figure 42A:
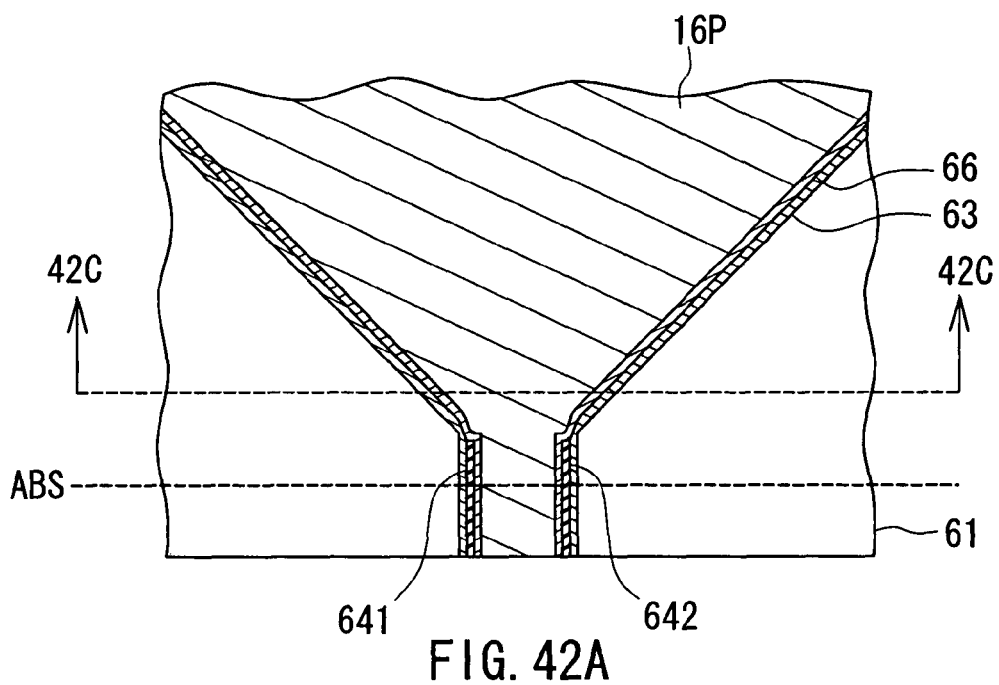
FIG. 42A to FIG. 42C are views for illustrating a step that follows the step of FIG. 41A to FIG. 41C.
Figure 42B:
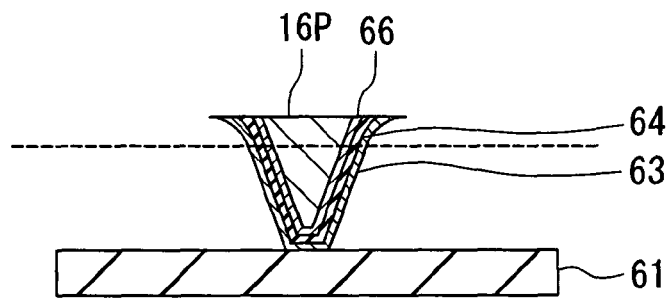
Figure 42C:
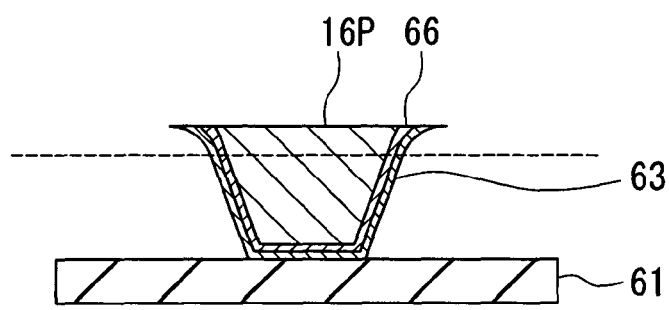

FIG. 42A to FIG. 42C illustrate the next step. FIG. 42A is a cross-sectional view of a stack of layers obtained in the course of the manufacture of the magnetic head. FIG. 42B is a cross-sectional view illustrating a cross section of the stack of layers of FIG. 42A taken in the plane ABS. FIG. 42C is a cross-sectional view of the stack of layers of FIG. 42A taken along line 42C-42C. FIG. 42A illustrates a cross section taken at the position indicated with broken lines in FIG. 42B and FIG. 42C. In this step, the frame 62 is removed.

Figure 43A:
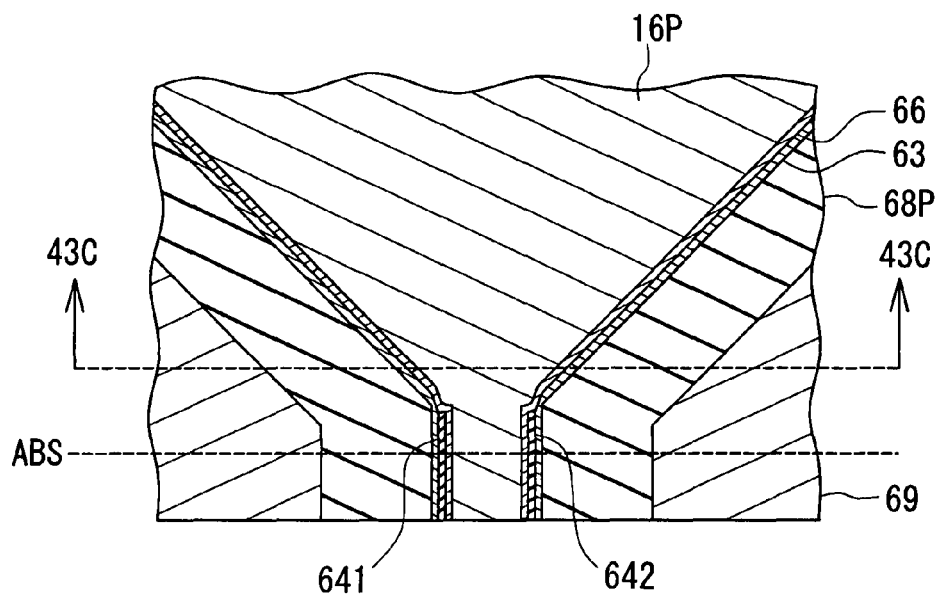
FIG. 43A to FIG. 43C are views for illustrating a step that follows the step of FIG. 42A to FIG. 42C.
Figure 43B:
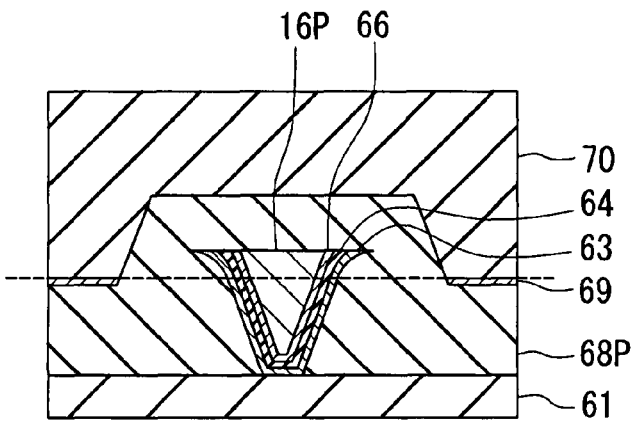
Figure 43C:
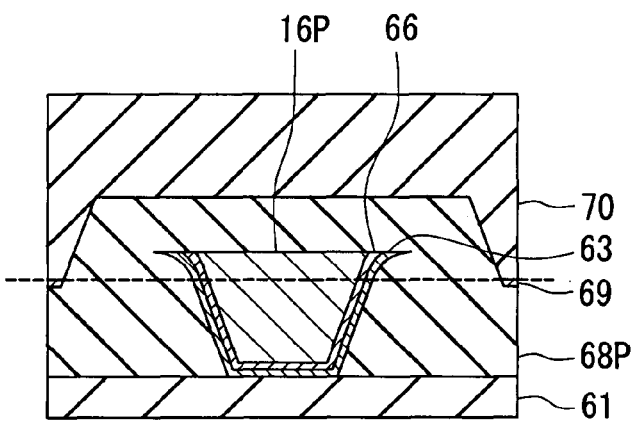

FIG. 43A to FIG. 43C illustrate the next step. FIG. 43A is a cross-sectional view of a stack of layers obtained in the course of the manufacture of the magnetic head. FIG. 43B is a cross-sectional view illustrating a cross section of the stack of layers of FIG. 43A taken in the plane ABS. FIG. 43C is a cross-sectional view of the stack of layers of FIG. 43A taken along line 43C-43C. FIG. 43A illustrates a cross section taken at the position indicated with broken lines in FIG. 43B and FIG. 43C.

In this step, first, a nonmagnetic layer 68P is formed on the entire top surface of the stack of layers, the nonmagnetic layer 68P being intended to become the encasing layer 68 later by being polished. Next, a polishing stopper layer 69 is formed on the nonmagnetic layer 68P in a region around the magnetic layer 16P. The polishing stopper layer 69 is made of Ta, for example. Next, a coating layer 70 made of alumina, for example, is formed on the entire top surface of the stack of layers.

Figure 44A:
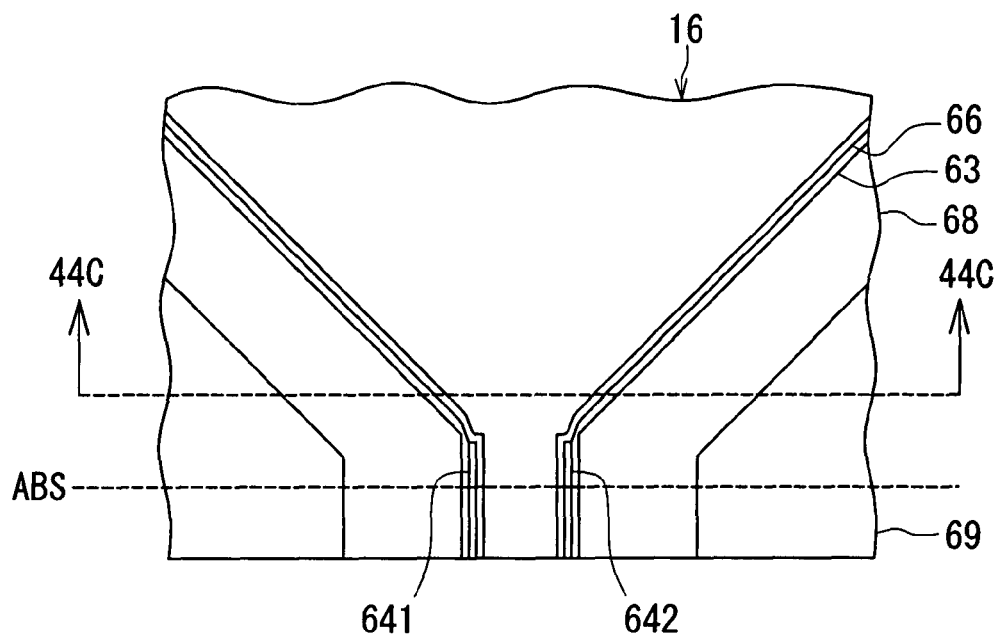
FIG. 44A to FIG. 44C are views for illustrating a step that follows the step of FIG. 43A to FIG. 43C.
Figure 44B:
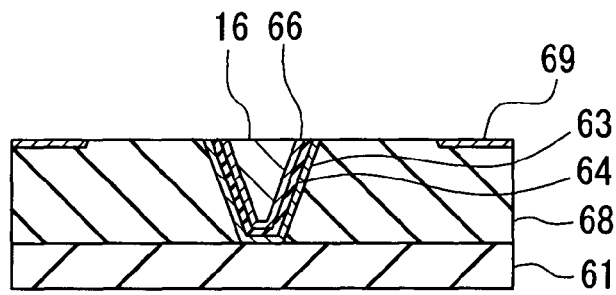
Figure 44C:
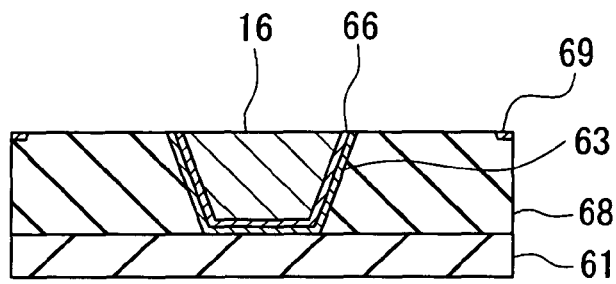

FIG. 44A to FIG. 44C illustrate the next step. FIG. 44A is a top view of a stack of layers obtained in the course of the manufacture of the magnetic head. FIG. 44B is a cross-sectional view illustrating a cross section of the stack of layers of FIG. 44A taken in the plane ABS. FIG. 44C is a cross-sectional view of the stack of layers of FIG. 44A taken along line 44C-44C. In this step, the coating layer 70, the nonmagnetic layer 68P, the nonmagnetic films 63 and 64, the seed layer 66 and the magnetic layer 16P are polished by CMP, for example, so that the polishing stopper layer 69 is exposed, and the top surfaces of these layers are thereby flattened. As a result, the nonmagnetic layer 68P becomes the encasing layer 68, and the magnetic layer 16P becomes the pole layer 16. The encasing layer 68 has a thickness within a range of 0.2 to 0.27 μm, for example. Through this step, the encasing section 60 including the encasing layer 68 and the nonmagnetic films 63 and 64 is completed. Thus, according to the sixth embodiment, the encasing layer 68 is formed around the pole layer 16 and the nonmagnetic films 63 and 64 after the frame 62 is removed.

According to the sixth embodiment, the steps that follow are the same as those described with reference to FIG. 13A to FIG. 14B in the first embodiment.

The remainder of configuration, function and effects of the sixth embodiment are similar to those of the first embodiment. Modifications similar to the first and the second modification example of the first embodiment are also possible for the sixth embodiment. Furthermore, in the sixth embodiment, the first and the second top surface T1 and T2 may be formed in the pole layer 16, as in the third embodiment.

The present invention is not limited to the foregoing embodiments but can be carried out in various modifications. For example, in each of the embodiments, a coil wound around the pole layer 16 in a helical manner may be provided in place of the planar spiral-shaped coils 9 and 23.

While the foregoing embodiments have been described with reference to a magnetic head having a structure in which the read head is formed on the base body and the write head is stacked on the read head, the read head and the write head may be stacked in the reverse order.

It is apparent that the present invention can be carried out in various forms and modifications in the light of the foregoing descriptions. Accordingly, within the scope of the following claims and equivalents thereof, the present invention can be carried out in forms other than the foregoing most preferred embodiments.

What is claimed is:

1. A magnetic head for perpendicular magnetic recording comprising:
   a medium facing surface that faces toward a recording medium;
   a coil for generating a magnetic field corresponding to data to be written on the recording medium;
   a pole layer allowing a magnetic flux corresponding to the magnetic field generated by the coil to pass therethrough and generating a write magnetic field for writing the data on the recording medium by means of a perpendicular magnetic recording system; and
   an encasing section that accommodates at least part of the pole layer, wherein:
   the encasing section includes: an encasing layer made of a nonmagnetic material and having an encasing groove that opens in a top surface of the encasing layer and that accommodates the at least part of the pole layer; and a nonmagnetic film made of a nonmagnetic material and disposed in the encasing groove at a position between the encasing layer and the pole layer;
   the pole layer includes: a track width defining portion having an end face located in the medium facing surface and an end opposite to the end face; and a wide portion connected to the end of the track width defining portion and having a width greater than that of the track width defining portion;
   the end face of the track width defining portion located in the medium facing surface defines a track width;
   a distance from the medium facing surface to a boundary between the track width defining portion and the wide portion is within a range of 10 to 300 nm;
   the track width defining portion has a first side surface and a second side surface;
   the wide portion has a third side surface contiguous to the first side surface, and a fourth side surface contiguous to the second side surface;
   the encasing layer has a first wall surface and a second wall surface that form the encasing groove, the first wall surface is opposed to the first and the third side surface, and the second wall surface is opposed to the second and the fourth side surface;
   the nonmagnetic film includes a first portion located between the first side surface and the first wall surface, and a second portion located between the second side surface and the second wall surface; and
   a distance between the third side surface and the first wall surface is smaller than a distance between the first side surface and the first wall surface, while a distance between the fourth side surface and the second wall surface is smaller than a distance between the second side surface and the second wall surface.

2. The magnetic head for perpendicular magnetic recording according to claim 1, wherein:
   the nonmagnetic film further includes a third portion located between the third side surface and the first wall surface, and a fourth portion located between the fourth side surface and the second wall surface; and
   the third portion is smaller in thickness than the first portion, while the fourth portion is smaller in thickness than the second portion.

3. The magnetic head for perpendicular magnetic recording according to claim 1, wherein the third side surface touches the first wall surface while the fourth side surface touches the second wall surface.

4. The magnetic head for perpendicular magnetic recording according to claim 1, wherein the distance from the medium facing surface to the boundary between the track width defining portion and the wide portion is within a range of 10 to 20 nm.

5. The magnetic head for perpendicular magnetic recording according to claim 1, further comprising a substrate on which the encasing section, the pole layer and the coil are stacked, wherein
   the end face of the track width defining portion has a first side that is closer to a top surface of the substrate, and a second side opposite to the first side, the second side has a width that defines the track width, and the end face of the track width defining portion has a width that decreases with decreasing distance from the first side.

6. The magnetic head for perpendicular magnetic recording according to claim 5, wherein:
   an angle formed by the third side surface with respect to a direction orthogonal to the top surface of the substrate is smaller than an angle formed by the first side surface with respect to the direction orthogonal to the top surface of the substrate; and
   an angle formed by the fourth side surface with respect to the direction orthogonal to the top surface of the substrate is smaller than an angle formed by the second side surface with respect to the direction orthogonal to the top surface of the substrate.

7. The magnetic head for perpendicular magnetic recording according to claim 1, further comprising an encasing groove defining layer disposed on the top surface of the encasing layer and having a penetrating opening contiguous to the encasing groove, wherein an edge of the opening of the encasing groove defining layer is located directly above an edge of the encasing groove in the top surface of the encasing layer.

8. The magnetic head for perpendicular magnetic recording according to claim 1, further comprising a substrate on which the encasing section, the pole layer and the coil are stacked, wherein:
the track width defining portion has a first bottom surface that is a surface closer to a top surface of the substrate, the wide portion has a second bottom surface that is a surface closer to the top surface of the substrate, and the second bottom surface is located closer to the top surface of the substrate than is the first bottom surface.

9. The magnetic head for perpendicular magnetic recording according to claim 8, further comprising a bottom forming layer made of a nonmagnetic material, the bottom forming layer being disposed between the encasing layer and the substrate and touching the encasing layer, wherein at least part of a portion of the encasing groove in which the wide portion is placed penetrates the encasing layer.

10. The magnetic head for perpendicular magnetic recording according to claim 1, further comprising a substrate on which the encasing section, the pole layer and the coil are stacked, wherein
the track width defining portion has a first top surface that is a surface farther from a top surface of the substrate, the wide portion has a second top surface that is a surface farther from the top surface of the substrate, and the second top surface is located farther from the top surface of the substrate than is the first top surface.

11. A method of manufacturing a magnetic head for perpendicular magnetic recording, the magnetic head comprising:
a medium facing surface that faces toward a recording medium;
a coil for generating a magnetic field corresponding to data to be written on the recording medium;
a pole layer allowing a magnetic flux corresponding to the magnetic field generated by the coil to pass therethrough and generating a write magnetic field for writing the data on the recording medium by means of a perpendicular magnetic recording system; and
an encasing section that accommodates at least part of the pole layer, wherein:
the encasing section includes: an encasing layer made of a nonmagnetic material and having an encasing groove that opens in a top surface of the encasing layer and that accommodates the at least part of the pole layer; and a nonmagnetic film made of a nonmagnetic material and disposed in the encasing groove at a position between the encasing layer and the pole layer;
the pole layer includes: a track width defining portion having an end face located in the medium facing surface and an end opposite to the end face; and a wide portion connected to the end of the track width defining portion and having a width greater than that of the track width defining portion;
the end face of the track width defining portion located in the medium facing surface defines a track width;
a distance from the medium facing surface to a boundary between the track width defining portion and the wide portion is within a range of 10 to 300 nm;
the track width defining portion has a first side surface and a second side surface;

the wide portion has a third side surface contiguous to the first side surface, and a fourth side surface contiguous to the second side surface;
the encasing layer has a first wall surface and a second wall surface that form the encasing groove, the first wall surface is opposed to the first and the third side surface, and the second wall surface is opposed to the second and the fourth side surface;
the nonmagnetic film includes a first portion located between the first side surface and the first wall surface, and a second portion located between the second side surface and the second wall surface; and
a distance between the third side surface and the first wall surface is smaller than a distance between the first side surface and the first wall surface, while a distance between the fourth side surface and the second wall surface is smaller than a distance between the second side surface and the second wall surface,
the method comprising the steps of:
forming the encasing section; forming the pole layer after the step of forming the encasing section; and forming the coil, wherein:
the step of forming the encasing section includes a step of forming the encasing layer and a step of forming the nonmagnetic film; and
the step of forming the nonmagnetic film includes:
a step of forming a film to be etched, the film to be etched being intended to become the nonmagnetic film later by undergoing partial etching;
a step of forming a mask for covering a portion of the film to be etched, the portion being intended to become the first and the second portion later; and
a step of etching at least part of a portion of the film to be etched that is not covered with the mask.

12. The method according to claim 11, wherein:
the nonmagnetic film further includes a third portion located between the third side surface and the first wall surface, and a fourth portion located between the fourth side surface and the second wall surface, and the third portion is smaller in thickness than the first portion while the fourth portion is smaller in thickness than the second portion; and
in the step of etching the film to be etched, the film is etched such that the first to fourth portions of the nonmagnetic film are formed.

13. The method according to claim 11, wherein:
in the step of etching the film to be etched, the film is etched such that a portion of each of the first and the second wall surface of the encasing layer is exposed as a result of removal of the at least part of the portion of the film to be etched that is not covered with the mask; and
in the step of forming the pole layer, the pole layer is formed such that the third side surface touches the first wall surface and the fourth side surface touches the second wall surface.

14. The method according to claim 11, wherein, in the step of etching the film to be etched, the film is etched by reactive ion etching or ion beam etching.

15. The method according to claim 11, wherein, in the step of etching the film to be etched, the encasing groove is completed at the same time.

16. The method according to claim 11, wherein the film to be etched is formed by chemical vapor deposition in which formation of a single atomic layer is repeated.

17. The method according to claim 11, wherein the distance from the medium facing surface to the boundary between the track width defining portion and the wide portion is within a range of 10 to 20 nm.

18. The method according to claim 11, wherein:
the magnetic head further comprises a substrate on which the encasing section, the pole layer and the coil are stacked; and
the end face of the track width defining portion has a first side that is closer to a top surface of the substrate, and a second side opposite to the first side, the second side has a width that defines the track width, and the end face of the track width defining portion has a width that decreases with decreasing distance from the first side.

19. The method according to claim 18, wherein:
an angle formed by the third side surface with respect to a direction orthogonal to the top surface of the substrate is smaller than an angle formed by the first side surface with respect to the direction orthogonal to the top surface of the substrate; and
an angle formed by the fourth side surface with respect to the direction orthogonal to the top surface of the substrate is smaller than an angle formed by the second side surface with respect to the direction orthogonal to the top surface of the substrate.

20. The method according to claim 11, wherein:
the magnetic head further comprises an encasing groove defining layer disposed on the top surface of the encasing layer and having a penetrating opening contiguous to the encasing groove, and an edge of the opening of the encasing groove defining layer is located directly above an edge of the encasing groove in the top surface of the encasing layer;
the step of forming the encasing layer includes:
a step of forming a nonmagnetic layer that is to become the encasing layer later by undergoing formation of the encasing groove therein;
a step of forming the encasing groove defining layer on the nonmagnetic layer; and
a step of forming the encasing groove in the nonmagnetic layer by selectively etching a portion of the nonmagnetic layer exposed from the opening of the encasing groove defining layer; and
in the step of etching the film to be etched, the film is etched using the mask and the encasing groove defining layer as etching masks.

21. The method according to claim 11, wherein the magnetic head further comprises a bottom forming layer made of a nonmagnetic material and disposed below the encasing layer,
the method further comprising the step of forming the bottom forming layer before the encasing layer is formed, wherein:
the step of forming the encasing layer includes:
a step of forming a nonmagnetic layer on the bottom forming layer, the nonmagnetic layer being intended to become the encasing layer later by undergoing formation of the encasing groove therein; and
a step of forming the encasing groove in the nonmagnetic layer by selectively etching the nonmagnetic layer; and
at least part of a portion of the encasing groove in which the wide portion is placed penetrates the encasing layer.

22. A method of manufacturing a magnetic head for perpendicular magnetic recording, the magnetic head comprising:
a medium facing surface that faces toward a recording medium;
a coil for generating a magnetic field corresponding to data to be written on the recording medium;
a pole layer allowing a magnetic flux corresponding to the magnetic field generated by the coil to pass therethrough and generating a write magnetic field for writing the data on the recording medium by means of a perpendicular magnetic recording system; and
an encasing section that accommodates at least part of the pole layer, wherein:
the encasing section includes: an encasing layer made of a nonmagnetic material and having an encasing groove that opens in a top surface of the encasing layer and that accommodates the at least part of the pole layer; and a nonmagnetic film made of a nonmagnetic material and disposed in the encasing groove at a position between the encasing layer and the pole layer;
the pole layer includes: a track width defining portion having an end face located in the medium facing surface and an end opposite to the end face; and a wide portion connected to the end of the track width defining portion and having a width greater than that of the track width defining portion;
the end face of the track width defining portion located in the medium facing surface defines a track width;
a distance from the medium facing surface to a boundary between the track width defining portion and the wide portion is within a range of 10 to 300 nm;
the track width defining portion has a first side surface and a second side surface;
the wide portion has a third side surface contiguous to the first side surface, and a fourth side surface contiguous to the second side surface;
the encasing layer has a first wall surface and a second wall surface that form the encasing groove, the first wall surface is opposed to the first and the third side surface, and the second wall surface is opposed to the second and the fourth side surface;
the nonmagnetic film includes a first portion located between the first side surface and the first wall surface, and a second portion located between the second side surface and the second wall surface; and
a distance between the third side surface and the first wall surface is smaller than a distance between the first side surface and the first wall surface, while a distance between the fourth side surface and the second wall surface is smaller than a distance between the second side surface and the second wall surface,
the method comprising the steps of
forming the encasing section;
forming the pole layer after the step of forming the encasing section; and
forming the coil,
wherein the step of forming the encasing section includes:
a step of forming the encasing layer;
a step of forming a mask for covering a portion of the encasing groove of the encasing layer in which the wide portion is to be placed later;
a step of forming the nonmagnetic film to cover respective portions of the first and the second wall surface that are not covered with the mask; and
a step of removing the mask.

23. The method according to claim 22, wherein:
the magnetic head further comprises an encasing groove defining layer disposed on the top surface of the encasing layer and having a penetrating opening contiguous to the encasing groove, and an edge of the opening of the encasing groove defining layer is located directly above an edge of the encasing groove in the top surface of the encasing layer; and the step of forming the encasing layer includes:
a step of forming a nonmagnetic layer that is to become the encasing layer later by undergoing formation of the encasing groove therein;
a step of forming the encasing groove defining layer on the nonmagnetic layer; and
a step of forming the encasing groove in the nonmagnetic layer by selectively etching a portion of the nonmagnetic layer exposed from the opening of the encasing groove defining layer.

24. The method according to claim 23, wherein the step of forming the encasing groove includes:
a first etching step for forming an initial groove in the nonmagnetic layer by selectively etching the portion of the nonmagnetic layer exposed from the opening of the encasing groove defining layer, the initial groove being intended to become the encasing groove later by undergoing etching;
a step of forming a second mask for covering a portion of the initial groove in which the track width defining portion is to be placed later; and
a second etching step for completing the encasing groove by etching a portion of the initial groove that is not covered with the second mask, using the second mask and the encasing groove defining layer as etching masks.

25. The method according to claim 22, wherein the nonmagnetic film is formed by chemical vapor deposition in which formation of a single atomic layer is repeated.

26. The method according to claim 22, wherein the distance from the medium facing surface to the boundary between the track width defining portion and the wide portion is within a range of 10 to 20 nm.

27. The method according to claim 22, wherein:
the magnetic head further comprises a substrate on which the encasing section, the pole layer and the coil are stacked; and
the end face of the track width defining portion has a first side that is closer to a top surface of the substrate, and a second side opposite to the first side, the second side has a width that defines the track width, and the end face of the track width defining portion has a width that decreases with decreasing distance from the first side.

28. The method according to claim 27, wherein:
an angle formed by the third side surface with respect to a direction orthogonal to the top surface of the substrate is smaller than an angle formed by the first side surface with respect to the direction orthogonal to the top surface of the substrate; and
an angle formed by the fourth side surface with respect to the direction orthogonal to the top surface of the substrate is smaller than an angle formed by the second side surface with respect to the direction orthogonal to the top surface of the substrate.

29. A method of manufacturing a magnetic head for perpendicular magnetic recording, the magnetic head comprising:
a medium facing surface that faces toward a recording medium;
a coil for generating a magnetic field corresponding to data to be written on the recording medium;
a pole layer allowing a magnetic flux corresponding to the magnetic field generated by the coil to pass therethrough and generating a write magnetic field for writing the data on the recording medium by means of a perpendicular magnetic recording system; and
an encasing section that accommodates at least part of the pole layer, wherein:
the encasing section includes: an encasing layer made of a nonmagnetic material and having an encasing groove that opens in a top surface of the encasing layer and that accommodates the at least part of the pole layer; and a nonmagnetic film made of a nonmagnetic material and disposed in the encasing groove at a position between the encasing layer and the pole layer;
the pole layer includes: a track width defining portion having an end face located in the medium facing surface and an end opposite to the end face; and a wide portion connected to the end of the track width defining portion and having a width greater than that of the track width defining portion;
the end face of the track width defining portion located in the medium facing surface defines a track width;
a distance from the medium facing surface to a boundary between the track width defining portion and the wide portion is within a range of 10 to 300 nm;
the track width defining portion has a first side surface and a second side surface;
the wide portion has a third side surface contiguous to the first side surface, and a fourth side surface contiguous to the second side surface;
the encasing layer has a first wall surface and a second wall surface that form the encasing groove, the first wall surface is opposed to the first and the third side surface, and the second wall surface is opposed to the second and the fourth side surface;
the nonmagnetic film includes a first portion located between the first side surface and the first wall surface, and a second portion located between the second side surface and the second wall surface; and
a distance between the third side surface and the first wall surface is smaller than a distance between the first side surface and the first wall surface, while a distance between the fourth side surface and the second wall surface is smaller than a distance between the second side surface and the second wall surface,
the method comprising the steps of:
forming a frame having a groove in which the pole layer is to be formed later;
forming the nonmagnetic film in the groove of the frame;
forming the pole layer in the groove of the frame after the nonmagnetic film is formed;
removing the frame after the pole layer is formed; and
completing the encasing section by forming the encasing layer around the pole layer and the nonmagnetic film after the frame is removed.

30. The method according to claim 29, wherein the step of forming the nonmagnetic film includes:
a step of forming a film to be etched, the film to be etched being intended to become the nonmagnetic film later by undergoing partial etching;
a step of forming a mask for covering a portion of the film to be etched, the portion being intended to become the first and the second portion later; and
a step of etching at least part of a portion of the film to be etched that is not covered with the mask.

31. The method according to claim 30, wherein the film to be etched is formed by chemical vapor deposition in which formation of a single atomic layer is repeated.

32. The method according to claim 29, wherein the distance from the medium facing surface to the boundary between the track width defining portion and the wide portion is within a range of 10 to 20 nm.

33. The method according to claim 29, wherein:
the magnetic head further comprises a substrate on which the encasing section, the pole layer and the coil are stacked; and
the end face of the track width defining portion has a first side that is closer to a top surface of the substrate, and a second side opposite to the first side, the second side has a width that defines the track width, and the end face of the track width defining portion has a width that decreases with decreasing distance from the first side.

* * * * *